US00RE37101E

(19) United States
(12) Reissued Patent
Deetman

(10) Patent Number: US RE37,101 E
(45) Date of Reissued Patent: Mar. 20, 2001

(54) STABILIZED PHOSPHATE ESTER-BASED FUNCTIONAL FLUID COMPOSITIONS

(75) Inventor: Gerbrand Deetman, St. Charles, MO (US)

(73) Assignee: Solutia Inc., St Louis, MO (US)

(21) Appl. No.: 08/966,425

(22) Filed: Nov. 7, 1997

Related U.S. Patent Documents

Reissue of:
(64) Patent No.: 5,464,551
Issued: Nov. 7, 1995
Appl. No.: 08/099,267
Filed: Jul. 28, 1993

U.S. Applications:
(63) Continuation-in-part of application No. 07/897,189, filed on Jun. 11, 1992, now abandoned.

(51) Int. Cl.[7] ..... C10M 105/74
(52) U.S. Cl. ..... 252/78.5; 252/75; 252/77; 252/78.1; 508/433; 508/282
(58) Field of Search ..... 252/78.5, 75, 77, 252/78.1; 508/282, 433

(56) References Cited

U.S. PATENT DOCUMENTS

| | | | | |
|---|---|---|---|---|
| 2,549,270 | | 4/1951 | Watson | 508/304 |
| 2,566,623 | | 9/1951 | Moreton | 252/78.5 |
| 2,894,911 | | 7/1959 | Moreton | 252/78.5 |
| 2,903,428 | | 9/1959 | Moreton | 508/440 |
| 2,909,489 | | 10/1959 | Fields | 252/78.5 |
| 3,432,437 | | 3/1969 | Nail | 508/438 |
| 3,468,802 | | 9/1969 | Nail | 252/78.5 |
| 3,487,020 | * | 12/1969 | Peeler et al. | 252/78.5 |
| 3,637,507 | | 1/1972 | Gentit | 252/78.5 |
| 3,649,721 | | 3/1972 | Burrous et al. | 558/146 |
| 3,679,587 | * | 7/1972 | Smith | 252/75 |
| 3,718,596 | * | 2/1973 | Richard, Jr. | 252/78.5 |
| 3,723,320 | * | 3/1973 | Herber et al. | 252/78.5 |
| 3,730,889 | | 5/1973 | McCord et al. | 252/78.1 |
| 3,730,898 | | 5/1973 | McCord et al. | 252/78.1 |
| 3,790,487 | | 2/1974 | Burrous | 252/78.5 |
| 3,795,619 | | 3/1974 | Sheratte | 252/78.5 |
| 3,795,620 | | 3/1974 | Sheratte | 252/78.5 |
| 3,849,324 | | 11/1974 | Sheratte | 252/78.5 |
| 3,862,048 | | 1/1975 | Sheratte | 252/78.5 |
| 3,865,743 | | 2/1975 | Sheratte | 252/78.5 |
| 3,931,022 | * | 1/1976 | Chesluk et al. | 252/78.5 |
| 3,935,116 | | 1/1976 | Sheratte | 252/78.5 |
| 3,941,708 | | 3/1976 | Gentit et al. | 252/78.5 |
| 3,951,837 | | 4/1976 | Sheratte | 252/78.5 |
| 3,957,668 | | 5/1976 | Sheratte | 252/78.5 |
| 3,969,254 | * | 7/1976 | Herber et al. | 252/78.5 |
| 3,983,046 | | 9/1976 | Sheratte | 252/78.5 |
| 3,984,340 | | 10/1976 | Sheratte | 252/78.5 |
| 4,007,123 | | 2/1977 | Sheratte | 252/78.5 |
| 4,206,067 | * | 6/1980 | MacKinnon | 252/75 |
| 4,318,817 | * | 3/1982 | Huebner | 252/78.5 |
| 4,324,674 | * | 4/1982 | MacKinnon | 252/78.5 |
| 4,868,023 | * | 9/1989 | Ryan et al. | 428/35.1 |
| 5,035,824 | * | 7/1991 | MacKinnon | 252/75 |
| 5,037,567 | * | 8/1991 | Farng et al. | 508/422 |

FOREIGN PATENT DOCUMENTS

2120127 * 8/1972 (FR) .
1370728 * 10/1974 (GB) .

OTHER PUBLICATIONS

Chemical Abstracts, AN 77:64338, "Use of a factorial planning method during a study of the synergism of VT–1–MB–1 additives", Kalinina et al., no month available 1972.*

"Acrylic Resins", in Textbook of Polymer Chemistry, (Interscience Publishers, New York 1957) pp. 295–301 no month available.

"Hydraulic Fluids", in Kirk–Othmer Encyclopedia of Chemical Technology, (Wiley–Interscience, New York 1980) pp. 712–733. no month available.

"Acrylic and MethAcrylic Ester Polymers", in Encyclopedia of Polymer Science and Engineering, vol. 1, H.F. Mark et al. eds. (John Wiley & Sons, New York 1985), pp. 234–299. no month available.

(List continued on next page.)

*Primary Examiner*—Christine Skane
(74) *Attorney, Agent, or Firm*—Howrey Simon Arnold & White, LLP

(57) ABSTRACT

A fluid composition suitable for use as an aircraft hydraulic fluid is disclosed. The fluid composition comprises a fire resistant phosphate ester base stock comprising between about 10% and about 100% by weight of a trialkyl phosphate, between about 0% and about 70% by weight of a dialkyl aryl phosphate, and from about 0% to about 25% by weight of an alkyl diaryl phosphate, with the proviso that the sum of the proportionate amount of each base stock component must equal 100%. The alkyl substituents of the trialkyl phosphate, the dialkyl aryl phosphate, and the alkyl diaryl phosphate contain between 3 and 8 carbon atoms, preferably between 4 and 8 carbon atoms, more preferably between 4 and 5 carbon atoms, and are bonded to the phosphate moiety via a primary carbon. It is still further preferred that the alkyl substituents of the trialkyl phosphate, the dialkyl aryl phosphate, and the alkyl diaryl phosphate are isoalkyl groups. The fluid composition further comprises an acid scavenger, an anti-erosion additive, a viscosity index improver, and an antioxidant. A novel additive combination comprises a high molecular weight butyl/hexyl methacrylate viscos ity index improver, a perfluoroalkylsulfonate anti-erosion additive, a 3,4-epoxycyclohexanecarboxylate or a diepoxide acid scavenger, a di(alkylphenyl)amine, and a phenolic antioxidant comprising a mixture of a 2,4,6-trialkylphenol and a hindered polyphenol compound selected from the group consisting of bis(3,5-dialkyl-4-hydroxyaryl)methane, 1,3,5-trialkyl-2,4,6-tris(3,5-di-tert-butyl-4-hydroxyaryl)benzene and mixtures thereof. Preferably, the fluid composition further comprises a benzotriazole derivative as a copper corrosion inhibitor, and a 4,5-dihydroimidazole derivative, as an iron corrosion inhibitor and to enhance the stability of the fluid. *The issued reissue patent is the reexamination certificate.*

115 Claims, 13 Drawing Sheets

OTHER PUBLICATIONS

"Polymerization of Acrylate and Methacrylate Esters", in Polymer Syntheses, vol. 1, S.R. Sandler and W. Karo, eds. (Academic Press, New York 1974) pp. 266–301. no month available.

Synthetic Lubricants, R.C. Gunderson and A.W. Hart, eds. (Reinhold Publishing Co. NY) (1962) pp. 103–150 no month available.

Okazaki, M.E. et al., in Technische Akademie Esslingen 8th International "Tribology 2000" Colloquium Jan. 14–16, 1992 Proceedings.

Wilson, D.R., in *Technical Report AFML–TR–70–32, Part III,* (Air Force Materials Laboratory, Wright–Patterson Air Force Base, Ohio; Jan. 1972).

Brooks, S. et al. in *Technical Report AFML–TR–73–78,* (Air Force Materials Laboratory, Wright–Patterson Air Force Base, Ohio; Apr., 1973).

* cited by examiner

STABILIZED PHOSPHATE ESTER-BASED FUNCTIONAL FLUID COMPOSITIONS

Matter enclosed in heavy brackets [ ] appears in the original patent but forms no part of this reissue specification; matter printed in italics indicates the additions made by reissue.

This is a continuation in part of Ser. No. 07/897,189 filed Jun. 11, 1992, now abandoned.

BACKGROUND OF THE INVENTION

This invention relates to phosphate ester functional fluids and more particularly to phosphate ester fluids of improved thermal, hydrolytic and oxidative stability useful as aircraft hydraulic fluids.

Functional fluids have been utilized as electronic coolants, diffusion pump fluids, lubricants, damping fluids, bases for greases, power transmission and hydraulic fluids, heat transfer fluids, heat pump fluids, refrigeration equipment fluids, and as a filter media for air-conditioning systems. Hydraulic fluids intended for use in the hydraulic system of aircraft for operating various mechanisms and aircraft control systems must meet stringent functional and use requirements. Among the most important requirements of an aircraft hydraulic fluid is that it be stable against oxidative and hydrolytic degradation at elevated temperatures.

In use, aircraft hydraulic fluids commonly become contaminated with moisture. Water enters the hydraulic system with air bled from an engine compressor stage. During operations, the moisture level in Type IV aircraft hydraulic fluids normally ranges from about 0.2 to about 0.35% by weight. Water causes hydrolytic decomposition of phosphate esters to produce partial esters of phosphoric acid. Hydrolytic breakdown of the ester is accelerated if water content exceeds about 0.5% by weight. Conventionally, phosphate ester aircraft hydraulic fluids are formulated to contain an acid scavenger which neutralizes partial esters of phosphoric acid released by hydrolytic breakdown of the triester. Over time, however, the acid scavenger becomes depleted and organometallic compounds are formed by complex reactions involving the phosphate triester, phosphoric acid partial esters, and surfaces of the metal environment within which the hydraulic fluid is ordinarily contained. These organometallic compounds, of which iron phosphate is usually the most prominent by-product, are not soluble in the hydraulic fluid.

Higher performance aircraft are operated under conditions which expose hydraulic fluids to increasing temperatures. Current Grade A fluids operate at maximum temperatures in the range of 225 to 240° F. However, projected aircraft applications will expose aircraft hydraulic fluids to bulk fluid temperatures in the range of 275° F. or higher. At such temperatures, the potential for oxidative and hydrolytic breakdown of phosphate esters is substantially increased.

Degradation of phosphate ester hydraulic fluids is also accelerated where the fluids are exposed to compressed air. The rate of air oxidation of such fluids also increases with temperature. Thus, for application at 275° F. or higher, a need exists for fluids of both enhanced thermal oxidative stability and enhanced thermal hydrolytic stability.

Erosion problems may also be expected to increase with bulk fluid temperature. Erosion is a form of electrochemical corrosion, more precisely referred to as zeta corrosion, the rates of which are increased with temperature. The incidence of cavitation, which is one of the mechanical sources of erosion problems, is also likely to increase with temperature. As erosion progresses, the presence of metallic or other insoluble components may result in filter clogging and replacement, and can cause a change in the physical and chemical properties of the fluid, thereby requiring premature draining of fluids from the system. Metal contaminants also reduce oxidative stability of the fluid, accelerating corrosion. In addition to any effects resulting from contamination by metal (or other) contaminants, the fluid may suffer deterioration in numerous other ways, including: a) viscosity change; b) increase in acid number; c) increased chemical reactivity; and d) discoloration.

A hydraulic fluid useful in aircraft is available from applicants' assignee under the trademark Skydrol® LD4. This composition contains 30 to 35% by weight dibutyl phenyl phosphate, 50 to 60% by weight tributyl phosphate, 5 to 10% of viscosity index improvers, 0.13 to 1% of a diphenyldithioethane copper corrosion inhibitor, 0.005% to about 1% by weight, but preferably 0.0075% to 0.075% of a perfluoroalkylsulfonic acid salt antierosion agent, 4 to 8% by weight of an acid scavenger of the type described in U.S. Pat. No. 3,723,320 and about 1% by weight of 2,6-di-tertiary-butyl-p-cresol as an antioxidant. This composition has proved highly satisfactory in high performance aircraft application. However, it was not designed for extended operations at temperatures in the range of 275° F.

SUMMARY OF THE INVENTION

Among the several objects of the present invention, therefore, may be noted the provision of an improved functional fluid useful as a hydraulic fluid in aircraft applications; the provision of such a fluid which exhibits improved hydrolytic stability, especially at elevated temperatures; the provision of such a fluid which exhibits improved oxidative stability at elevated temperatures; the provision of such a fluid which exhibits advantageous viscosity characteristics and especially viscosity stability under shear conditions; the provision of such a fluid of relatively low density; the provision of such a fluid which has not only high resistance to oxidation but also low toxicity; the provision of such a composition which has improved antierosion properties; and the provision of such a fluid composition which exhibits improved resistance to corrosion of metal components of an aircraft or other hydraulic fluid system.

Briefly, therefore, the present invention is directed to a fluid composition suitable for use as an aircraft hydraulic fluid. The composition comprises a fire resistant phosphate ester base stock, the base stock comprising between about 10% and about 100%, preferably between about 20% and about 99%, by weight of a trialkyl phosphate, between about 0% and about 70% by weight of a dialkyl aryl phosphate, and from about 0% to about 25% by weight of an alkyl diaryl phosphate, with the proviso that the sum of the proportionate amount of each base stock component must equal 100%. The alkyl substituents of the trialkyl phosphate, the dialkyl aryl phosphate, and the alkyl diaryl phosphate contain between 3 and 8 carbon atoms, preferably between 4 and 8 carbon atoms, more preferably between 4 and 5 carbon atoms, and are bonded to the phosphate moiety via a primary carbon. It is still further preferred that the alkyl substituents of the trialkyl phosphate, the dialkyl aryl phosphate, and the alkyl diaryl phosphate are isoalkyl groups. In a preferred embodiment, the base stock of the composition comprises between about 50% and about 85% by weight of a trialkyl phosphate, between about 18% and about 35% by weight of a dialkyl aryl phosphate, and from 0 to about 5% by weight of an alkyl diaryl phosphate. In addition to the fire resistant base stock, the composition further comprises an acid scavenger in an amount effective to neutralize phosphoric acid partial esters formed in situ by hydrolysis of any of the phosphate esters of the base stock; an anti-erosion additive in an amount effective to inhibit flow-induced electrochemical or zeta corrosion of the flow metering edges of hydraulic servo valves in hydraulic systems; a viscosity index improver in an amount effective to cause the fluid composition to exhibit a viscosity of at least about 3.0 centistokes (cst) at about 210° F., at least about 9.0 centistokes at about 100° F., and less than about 4200 centistokes at −65° F.; and an anti-oxidant in an amount effective to inhibit oxidation of fluid composition components in the presence of oxygen.

Preferably, as previously indicated, the alkyl substituents of the trialkyl phosphate, dialkyl aryl phosphate, and the alkyl diaryl phosphate contain between 4 and 8 carbon atoms, more preferably between 4 and 5 carbon atoms. It is still further preferred that the alkyl substituents of the trialkyl phosphate, the dialkyl aryl phosphate, and the alkyl diaryl phosphate are isoalkyl groups. Most preferably, therefore, the alkyl substituents are isoalkyl $C_4$ and $C_5$ groups, namely, isobutyl and isopentyl (also known as isoamyl), respectively.

The invention is further directed to a fluid composition suitable for use as an aircraft hydraulic fluid and containing a novel combination of additives. The composition comprises a fire resistant phosphate ester base stock comprising between about 10% and about 90% by weight of a trialkyl phosphate, between about 0 and about 70% by weight of a dialkyl aryl phosphate and from 0% to about 25% by weight of an alkyl diaryl phosphate. The alkyl substituents of the trialkyl phosphate, the dialkyl aryl phosphate, and the alkyl diaryl phosphate contain between 3 and 8 carbon atoms, preferably between 4 and 8 carbon atoms, more preferably between 4 and 5 carbon atoms and are bonded to the phosphate moiety via a primary carbon atom. It is still further preferred that the alkyl substituents of the trialkyl phosphate, the dialkyl aryl phosphate, and the alkyl diaryl phosphate are isoalkyl groups. The composition further comprises a viscosity index improver in a proportion, on a solids (methacrylate polymer, as hereinafter described) basis, of between about 3% and about 10% by weight of the composition. The viscosity index improver comprises a methacrylate ester polymer, the repeating units of which substantially comprise butyl and hexyl methacrylate, at least 95% by weight of the polymer having a molecular weight of between about 50,000 and about 1,500,000. The viscosity index improver is conveniently employed or provided in the form of a solution in a phosphate ester solvent, preferably a trialkyl phosphate ester, such as, for example, tributyl or triisobutyl phosphate, or a combination of alkyl and aryl phosphate esters. In a preferred embodiment, the phosphate ester solvent is comprised of one or more of the phosphate ester components which constitute the phosphate ester base stock of choice. In such manner, the phosphate ester solvent becomes in effect part of the base stock, and the stated ranges of suitable proportions of phosphate esters hereinafter described reflect the phosphate ester(s) added as a carrier or vehicle for the viscosity index improver. The composition further comprises an anti-erosion agent in a proportion of between about 0.02% and about 0.08% by weight of the composition, the anti-erosion agent comprising an alkali metal salt of a perfluoroalkylsulfonic acid, the alkyl substituent of which is hexyl, heptyl, octyl, nonyl or decyl. The composition comprises an acid scavenger in a proportion of between about 1.5 and about 10% by weight of the composition, the acid scavenger comprising a derivative of 3,4-epoxycyclohexane carboxylate or a diepoxide compound of the type disclosed in U.S. Pat. No. 4,206,067. The composition further contains a 2,4,6-trialkylphenol in a proportion of between about 0.1% and about 1% by weight, a dialkylphenyl)amine in a proportion of between about 0.3% and about 1% by weight, and a hindered polyphenol compound selected from the group consisting of bis(3,5-dialkyl-4-hydroxyaryl)methane, 1,3,5-trimethyl-2,4,6-tris (3,5-di-tert-butyl-hydroxyaryl)benzene and mixtures thereof in a proportion of between about 0.3% and about 1% by weight of the composition. The alkyl substituents of trialkyl phosphate and dialkyl aryl phosphate are preferably butyl or pentyl.

The invention is further directed to a fluid composition suitable for use as an aircraft hydraulic fluid comprising a fire resistant organophosphate ester base stock. The base stock comprises between about 10% and about 100%, preferably between about 20% and about 99%, by weight of a trialkyl phosphate wherein the alkyl substituents are substantially isoalkyl $C_4$ or $C_5$, between about 0% and about 70% by weight of a dialkyl aryl phosphate wherein the alkyl substituents are substantially isoalkyl $C_4$ or $C_5$, and between about 0% and about 25% by weight of an alkyl diaryl phosphate wherein the alkyl substituent is substantially isoalkyl $C_4$ or $C_5$. The composition further comprises an acid scavenger in an amount effective to neutralize phosphoric acid and phosphoric acid partial esters formed in situ by hydrolysis of any of the phosphate esters of the base stock; an anti-erosion additive in an amount effective to inhibit flow-induced electrochemical corrosion of the flow metering edges of hydraulic servo valves in hydraulic systems; a viscosity index improver in an amount effective to cause the fluid composition to exhibit a viscosity index of at least about 3.0 centistokes at about 210° F., at least about 9.0 centistokes at about 100° F., and less than about 4200 centistokes at −65° F.; and an antioxidant in an amount effective to inhibit oxidation of fluid composition components in the presence of oxygen.

The invention is further directed to a fluid composition suitable for use as an aircraft hydraulic fluid comprising a phosphate ester base stock. The base stock comprises between about 10% and about 100%, preferably between about 20% and about 99%, by weight of a trialkyl phosphate wherein the alkyl substituents are substantially $C_4$ or $C_5$, preferably isoalkyl $C_4$ or $C_5$ (namely, isobutyl or isopentyl), between about 0% and about 70% by weight of a dialkyl aryl phosphate wherein the alkyl substituents are substantially $C_4$ or $C_5$, preferably isoalkyl $C_4$ or $C_5$ (namely isobutyl or isopentyl), and between about 0% and about 25% by weight of an alkyl diaryl phosphate wherein the alkyl substituent is substantially $C_4$ or $C_5$, preferably isoalkyl $C_4$ or $C_5$ (namely isobutyl or isopentyl). The composition further comprises an acid scavenger in an amount effective to neutralize phosphoric acid partial esters formed in situ by hydrolysis of any of the phosphate esters of the base stock; an anti-erosion additive in an amount effective to inhibit flow-induced electrochemical or zeta corrosion of the flow metering edges of hydraulic servo valves in hydraulic systems; a viscosity index improver in an amount effective to cause the fluid composition to exhibit a viscosity index of at least about 3.0 centistokes at about 210° F., at least about 9.0 centistokes at about 100° F., and less than about 4200 centistokes at −65° F.; an antioxidant in an amount effective to inhibit oxidation of fluid composition components in the presence of oxygen; and a 4,5-dihydroimidazole compound in an amount effective to decrease by at least about 25% the rate of breakdown at 300° F. of phosphate triesters in the composition to phosphoric acid partial esters, as measured by epoxide depletion. The 4,5-dihydroimidazole compound corresponds to the formula

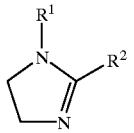

where $R^1$ is hydrogen, alkyl, alkenyl, hydroxyalkyl, hydroxyalkenyl, alkoxyalkyl or alkoxyalkenyl, and $R^2$ is alkyl, alkenyl or an aliphatic carboxylate. The invention is further directed to a fluid composition suitable for use as an aircraft hydraulic fluid comprising a fire resistant phosphate ester base stock. The base stock comprises between about 10% and about 100%, preferably between about 35% and about 99%, by weight of a trialkyl phosphate, between about 0% and about 35% by weight of a dialkyl aryl phosphate, and between about 0% and about 20% by weight of a triaryl phosphate. The alkyl substituents of the trialkyl phosphate and the dialkyl aryl phosphate contain between 3 and 8 carbon atoms, preferably between 4 and 8 carbon atoms, more preferably between 4 and 5 carbon atoms and are bonded to the phosphate moiety via a primary carbon. It is still further preferred that the alkyl substituents of the trialkyl phosphate and the dialkyl aryl phosphate are isoalkyl groups. The aryl substituents of the dialkyl aryl phosphate esters and the triaryl phosphate esters are typically phenyl, but may also be an alkyl-substituted phenyl (alkylphenyl) wherein the alkyl substituent is $C_1$ to $C_9$, preferably $C_3$ to $C_4$. Nonlimiting examples of the alkyl-substituted phenyl substituents include tolyl (also known as methylphenyl), ethylphenyl, isopropylphenyl, isobutylphenyl, tert-butylphenyl, and the like. The fluid composition further comprises an acid scavenger in an amount effective to neutralize phosphoric acid and phosphoric acid partial esters formed in situ by hydrolysis of any of the phosphate esters of the base stock, an anti-erosion additive in an amount effective to inhibit flow-induced electrochemical or zeta corrosion of the flow metering edges of hydraulic servo valves in hydraulic systems; a viscosity index improver in an amount effective to cause the fluid composition to exhibit a viscosity of at least about 3.0 centistokes at about 210° F., at least about 9.0 centistokes at about 100° F., and less than about 4200 centistokes at −65° F.; and an antioxidant in an amount effective to inhibit oxidation of fluid composition components in the presence of oxygen.

DESCRIPTION OF THE PREFERRED EMBODIMENTS

Figure 1:
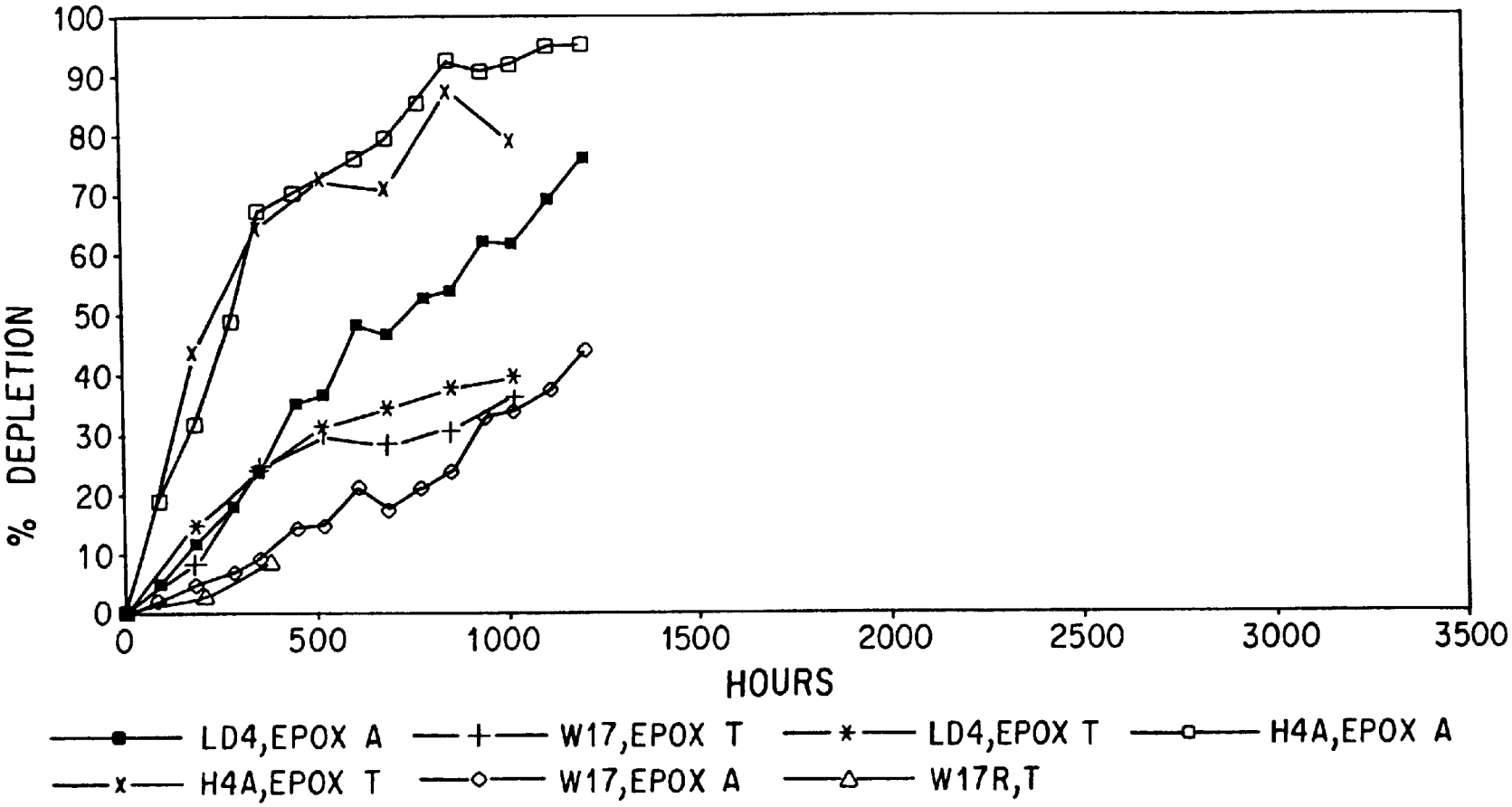
FIGS. 1 to 12 are plots of epoxide depletion versus time for hydraulic fluid formulations tested under varying conditions of temperatures, moisture content, and other parameters.

In accordance with the present invention, it has been discovered that a hydraulic fluid of improved thermal, hydrolytic, and oxidative stability is provided by utilizing a phosphate ester base stock which contains a high concentration of alkyl ester moieties and contains relatively small proportions of phenyl or other aryl esters.

The base stock comprises a mixture of trialkyl phosphate and dialkyl aryl phosphate, in each of which the alkyl substituents are $C_5$ to $C_8$, preferably $C_4$ to $C_8$, more preferably $C_4$ or $C_5$, and are bonded to the phosphate moiety via a primary carbon. It is still further preferred that the alkyl substituents of the trialkyl phosphate and the dialkyl aryl phosphate are isoalkyl groups. Optionally, the base stock further comprises a small proportion of alkyl diaryl phosphate wherein the alkyl substituent is as previously defined. Further advantages are realized if the alkyl substituents of the trialkyl phosphate, the dialkyl aryl phosphate, and the alkyl diaryl phosphate esters are primarily comprised of isoalkyl $C_4$ or $C_5$ (namely, isobutyl or isopentyl), in preference to the normal isomers thereof. In this preferred instance also, attachment of the alkyl substituent to the phosphate should be via a primary carbon atom.

In addition to the improved base stock, the composition of the invention preferably contains a combination of additives which further enhances the properties of the fluid as compared to fluids previously available in the art for use in the aircraft hydraulic systems. Moreover, it has been found that the additive combinations of this invention are effective in enhancing the properties of base stock compositions previously known in the art or otherwise differing from the preferred base stock of the functional fluids of this invention. But the most advantageous properties are realized using both the additive package and the base stock of the invention. This is particularly true where the alkyl substituents of the trialkyl phosphate, the dialkyl aryl phosphate, and the alkyl diaryl phosphate, especially the trialkyl phosphate and the dialkyl aryl phosphate, are isoalkyl $C_4$ or $C_5$ (namely, isobutyl or isopentyl).

In a preferred embodiment, the base stock is characterized by a very low alkyl diaryl phosphate ester content, preferably not more than about 5% by weight, more preferably not more than about 2% by weight. It is further preferred that the sum of the proportions of esters containing an aryl substituent, i.e., dialkyl aryl, alkyl diaryl, and triaryl phosphates, does not constitute more than about 25% by weight of the base stock.

More particularly, in a preferred embodiment, the base stock composition advantageously comprises between about 50% and about 85% by weight of a trialkyl phosphate wherein the alkyl substituents are substantially $C_4$ or $C_5$, preferably isoalkyl $C_4$ or $C_5$ (namely, isobutyl or isopentyl), between about 18% and about 35% by weight of a dialkyl aryl phosphate wherein the alkyl substituent is substantially $C_4$ or $C_5$, preferably isoalkyl $C_4$ or $C_5$ (namely, isobutyl or isopentyl), and from 0 to about 5% by weight of an alkyl diaryl phosphate wherein the alkyl substituent is substantially $C_4$ or $C_5$, preferably isoalkyl $C_4$ or $C_5$, (namely, isobutyl or isopentyl). Preferably the aryl substituents are phenyl and alkyl-substituted phenyl (alkylphenyl) wherein the alkyl substituent is $C_1$ to $C_9$, more preferably $C_3$ to $C_4$. Non-limiting examples of the alkyl-substituted phenyl include tolyl, ethylphenyl, isopropylphenyl, isobutylphenyl, tert-butylphenyl, and the like, with tert-butylphenyl generally being more preferred. As contrasted, for example, with Skydrol® LD-4 hydraulic fluid, which has a significantly higher diaryl (as diphenyl) ester content, the base stock of the functional fluid of the present invention exhibits significantly improved hydrolytic stability at temperatures substantially above 225° F. using the same acid scavenger system as that incorporated into LD-4. Using the same anti-oxidant additive as LD-4, a composition comprising the base stock of the present invention exhibits significantly enhanced thermal, oxidative, and hydrolytic stability. As a result of the relatively low diaryl ester content of the base stock, the functional fluid of the present invention has relatively low density, which is advantageous in aircraft hydraulic fluid applications.

In the preferred base stock of the present invention, it is particularly preferred that the alkyl substituents be isoalkyl $C_4$ or $C_5$ (namely, isobutyl or isopentyl), most preferably isoalkyl $C_4$ (isobutyl). It has been found that a base stock composition comprising triisobutyl phosphate or triisopentyl phosphate and diisobutyl phenyl phosphate or diisopentyl phenyl phosphate affords multiple advantages as compared to the same compositions in which the alkyl substituents are n-butyl or n-pentyl.

TABLE A

| | TBP | TIBP |
|---|---|---|
| Oral $LD_{50}$ | 1200 mg/kg | >5000 mg/kg |
| Dermal $LD_{50}$ | >10,000 mg/kg | >5000 mg/kg |
| Eye Irritation | Mildly irritating | Practically non-irritating |
| Skin Irritation | Severely irritating | Moderately irritating |
| Subchronic | | |
| Bladder Hyperplasia | In rats >1000 ppm<br>In rats >5000 ppm<br>NOEL 200 ppm | None observed<br><br>NOEL 5000 ppm |
| Hen Neurotox | Not neurotoxic<br>Tested at $LD_{50}$ = 1500 mg/kg | Not neurotoxic<br>Tested at $LD_{50}$ = >5000 mg/kg |
| Genotoxicity | Ames - negative<br>CHO/HGPRT - negative<br>in vitro cytogenetics - negative<br>in vivo cytogenetics - negative | Ames - negative<br>Mouse micronucleus - negative |

In addition, in the context of the present invention, the phosphate esters wherein the alkyl substituents attached to the phosphate moiety are isoalkyl $C_4$ or $C_5$ (namely, isobutyl or isopentyl) have further been found to exhibit hydrolytic stability superior to that exhibited by the corresponding normal alkyl phosphate esters at the high temperatures to which the hydraulic systems of high performance aircraft are exposed. The realization of this advantage occurs in the absence of any adverse effects upon seal integrity. That is, isobutyl and isopentyl esters maintain the same high level of seal integrity exhibited by normal alkyl phosphate esters. Or stated differently, the materials of which hydraulic system seals are commonly fabricated have been found to maintain a level of swelling when in contact with the isoalkyl esters that is equivalent to that experienced when in contact with the corresponding normal alkyl esters. Moreover, it has been found that the isobutyl and isopentyl esters are even lower density than the normal alkyl esters, which means that the weight of fluid in a given aircraft hydraulic system is lower, resulting in improved aircraft fuel efficiency.

In addition to the improved base stock, the composition of the invention preferably contains a combination of additives which further enhances the properties of the fluid as compared with fluids previously available in the art for use in aircraft hydraulic systems.

More particularly, the composition incorporates an acid scavenger in a proportion sufficient to neutralize phosphoric acid and phosphoric acid partial esters formed in situ by hydrolysis of components of the phosphate ester base stock under conditions of the service in which the hydraulic fluid composition is used. Preferably, the acid scavenger is a 3,4-epoxycyclohexane carboxylate composition of the type described in U.S. Pat. No. 3,723,320. Also useful are diepoxides such as those disclosed in U.S. Pat. No. 4,206,067 which contain two linked cyclohexane groups to each of which is fused an epoxide group. Such diepoxide compounds correspond to the formula:

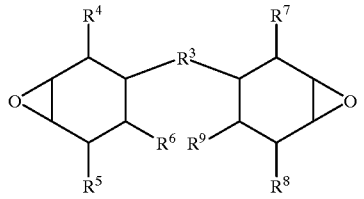

wherein $R^3$ is an organic group containing 1 to 10 carbon atoms, from 0 to 6 oxygen atoms and from 0 to 6 nitrogen atoms, and $R^4$ through $R^9$ are independently selected from among hydrogen and aliphatic groups containing 1 to 5 carbon atoms. Exemplary diepoxides include 3,4-epoxycyclohexylmethyl-3,4-epoxycyclohexane, bis (3,4-epoxy-6-methylcyclohexylmethyl adipate), 2-(3,4epoxycyclohexyl)-5,5-spiro(3,4-epoxy)cyclohexane-m-dioxane. The concentration of the acid scavenger in the fluid composition is preferably between about 1.5% and about 10%, more preferably between about 2% and about 8% by weight, which is generally sufficient to maintain the hydraulic fluid in a serviceable condition for up to approximately 3000 hours of aircraft operation.

To limit the effect of temperature on viscosity, the composition further includes a polymeric viscosity index improver. Preferably, the viscosity index improver comprises a poly(alkyl methacrylate) ester of the type described in U.S. Pat. No. 3,718,596. Generally, the viscosity index improver is of high molecular weight, having a number average molecular weight of between about 50,000 and about 100,000 and a weight average molecular weight of between about 200,000 and about 300,000. Preferably, the viscosity index improver of the invention has a relatively narrow range of molecular weight, approximately 95% by weight of the viscosity index improver component having a molecular weight of between about 50,000 and about 1,500,000. This result is achieved in part by utilization of predominantly butyl and hexyl methacrylate esters. The viscosity index improver is present in a proportion sufficient to impart a kinematic viscosity of: at least about 3.0, preferably between about 3 and about 5 centistokes at 210° F.; at least about 9, preferably between about 9 and about 15 centistokes at 100° F.; and not more than about 4200 centistokes at −65° F. Superior shear stability characteristics are also imparted by the viscosity index improver used in the composition. Preferably the fluid composition contains between about 3% and about 10% by weight of the viscosity index improver. Nonlimiting particularly preferred viscosity index improvers are those sold under the trade designations PA6703, PA6477, and PA6961-PMN by Rohm and Haas Company. The viscosity index improver, as previously noted in the Summary of the Invention, is conveniently provided in the form of a solution in a phosphate ester solvent, preferably a trialkyl phosphate ester such as tributyl or triisobutyl phosphate, or a combination of alkyl and phenyl derivatives. The proportions referred to above for the viscosity index improver are on a solids (methacrylate polymer) basis. The phosphate ester solvent becomes in effect part of the base stock, and the ranges of proportions of phosphate esters, as discussed above, reflect the phosphate ester added as a vehicle for the viscosity index improver.

An anti-erosion agent is incorporated in an amount effective to inhibit flow-induced electrochemical corrosion, more precisely referred to as zeta corrosion. The anti-erosion additive is preferably an alkali metal salt, more preferably a potassium salt of a perfluoroalkylsulfonic acid. Such anti-erosion additives are more fully described in U.S. Pat. No. 3,679,587. Typically, the alkyl component comprises hexyl, heptyl, octyl, nonyl, decyl, or mixtures thereof, with perfluorooctyl generally affording the best properties. It is particularly preferred that the anti-erosion agent predominantly comprises the potassium salt of perfluorooctylsulfonic acid in a proportion of between about 250 and about 1000 most preferably at least about 500 ppm. In the operation of an aircraft hydraulic fluid system, the sulfonic acid moiety of the anti-erosion agent tends to lower the surface tension of the hydraulic fluid and thereby better cover the metal surfaces with which the hydraulic fluid normally comes in contact. The metering edges of servo valves are generally the most important metal parts which need protection from electrochemical corrosion. Positive ions in the fluid, including the alkali metal ion of the anti-erosion agent, are adsorbed onto the metal surface and neutralize the negative charges on the metal that are otherwise created by the rapid flow of the hydraulic fluid over the servo valve metering edges. Enhanced erosion resistance is provided in the composition of the invention, which preferably contains a perfluoroalkylsulfonic salt content about twice that of the prior art composition sold as LD4.

Limiting the diaryl ester content of the base stock contributes to thermal, oxidative, and hydrolytic stability of the fluid. The composition of the invention also contains a combination of antioxidant additives, preferably including both a hindered phenol and a hindered polyphenol. Hydrolytic stability has been found to be improved by partially substituting the hindered polyphenol for the phenol, and it is thus preferred that the composition contain not more than about 1.0%, preferably not more than about 0.7% by weight of a phenol such as a 2,4,6-trialkylphenol. It is generally preferred that the composition contain between about 0.1% and about 0.7% of a 2,4,6-trialkylphenol, preferably 2,6-di-tertiary-butyl-p-cresol [also written as 2,6di-tert-butyl-p-cresol or 2,6-di-t-butyl-p-cresol ("Ionol")]. The composition should further include between about 0.3% and about 1% of a hindered polyphenol compound, such as a bis(3,5-dialkyl-4-hydroxyaryl) methane, for example, the bis(3,5-di-tert-butyl-4-hydroxyphenyl)methane sold under the trade designation Ethanox® 702 by the Ethyl Corp., a 1,3,5-trialkyl-2,4,6-tris(3,5 -dialkyl-4-hydroxyaryl) aromatic compound, for example, the 1,3,5-trimethyl-2,4,6 -tris(3,5-di-tert-butyl-4-hydroxyphenyl)benzene sold under the trade designation Ethanox® 330 by the Ethyl Corp., or mixtures thereof. The composition may also include an amine antioxidant, preferably a diarylamine such as, for example, phenyl-α-napthylamine or alkylphenyl-α-naphthylamine, or the reaction product of N-phenylbenzylamine with 2,4,4-trimethylpentene sold under the trade designation Irganox® L-57 by Ciba-Geigy; diphenylamine, ditolylamine, phenyl tolylamine, 4,4'-diaminodiphenylamine, di-p-methoxydiphenylamine, or 4-cyclohexylaminodiphenylamine; a carbazole compound such as N-methylcarbazole, N-ethylcarbazole, or 3-hydroxycarbazole; an aminophenol such a N-butylaminophenol, N-methyl-N-amylaminophenol, or N-isooctyl-p-amino-phenol; an aminodiphenylalkane such as amino-diphenylmethanes, 4,4'-diaminodiphenylmethane, etc., aminodiphenylethers; aminodiphenyl thioethers; aryl substituted alkylenediamines such as 1,2-di-o-toluidoethane, 1,2-dianilinoethane, or 1,2-dianilinopropane; aminobiphenyls, such as 5-hydroxy-2-aminobiphenyl, etc.; the reaction product of an aldehyde or ketone with an amine such as the reaction product of acetone and diphenylamine; the reaction product of a complex diarylamine and a ketone or aldehyde; a morpholine such as N-(p-hydroxyphenyl) morpholine, etc., an amidine such as N,N'-bis-(hydroxyphenyl)acetamidine or the like; an acridan such as 9,9'-dimethylacridan, a phenathiazine such as phenathiazine, 3,7-dibutylphenathiazine or 6,6-dioctylphenathiazine, a cyclohexylamine, or mixtures thereof. An alkyl substituted diphenylamine such as di(p-octylphenyl) amine is preferred. Certain amine components can also act as a lubricating additive. The amine antioxidant is also preferably present in a proportion of between about 0.3 and about 1% by weight. By maintaining the Ionol content of the fluid composition below 1.0%, preferably below 0.7%, and more preferably below 0.5% by weight,-toxicity of the composition is even lower than that of Skydrol® LD-4 hydraulic fluid.

As a copper corrosion inhibitor, the composition of the invention preferably includes a benzotriazole derivative, such as that sold under the trade designation Petrolite 57068. This corrosion inhibitor is present in an amount sufficient to deactivate metal surfaces in contact with the fluid composition against the formation of metal oxides on the metal surfaces in contact with the fluid, thereby reducing rates of copper dissolution into the hydraulic fluid, and also reducing dissolution of perhaps parts fabricated from copper alloys. Advantageously, the composition contains between about 0.005% and about 0.09% by weight of the benzotriazole derivative, preferably between about 0.02 and about 0.07% by weight.

Phosphate ester functional fluids are known to corrode iron alloys as well as copper alloys. Numerous iron corrosion inhibitors are available for use in functional fluids, but these are known in many instances to increase rates of erosion and thus have a net deleterious effect on the performance properties of the hydraulic fluid. However, in accordance with the invention, it has been discovered that certain 4,5-dihydroimidazole compounds are effective iron corrosion inhibitors, yet do not adversely affect the erosion properties of the fluid. Useful 4,5-dihydroimidazole compounds include those which correspond to the structural formula

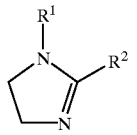

where $R^1$ is hydrogen, alkyl, alkenyl, hydroxyalkyl, hydroxyalkenyl, alkoxyalkyl or alkoxyalkenyl, and $R^2$ is alkyl, alkenyl or an aliphatic carboxylate. Exemplary groups which may constitute $R^1$ include hydrogen, methyl, ethyl, propyl, butyl, pentyl, octyl, vinyl, propenyl, octenyl, hexenyl, hydroxyethyl, hydroxyhexyl, methoxypropyl, propoxyethyl, butoxypropenyl, etc. Exemplary group, which may constitute $R^2$ include, octyl, dodecyl, hexadecyl, heptadecenyl, or a fatty acid substituent such as 8-carboxyoctyl, 12-carboxydodecyl, 16-carboxyhexadecenyl, or 18-carboxyoctadecyl. In a particularly effective embodiment, $R^1$ is hydrogen or lower alkyl and $R^2$ is a fatty acid residue containing at least about 9 carbon atoms, i.e., —$C_8$—COOH to —$C_{18}$ COOH, preferably $C_{16}$—$C_{18}$—COOH. In another preferred embodiment, $R^1$ is a lower hydroxyalkyl and $R^2$ is a $C_8$—$C_{18}$ alkenyl. In the latter instance, however, the most satisfactory inhibition of Fe corrosion is realized only if the 4,5-dihydro-imidazole is used in combination with an amino acid derivative, more particularly an N-substituted amino acid in which the N-substituent contains both polar and oleophilic moieties, for example, an N-alkyl-N-oxo-alkenyl amino acid.

It has further and unexpectedly been discovered that the presence of such a 4,5-dihydroimidazole compound, typically in a proportion of between about 0.01% and about 0.1% by weight, not only inhibits iron corrosion but contributes markedly to the stability of the functional fluid as indicated by epoxide depletion.

It has been found that the salutary effect of the 4,5-dihydroimidazole compound is enhanced if it is used in combination with a phenolic antioxidant, especially a complex hindered polyphenol such as a bis(3,5-dialkyl-4-hydroxyaryl)methane or a 1,3,5-trialkyl-2,4,6-tris(3,5-di-tert-butyl-4-hydroxyaryl)benzene. Exemplary of such complex hindered polyphenol compounds, respectively, are bis(3,5-di-tert-butyl-4-hydroxyphenyl)methane and 1,3,5-trimethyl-2,4,6-tris(3,5-di-tert-butyl-4-hydroxyphenyl) benzene. Optimal effect on stability has been observed using a combination of the condensation product of 4,5-dihydro-1H-imidazole and $C_{16}$–$C_{18}$ fatty acid (sold under the trade designation Vanlube RI-G by the Vanderbilt Co.) with a hindered polyphenol and an alkyl substituted diarylamine such as di(p-octylphenyl)amine. Also effective as a 4,5-dihydroimidazole compound in such combination is 2-(8-heptadecenyl)-4,5-dihydro-1H-imidazole-1-ethanol (sold under the trade designation Amine-O by Ciba-Geigy) To function as an iron corrosion inhibitor, the latter compound should be used in combination with an amino acid derivative such as. e.g., the N-methyl-N-(1-oxo-9-octadecenyl)glycine sold under the trade designation Sarkosyl®-O by Ciba-Geigy Corporation.

It has been found that a still further enhancement in high temperature stability is realized where the 4,5-dihydroimidazole compound is used in combination with a phosphate ester base stock in which the alkyl substituents attached to the phosphate moiety are substantially isoalkyl $C_4$ or $C_5$ (namely, isobutyl or isopentyl).

Although they have not been found to produce the substantial advantageous effect on high temperature stability that is afforded by the use of an a 4,5-dihydroimidazole compound, other iron corrosion inhibitors have been found effective in the functional fluid of the invention without adverse effect on erosion characteristics. Acceptable iron corrosion inhibitors include, for example, the product sold by Petrolite under the trade designation Petrolite P-31001.

As necessary, the fluid composition may also contain an anti-foaming agent. Preferably, this is a silicone fluid, more preferably a polyalkylsiloxane, for example, the polymethylsiloxane sold under the trade designation DC 200 by Dow Corning. Preferably the anti-foam agent is included in a proportion sufficient to inhibit foam formation under the test conditions of ASTM method 892. Typically, the anti-foam content of the composition is at least about 0.0005% by weight, typically about 0.0001% to about 0.001% by weight.

Preferably, the pH of the composition of the invention is at least about 7.5, more preferably between about 7.5 and about 9.0. To impart a pH in this range and to enhance the acid scavenging capacity of the formulation, the composition may further include between about 0.0035 and about 0.10%, preferably between about 0.01% and about 0.1% by weight, most preferably between about 0.02% and about 0.07% of an alkali metal phenate or other arenate. Potassium phenate is preferred. In addition to neutralizing acidic components of the composition, the alkali metal arenate serves to pacify the metal surfaces when the composition has been added to a hydraulic system, thereby reducing corrosion.

Although optimal properties are realized in a composition of low alkyl diaryl phosphate content and particularly in compositions using the base stock of the invention as described above, the additive combination of the invention also affords beneficial results when used in combination with any of a variety of base stock compositions known to the art. The benefit of using esters whose alkyl substituents are predominantly comprised of isoalkyl $C_4$ or $C_5$ (namely isobutyl or isopentyl) also extends beyond the preferred concentration ranges outlined above. Broadly, the additive combination can be used with an organophosphate ester base stock comprising between about 10% and about 100%, preferably between about 10% and about 99%, by weight of a trialkyl phosphate wherein the alkyl substituents are substantially $C_4$ or $C_5$ (namely, butyl or pentyl), preferably isoalkyl $C_4$ or $C_5$ (namely, isobutyl or isopentyl), between about 0% and about 70% by weight of a dialkyl aryl phosphate wherein the alkyl substituents are substantially $C_4$ or $C_5$ (namely, butyl or pentyl), preferably isoalkyl $C_4$ or $C_5$ (namely, isobutyl or isopentyl), and between about 0% and about 25% by weight of an alkyl diaryl phosphate wherein the alkyl substituents are substantially $C_4$ or $C_5$ (namely, butyl or pentyl), preferably isoalkyl $C_4$ or $C_5$ (namely, isobutyl or isopentyl). In a preferred embodiment, the additive combination is used with a base stock comprising between about 10% and about 100%, preferably between about 35% and about 99%, by weight of a tributyl or tripentyl phosphate, more preferably triisobutyl or triisopentyl phosphate, between about 0% and about 35% by weight of a dibutyl aryl or dipentyl aryl phosphate, more preferably diisobutyl aryl or diisopentyl aryl phosphate, and between about 0% and about 20% by weight of a triaryl phosphate, and between about 0% and about 20% by weight of a triaryl phosphate. The additive combination is also effective in combination with other ranges of base stock compositions as set forth below:

TABLE 1

| | Base Stock, Weight % | | | | |
|---|---|---|---|---|---|
| Phosphate Ester | I | II | III | IV | V |
| Tri ($C_4$/$C_5$ alkyl)[1] | 10–72 | 10–25 | 50–72 | 80–99 | 50–72 |
| Di ($C_4$/$C_5$ alkyl)[1] Aryl | 18–70 | 45–70 | 18–75 | | 18–75 |
| $C_4$/$C_5$ Alkyl[1] Diaryl | 0–25 | 5–25 | 0–10 | | 0–10 |
| Triaryl | | | | 1–20 | 0–10 |

[1]In a preferred embodiment, the alkyl substituents are isoalkyl $C_4$ or $C_5$ As discussed hereinabove, optimal properties are achieved by combining the preferred isoalkyl $C_4$ or $C_5$ (namely, isobutyl or isopentyl) phosphate ester base stock with the additive combination of the invention. However, significant benefits in lower toxicity, lower density, hydrolytic stability, oxidative stability, and thermal stability are afforded by the use of the isoalkyl esters with other additive combinations as well, while, at the same time, maintaining a level of seal integrity equivalent to that experienced by the corresponding normal alkyl phosphate esters. In a preferred embodiment, the isoalkyl $C_4$ or $C_5$ phosphate ester base stock contains between about 10% and 100%, preferably between about 50% and about 85%, by weight of a trialkyl phosphate wherein the alkyl substituents are substantially isoalkyl $C_4$ or $C_5$ (namely, isobutyl or isopentyl), between about 18% and about 35% by weight of a dialkyl aryl phosphate wherein the alkyl substituents are substantially isoalkyl $C_4$ or $C_5$ (namely, isobutyl or isopentyl), and between about 0% and about 10% by weight, preferably between about 0% and about 5% by weight, of an alkyl diaryl phosphate wherein the alkyl substituents are substantially isoalkyl $C_4$ or $C_5$ (namely, isobutyl or isopentyl). However, the benefits of using the isoalkyl substituents are so substantial that they are realized to a significant extent over a considerably broader range of composition. Generally, therefore, a base stock which utilizes isoalkyl esters may comprise 100%, preferably between about 10% and about 90%, by weight of a triisobutyl or triisopentyl phosphate, between about 0% and about 70% by weight of a diisobutyl or diisopentyl aryl phosphate and between about 0% and about 25% by weight of an alkyl diaryl phosphate. Preferably, the alkyl substituent of the alkyl diaryl phosphate is also isobutyl or isopentyl, especially when the alkyl diaryl phosphate content exceeds about 5%. The aryl substituents of these esters are typically phenyl, but may also be an alkyl-substituted phenyl (alkylphenyl) wherein the alkyl substituent is $C_1$ to $C_9$, preferably $C_3$ to $C_4$. Nonlimiting examples of the alkyl-substituted phenyl substituents include tolyl (also known as methylphenyl), ethylphenyl, isopropylphenyl, isobutylphenyl, tert-butylphenyl, and the like.

The isoalkyl base stock should be combined with an acid scavenger in an amount effective to neutralize phosphoric acid or phosphoric acid partial esters formed in situ by hydrolysis of any of the phosphate esters of the base stock. The acid scavengers described above are preferred but other acid scavengers known to the art may be used. The isoalkyl based functional fluids should also contain an antierosion additive in an amount effective to inhibit flow induced electrochemical corrosion of flow metering edges of hydraulic servo valves in hydraulic systems. These fluids should also contain a viscosity index improver in an amount effective to cause the fluid composition to exhibit the viscosity index stated above. The composition should further include an antioxidant in an amount effective to inhibit oxidation of the fluid composition components in the presence of oxidizing agents. Preferably, the ant-erosion agent, viscosity index improver, and antioxidant composition are as described above, but the benefits of the use of an isoalkyl base stock are also realized with other additive combinations known to the art.

Methods known to those skilled in the art may be used for the preparation of the compositions of the invention. For example, a base stock comprising the phosphate esters may be prepared by mixing in an agitated stainless steel vessel. Additives may then be blended into the base stock in the same vessel. As noted above, the viscosity index improver is preferably added in the form of a solution in a phosphate ester solvent.

At temperatures above 200° F., the more preferred functional fluid compositions of the invention exhibit thermal, oxidative, and hydrolytic stability two to three times greater than that of Skydrol® LD-4 hydraulic fluid as measured by the depletion of epoxide acid scavenger as a function of time. Superior stability is exhibited even in the presence of halogen-containing compounds such as trichloroethane. When a 4,5-dihydroimidazole compound is included, the extent of improvement is even greater. As a result of the relatively low phenyl ester content, the composition of the invention has a density of less than one gram per cc, typically between about 0.97 and about 0.99 grams per cc. This is a desirable feature from the standpoint of fuel burn (consumption) in aircraft.

Shear stability of the fluid composition also compares favorably with commercially available aircraft hydraulic fluids. Thus, for example, after 500 hour exposure to an accelerated degradation test in a typical aircraft hydraulic pump system, the viscosity of the composition at −65° drops only from 4000 to 2400. In part, this advantage is believed to result from the narrower range of molecular weight of the viscosity index improver. Exposure to shear conditions tends to degrade higher molecular weight viscosity index improvers, so that compositions in which the molecular weight of the viscosity index improver is distributed over a broad range tend to suffer a greater loss of effectiveness over time due to breakdown of the higher molecular weight species.

In part due to the relatively low concentration of 2,6-di-tert-butyl-p-cresol, the toxicity of the fluid composition in the invention is very low. Where an isoalkyl ester base stock is used, toxicity is even lower.

The following examples illustrate the invention.

EXAMPLE 1

A hydraulic fluid having the composition set forth in Table 1 was prepared by mixing at ambient temperature in a 50 gallon stainless steel tank agitated with a 25 horsepower agitator having an anchor type impeller. The phosphate ester components were introduced into the tank first and, after a 30 minute period of initial mixing, the other additives were added in the sequence indicated in Table 2.

TABLE 2

| Component | Basis: 100 Gram Batch Grams | Basis: 80 Gallon Batch Grams/Pounds |
|---|---|---|
| Tributyl Phosphate, Neat | 49.0135 | 148,216.8/326.8 |
| Dibutyl Phenyl Phosphate of Low Diphenyl Content (Less Than 2% By Weight) | 26.43 | 79,652.2/175.6DRUM 2(−220#) |
| Methacrylate Ester Viscosity Index Improver (PA6477, 45.3% solids in 54.7% tributyl phosphate) | 16.56 | 50,077/110.4 22684.9 gSLDS |
| 3,4 Epoxycyclohexane Carboxylate | 6.3 | 19,051/42 |
| FC98 [Potassium Perfluorooctylsulfonate (FC98)] | .05 | 151.2/ |
| Benzotriazole type Copper Corrosion Inhibitor (P57068, Petrolite (50% Active), EX1663 | .05 | 151.2/ |
| Iron Corrosion Inhibitor (90-31001, Petrolite (50% Active) | .05 | 151.2/ |
| Dye | .001 | 3.204/ |
| Potassium Phenate | .035 | 105.84/ |
| *Bis-(3,5-di-tert-butyl 4-hydroxyphenyl) methane (Ethanox ® 702)* | *0.90* | *2,722/6* |
| Di(p-octylphenyl)amine | 0.45 | 1,361/3 |

TABLE 2-continued

| Component | Basis: 100 Gram Batch Grams | Basis: 80 Gallon Batch Grams/Pounds |
|---|---|---|
| 2,6-Di-tert-butyl-p-cresol | 0.25 | 756/1.667 |
| Antifoam (Dow-Corning) | 0.0005 | 1.512/ |

This composition had a density of 0.996 g/cc at a temperature of 25° C. Of the source of dibutyl phenyl phosphate, 77.135% by weight was dibutyl phenyl phosphate or butyl diphenyl phosphate, so that 20.3% by weight of the overall composition was constituted of phosphate esters containing a phenyl moiety. However, the butyl diphenyl phosphate content was less than 1% by weight. Triphenyl phosphate content was essentially nil.

EXAMPLE 2

A second aircraft hydraulic fluid composition was prepared in the manner generally described in Example 1. The composition of this fluid is set forth in Table 3.

TABLE 3

| Component | Basis: 100 Gram Batch Grams | Basis: 80 Gallon Batch Grams/Pounds |
|---|---|---|
| Tributyl Phosphate | 50.5988 | 152,999.3/337.3 |
| Dibutyl Phenyl Phosphate of Low Diphenyl Content (Less Than 2% By Weight) | 24.0947 | 72,862.3/106.63 |
| Methacrylate Ester Viscosity Index Improver (PA6477, 43.8% solids/56.2% tributyl phosphate) | | 22,684.9 gSLDS Total |
| 3,4 Epoxycyclohexane Carboxylate | 6.3 | 19,051/42 |
| *FC98*[Potassium Perfluorooctylsulfonate (FC98)] | .05 | 151.2/ |
| Benzotriazole Type Copper Corrosion Inhibitor (P57068, Petrolite; (50% Active) | .05 | 151.2/ |
| Iron Corrosion Inhibitor (90-31001, Petrolite (50% Active), EX1663 | .05 | 151.2/ |
| Dye | .001 | 3.024/ |
| Potassium Phenate | .035 | 105.84/ |
| *Bis-(3,5-di-tert-butyl 4-hydroxyphenyl) methane (Ethanox ® 702)* | *0.90* | *2,722/6* |
| Di(p-octylphenyl)amine | .45 | 1,361/3 |
| Dow-Corning Antifoam | .0005 | 1,512/ |
| 2,6-Di-tert-butyl-p-cresol | .25 | 756/1.667 |

This composition also exhibited a density of 0.996 g/cc at a temperature of 25° C. Of the source of dibutyl phenyl phosphate, 84.751% by weight was constituted of esters which contained no phenyl moiety. The overall composition contained 20.3% by weight of phosphate esters having a phenyl moiety, but less than 1% by weight butyl diphenyl phosphate and essentially no triphenyl phosphate.

Set forth in Table 4 are a partial elemental analysis and measured physical properties of the compositions of Examples 1 and 2. These data establish that the fluid composition of Examples 1 and 2 meet or exceed the airframe manufacturers' specification, for properties needed to qualify a product for use as an aircraft hydraulic fluid.

TABLE 4

| | BATCH 1 | BATCH 2 |
|---|---|---|
| COLOR | PASS | PASS |
| CHLORINE, PPM | 20 | 21 |
| K+ | 106 | 99 |
| S | 57 | 83 |
| Ca | <1 | <1 |
| Na | 1.4 | 1.5 |
| SP.G. | .9972 | .9975 |
| VISC. 210 F. CST | 4.75 | 4.81 |
| 100 | 13.65 | 13.91 |
| −65 | 1635 | 1628 |
| MOISTURE | .10 | .12 |
| NEUT NO | .01 | .02 |
| POUR PT. ° F. | <−80 | <−80 |
| AIT. F | 850 | 920 |
| FLASH PT. | 350 | 360 |
| FIRE PT. | 360 | 390 |
| CONDUCTIVITY | .65 | .55 |
| OXIRANE NO. | .39 | .40 |
| FOAM SEQ 1 | 170/65 | 180/20 |
| 2 | 30/10 | 40/44 |
| 3 | 80/35 | 140/56 |
| PARTICLE COUNT 5–15 | 7247 | 3116 |
| 15–25 | 1444 | 513 |
| 25–50 | 460 | 180 |
| 50–100 | 75 | 53 |
| >100 | 14 | 10 |
| SILTING INDEX | 1.18 | 1.05 |

EXAMPLE 3

Tests were conducted comparing the thermal, oxidative and hydrolytic stability of the hydraulic fluid compositions of Examples 1 and 2 with commercially available hydraulic fluids. In each of these tests, a 301 stainless steel tube was filled to 80% capacity with the fluid to be tested. The temperature was maintained constant in each test. Comparative tests were run at 50° F. and 275° F., and further tests of the composition of the invention were run at 300° F. In all tests, five corrosion coupons were immersed in the fluid.

In some of the tests, the head space in the tube was filled with air, in others it was filled with nitrogen. After each tube was filled with the appropriate test composition, it was capped and heated to a predetermined test temperature and maintained at that temperature so that hydrolytic stability at such temperature could be determined. Each tube was monitored over time and samples were taken to follow trends in the fluid's chemical composition, in particular the concentration of the acid scavenger (epoxide) present in the sample. When the epoxide is 100% depleted, the fluid is typically degraded to the point that its usefulness as an aircraft hydraulic fluid has essentially been exhausted. As epoxide depletion approached 100%, test specimens were titrated for acidity. When the neutralization number of the fluid reached 1.5 or greater, the test was halted.

Figure 2:
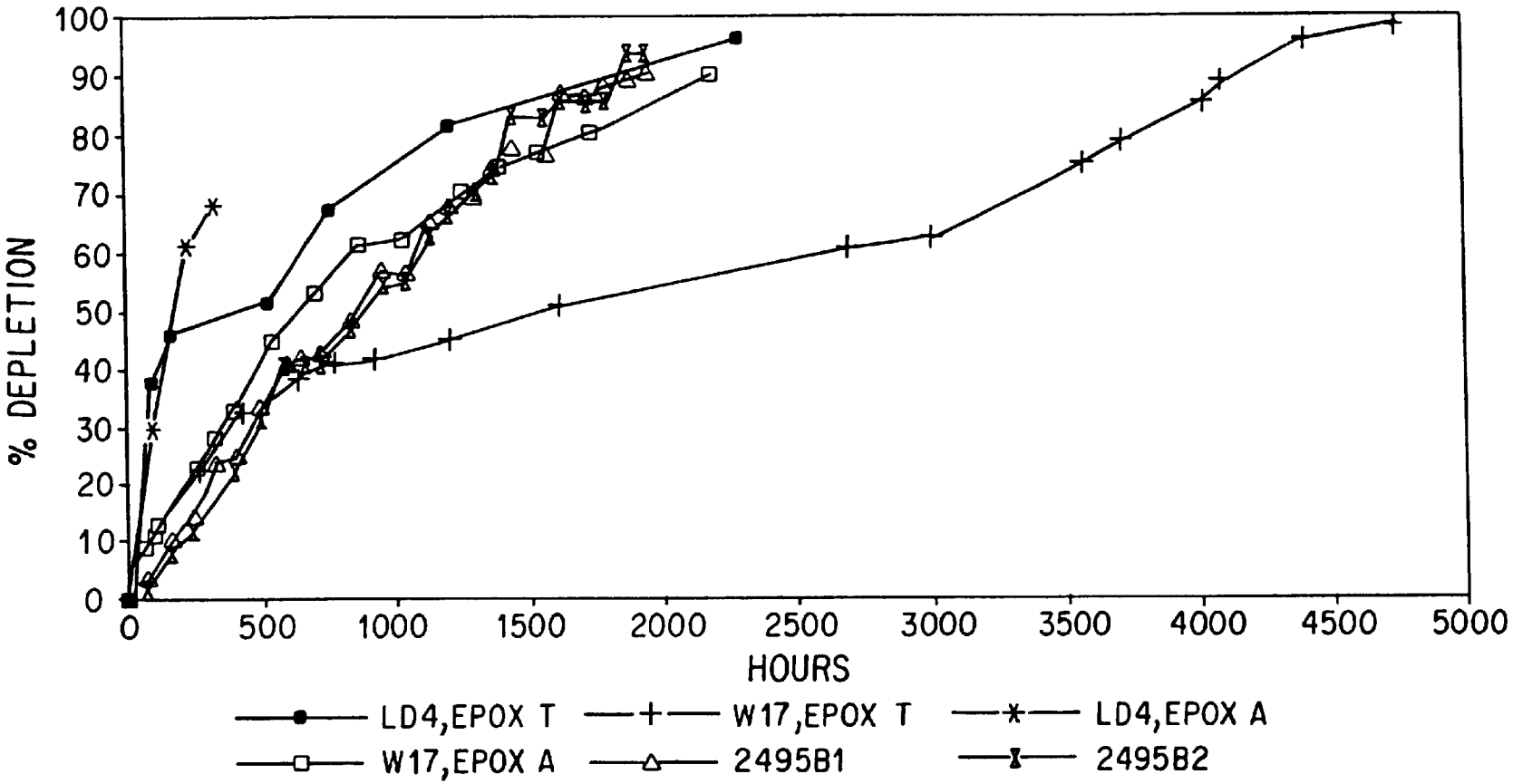
Figure 3:
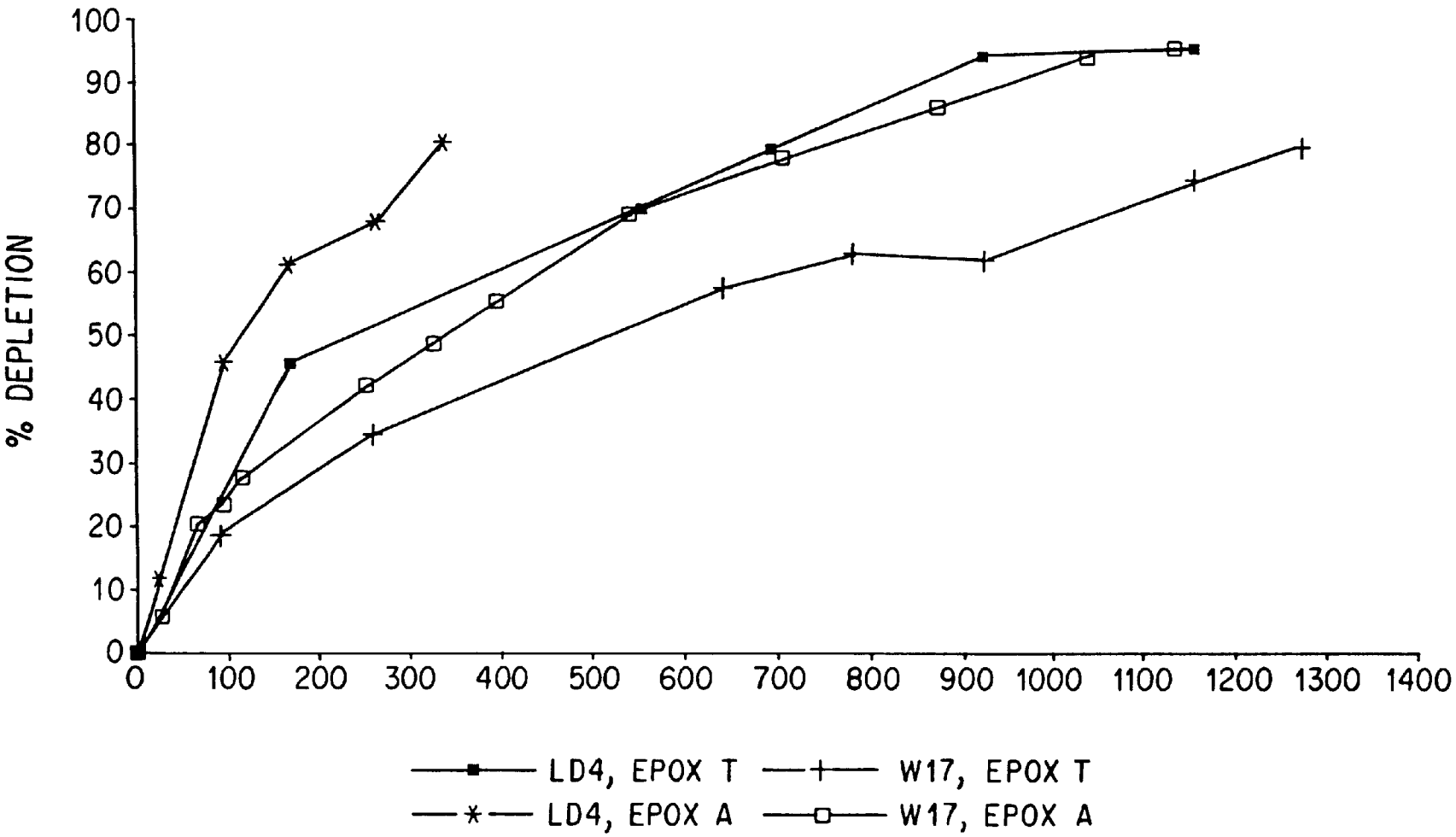

Illustrated in FIGS. 1 to 3 are epoxide depletion curves for the compositions of the invention as compared to previously available aircraft hydraulic fluids. In these curves, and in those relating to the further examples set forth below, the legends "W17" and "W17R" designate a composition of Table 1 or 2 above. "2495B1" refers specifically to the composition of Table 1, and "2495B2" to the composition of Table 2. "H4A" refers to commercial hydraulic fluid sold by Chevron under the trade designation "Hyjet IVA®." "Epox A" means that the test was run with air in the head space of the stainless steel tube, so that the test specimen was exposed to thermal, hydrolytic, and oxidative effects. "Epox T" means that the head space contained nitrogen, so that the test primarily measured thermal hydrolytic effects only.

EXAMPLE 4

Figure 4:
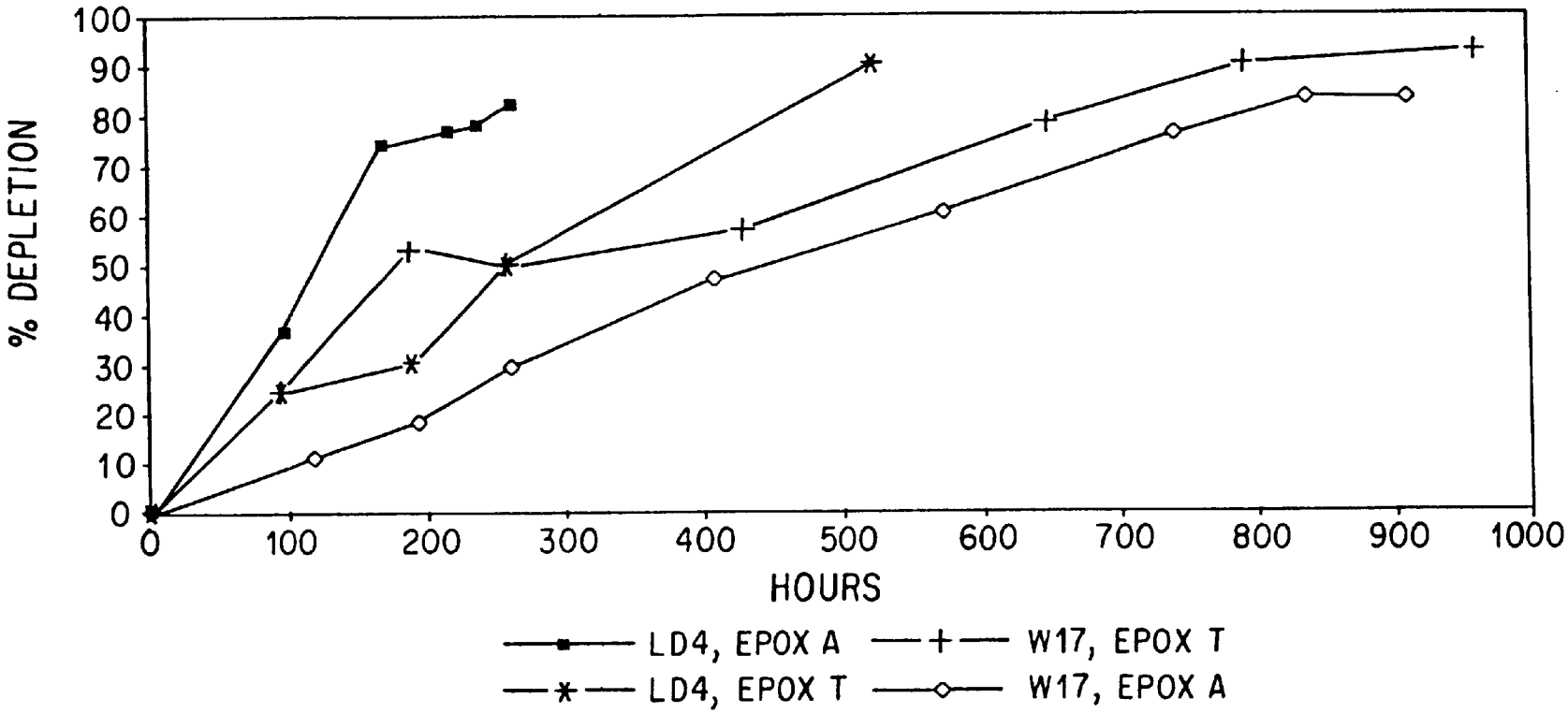
Figure 5:
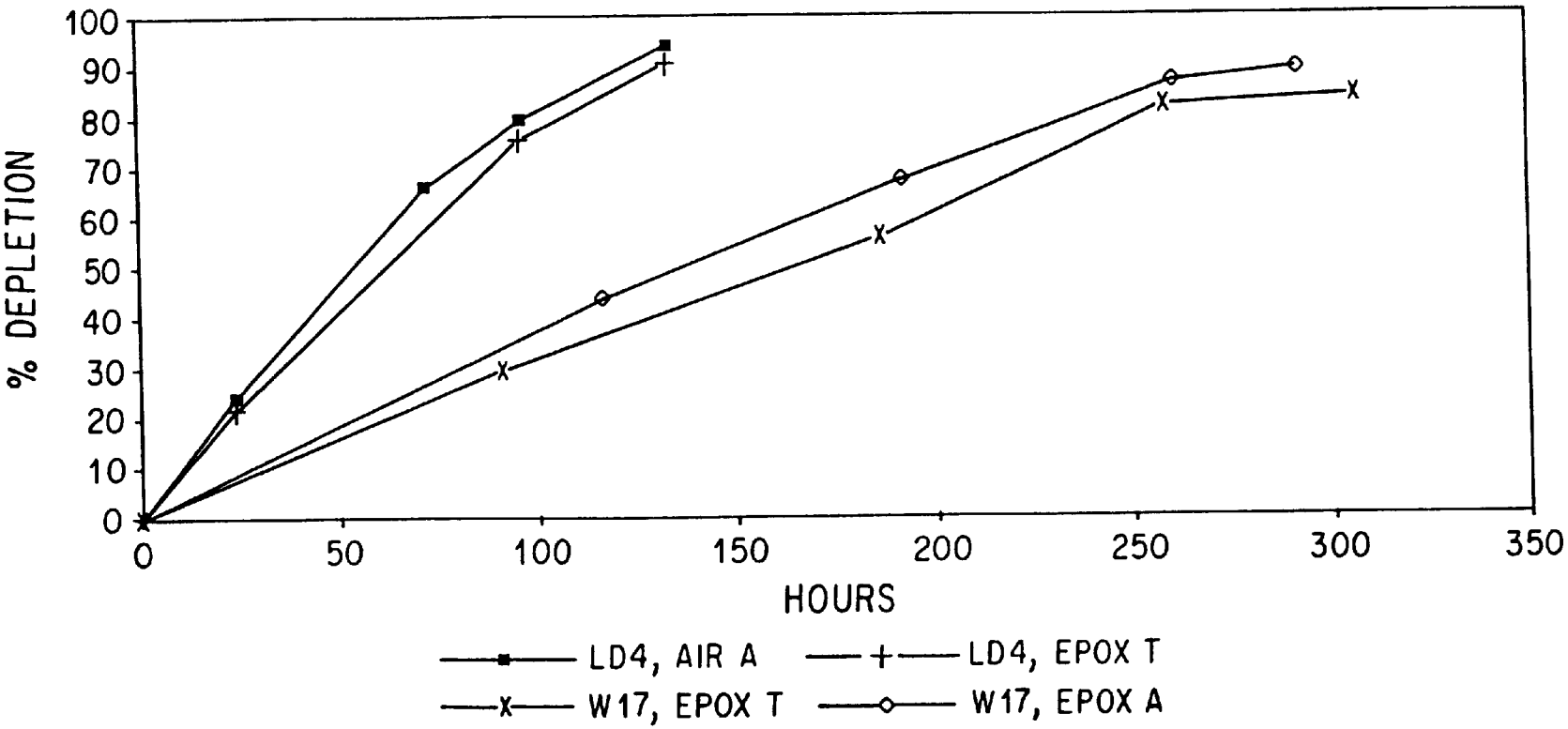

Further thermal, hydrolytic, and oxidative stability tests were conducted on the compositions of Example 1 and 2. These tests were carried out generally in the manner described in Example 3, except that 0.5% moisture was incorporated in the test samples to determine the effect of moisture on thermal stability. Test temperatures were 250° F. and 275° F. The results of these tests are plotted in FIGS. 4 and 5.

EXAMPLE 5

Figure 6:
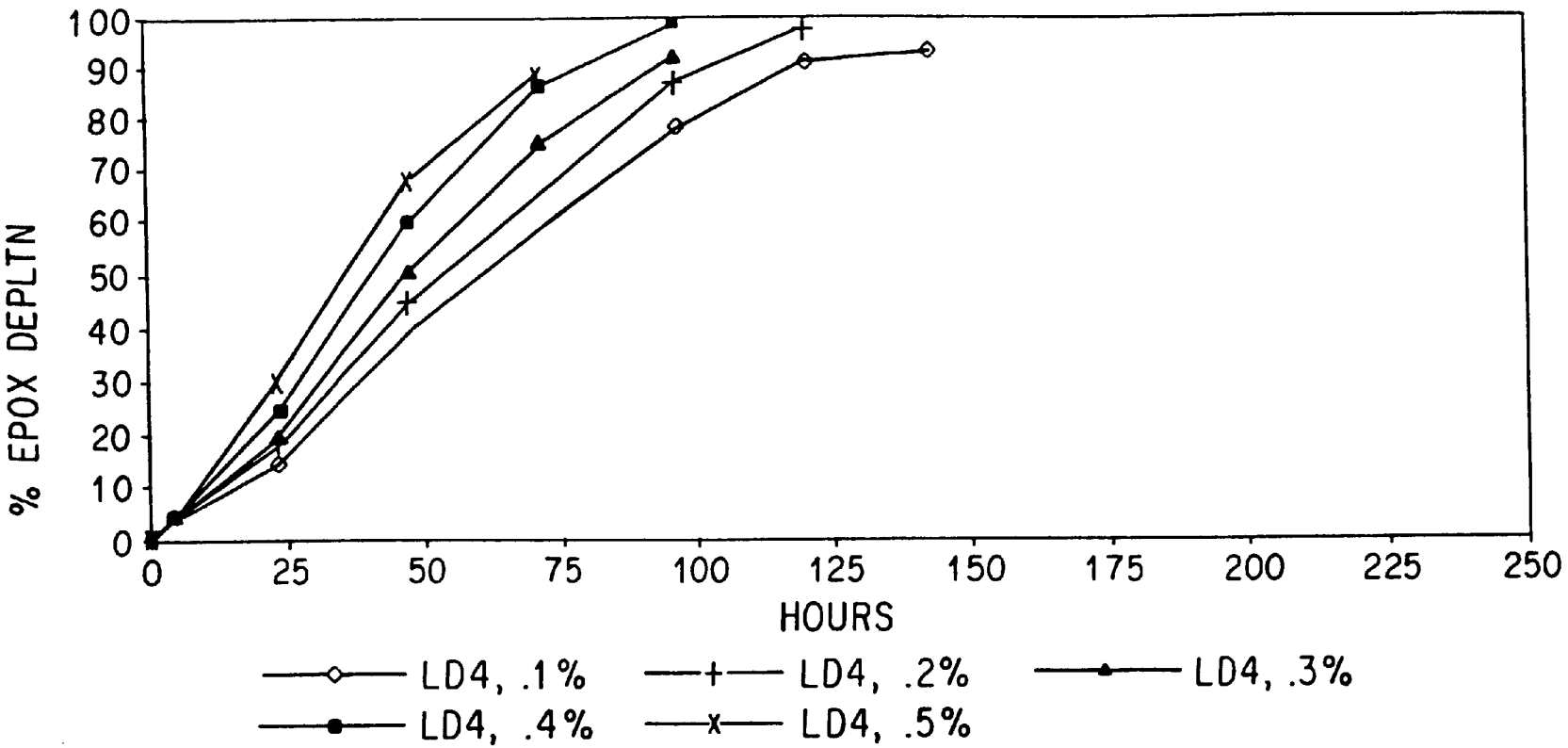
Figure 7:
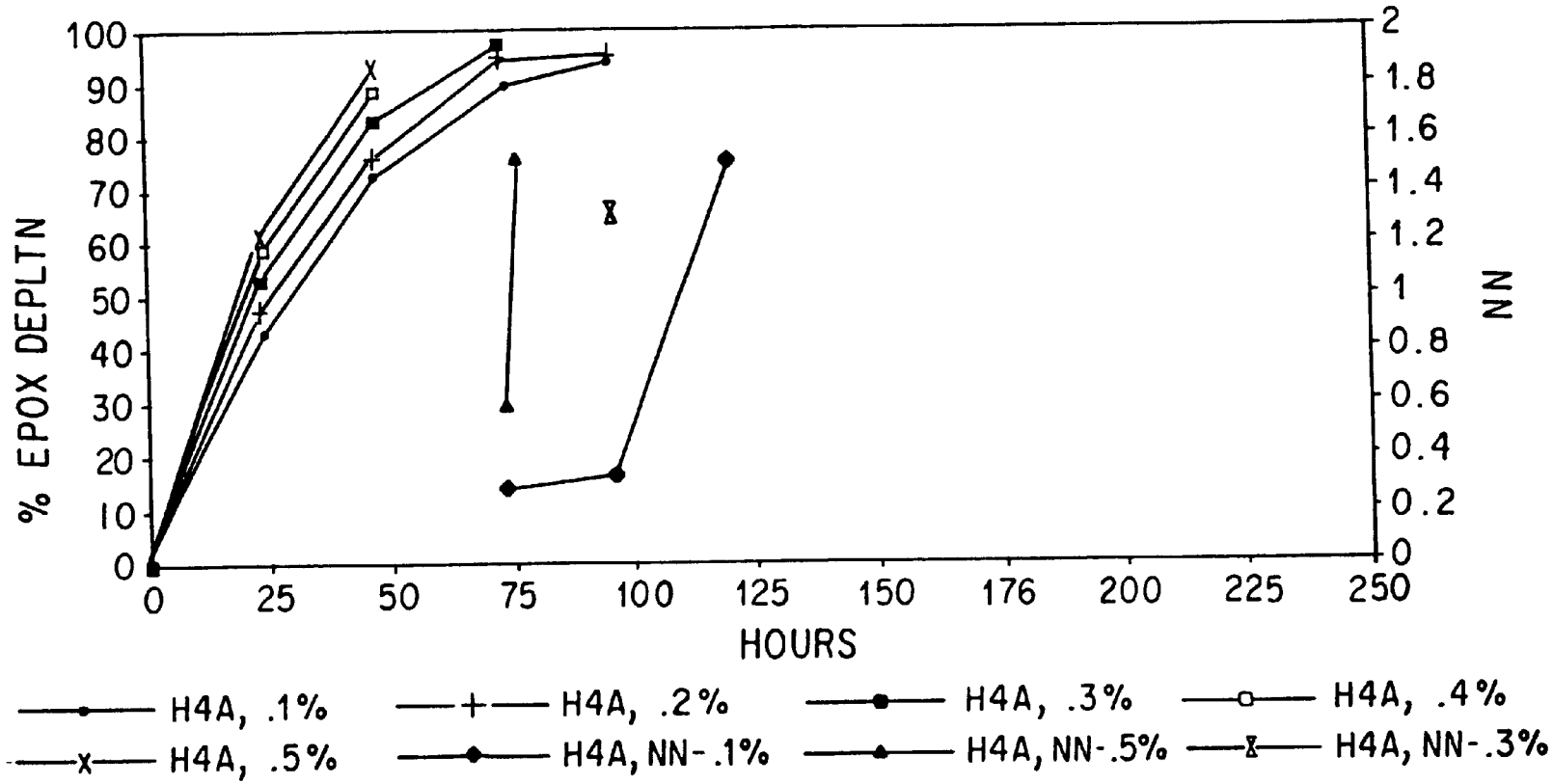
Figure 8:
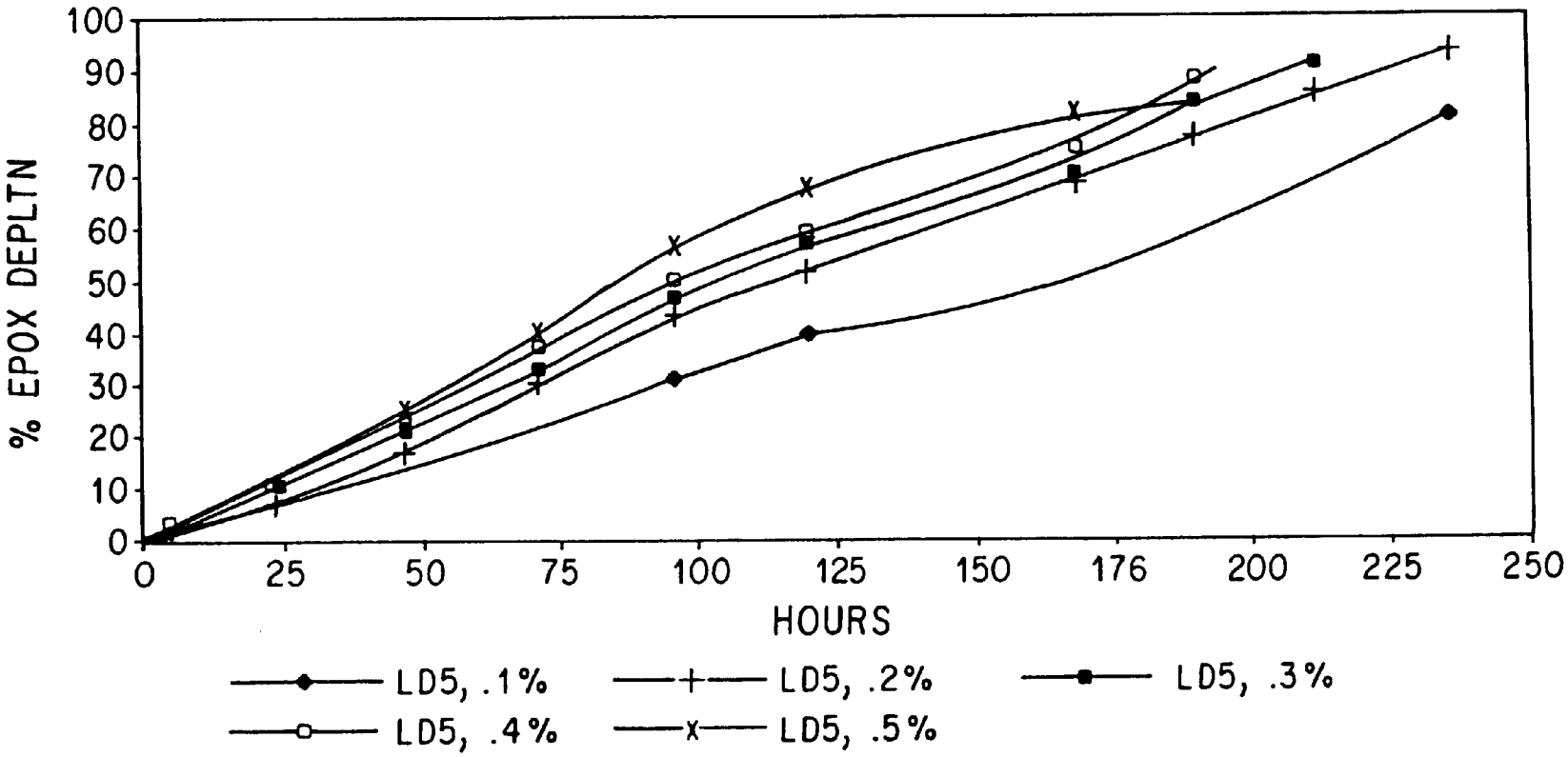
Figure 9:
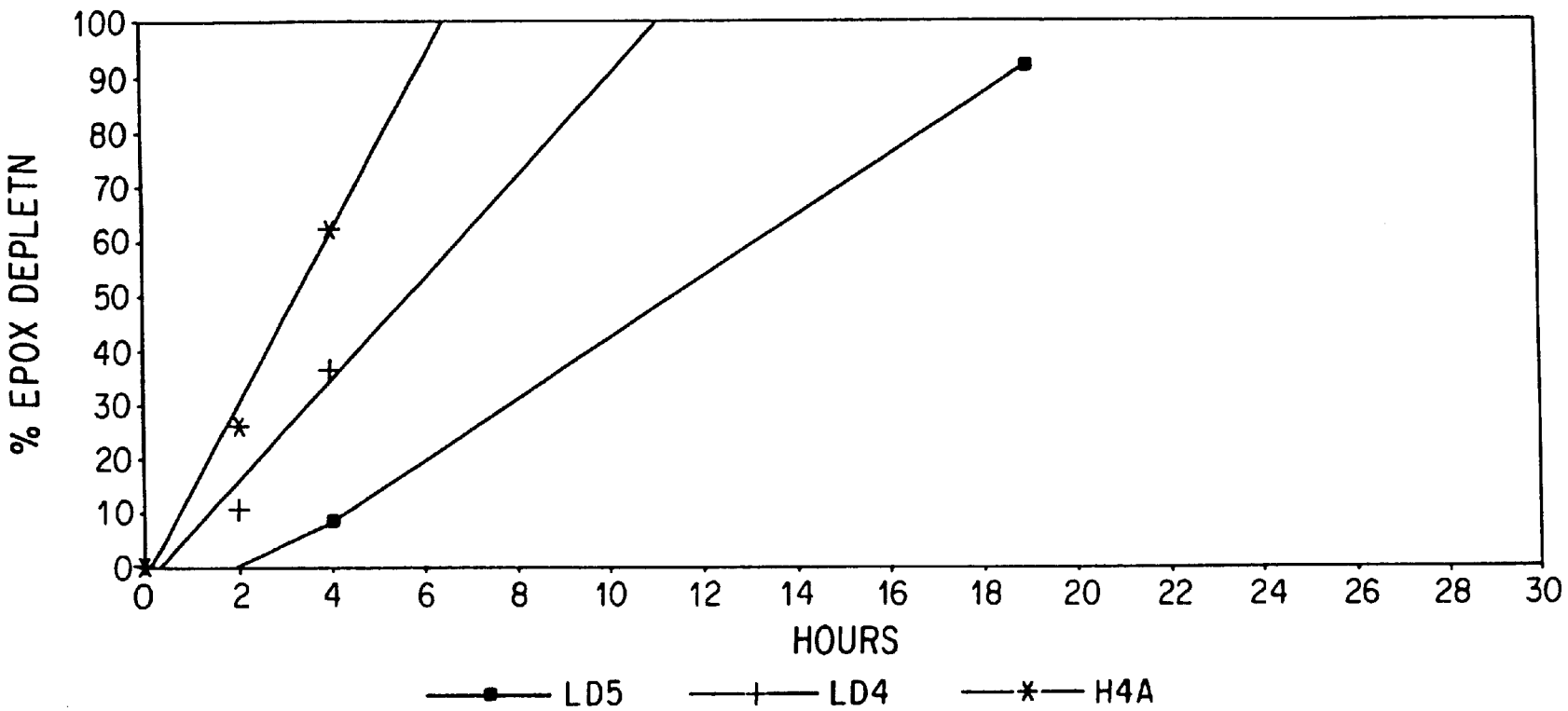

Additional thermal, oxidative, and hydrolytic stability tests comparing the compositions of the invention with those previously available in the art were conducted in sealed pyrex tubes. In certain of the tests, corrosion coupons were immersed in the liquid contained in the pyrex tube. Except for the use of pyrex rather than stainless steel tubes, the tests were conducted in essentially the manner described in Example 3. Both the compositions of the invention and comparative fluids were tested at 300° F. in the presence of 0.1 to 0.5% moisture with five corrosion coupons immersed in the test samples. The results of these tests are set forth in FIGS. 6 to 8. Additional tests on the compositions of the invention were conducted at 375° F. without moisture addition. The results of these tests are set forth in FIG. 9.

EXAMPLE 6

Figure 10:
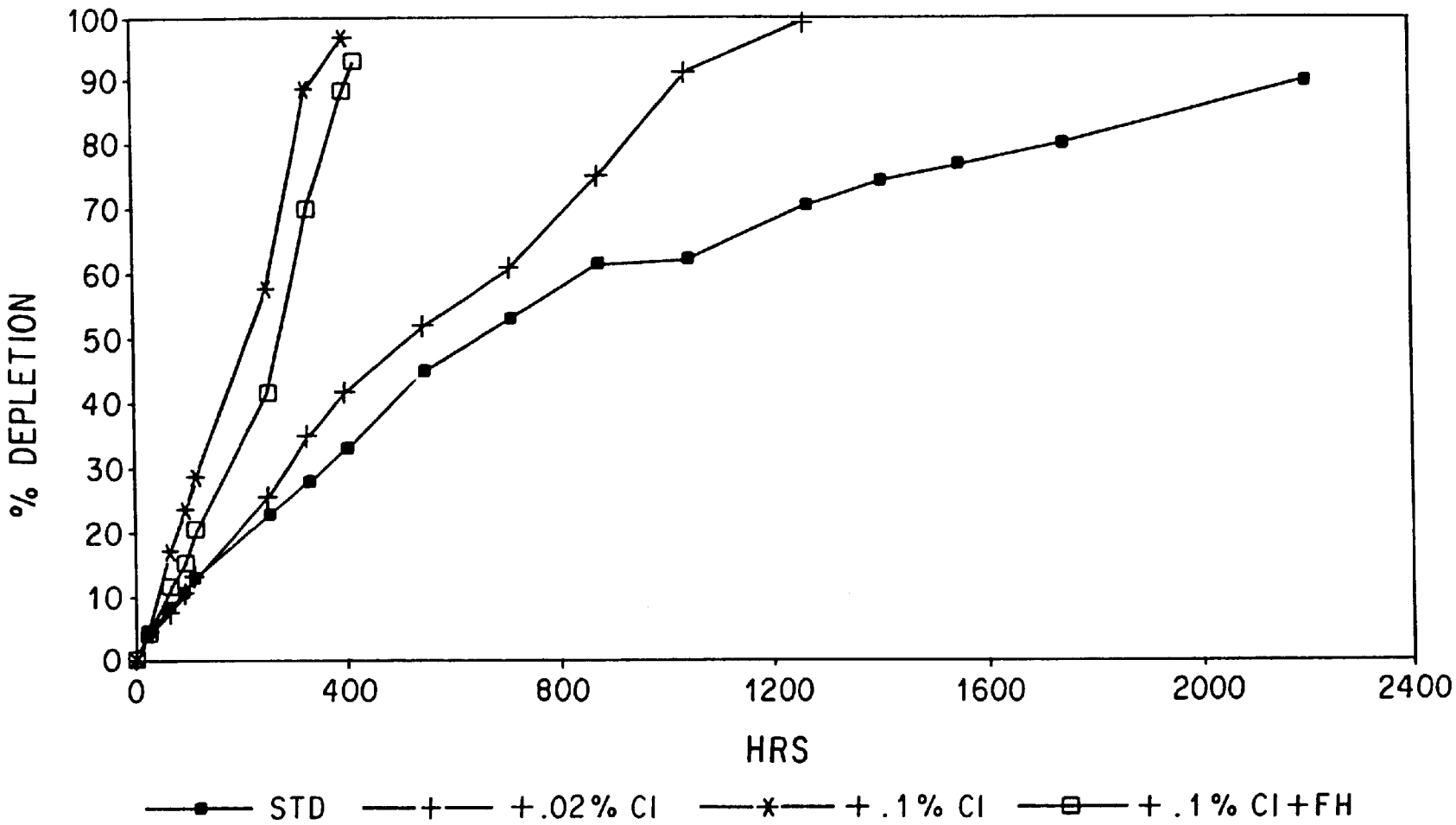
Figure 11:
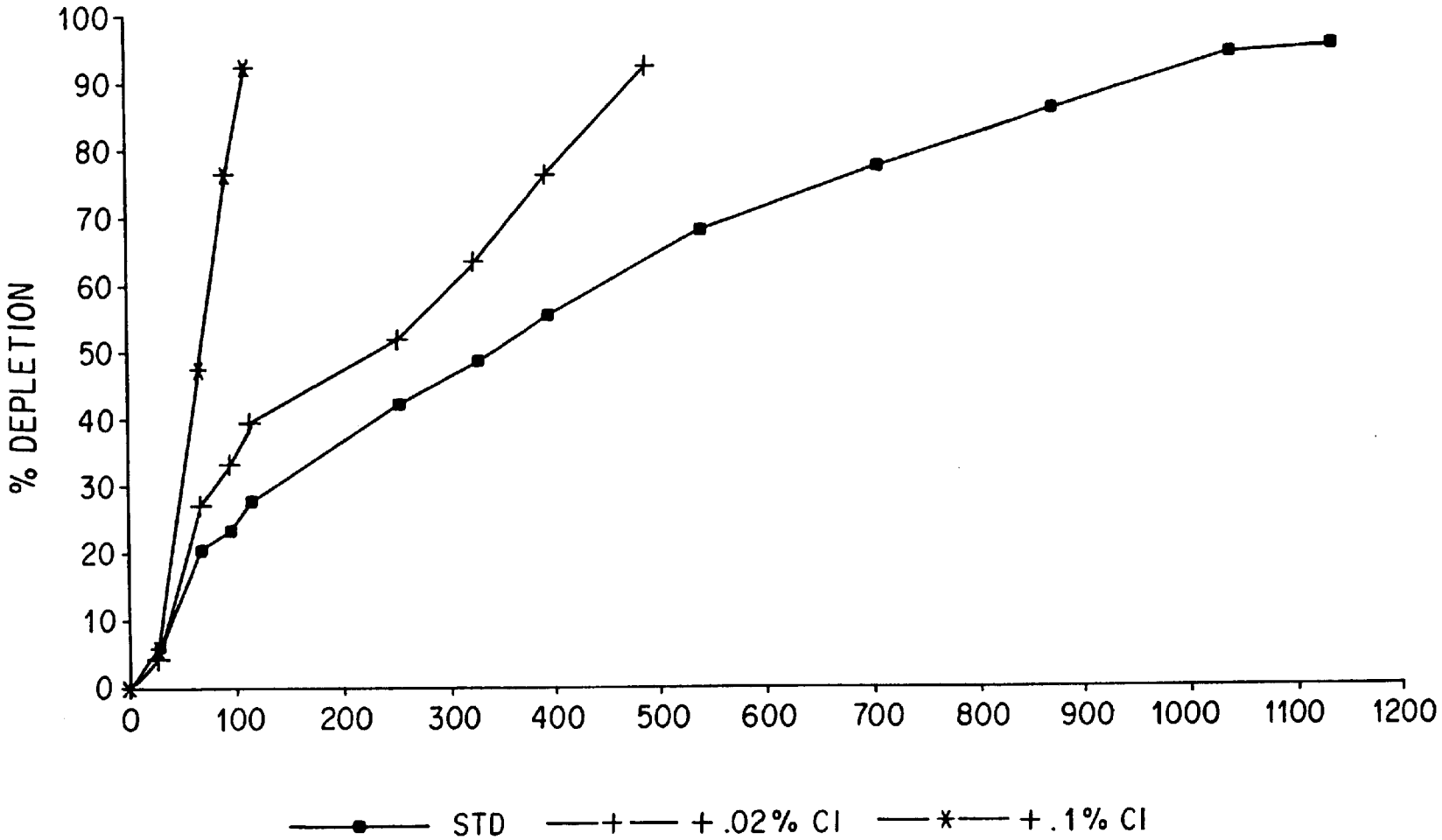

Further thermal, oxidative, and hydrolytic stability tests were conducted generally in the manner described in Example 3, except that trichloroethane was added, in varying amounts, to the test specimens in order to determine the effect on stability. Test temperatures were 275° F. and 300° F. The results of the tests of this example are set forth in FIGS. 10 and 11.

EXAMPLE 7

The oxidation and corrosion resistance of the fluid compositions of Examples 1 and 2 was compared with that of previously available aircraft hydraulic fluids by testing in accordance with federal test method FTM5308.7 This test severely stresses the fluid with regard to oxidation stability.

Figure 12:
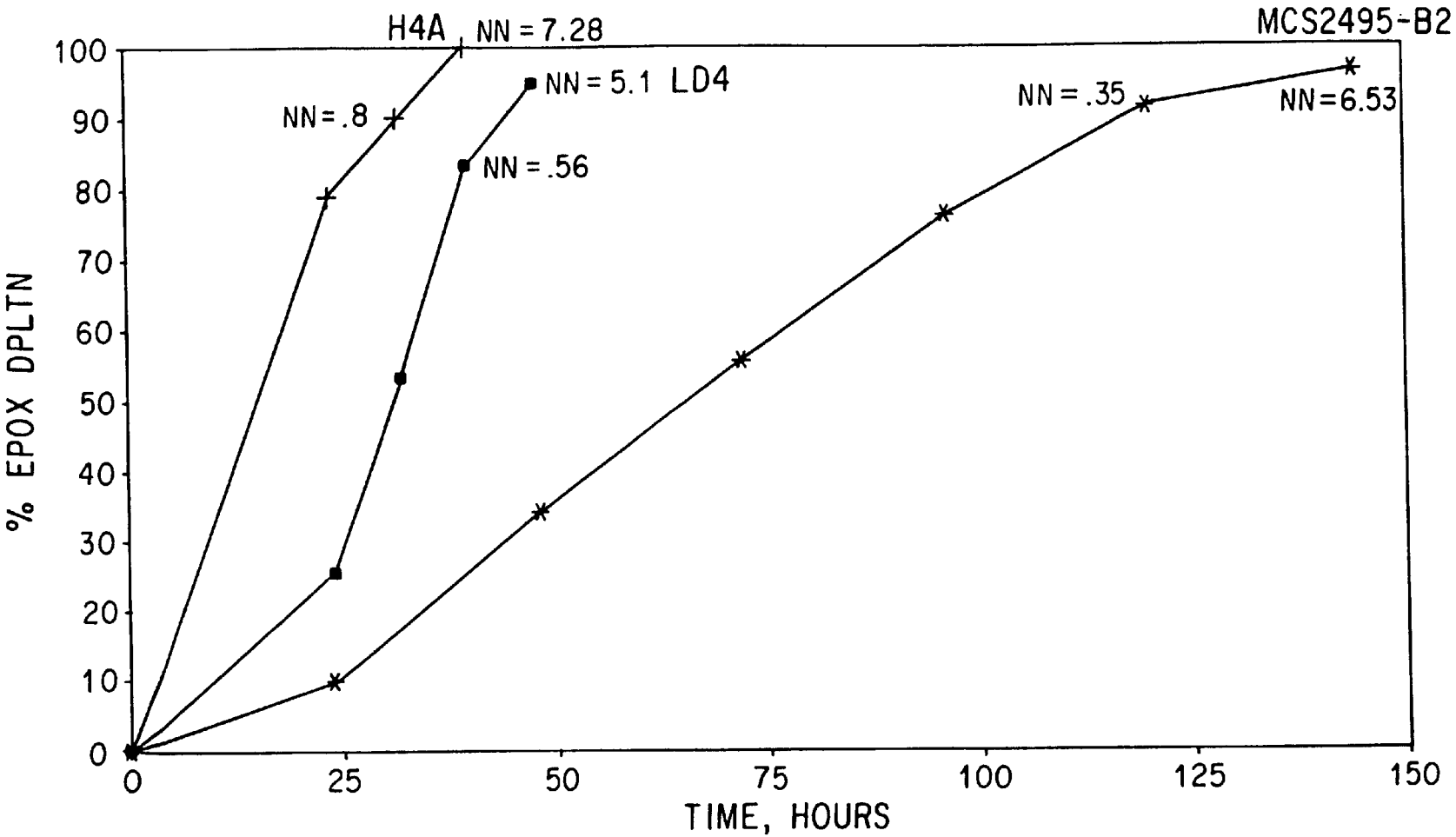

In each test the fluid was charged to a glass tube and tested in accordance with FTM 5308.7. The fluid was heated to a fixed temperature of 350° F. after which dried air was purged through the test fluid at a rate of 5 liters per hour. Samples were taken every 24 hours, or more frequently, and the test was halted when the neutralization number of the fluid reached 1.5 or greater. The results of the tests in this Example are illustrated in FIG. 12.

EXAMPLE 8

Because erosion is a form of electrochemical corrosion, erosion characteristics of a hydraulic fluid composition can be measured by wall currents obtained during flow of the fluid through small simulated orifices similar to those in a test servo valve. Using a standard erosion test apparatus, tests were conducted comparing the erosion properties of the compositions of Examples 1 and 2 with aircraft hydraulic fluid compositions previously available to the art. In this test system, favorable erosion properties were indicated by low wall currents and the most favorable characteristics are indicated by a negative wall current. Set forth in Table 5 is a summary of the data obtained in testing the compositions of the invention and those previously available commercially.

Further erosion tests were conducted on various functional fluid compositions after storage in glass containers at contact with air at 225° F. Set forth in Table 6 are the results of these tests for samples stored for the indicated number of hours.

In these tables, two measurements are reported for conductivity of the specimen, one taken by applicant's assignee and the other by an outside testing laboratory. $I_w$ designates wall current, $i_t$ designates threshold current, and $R_v$ is the rate of erosion. $R_v$ is related to $I_w$ and $i_t$ by the function:

$$R_v=150I_w-18i_t$$

In Tables 5 and 6, the term "LD4" refers to the product sold under the trademark "Skydrol® LD-4" by Monsanto; "SKY500B" and "B4" refer to another functional fluid product available from Monsanto under the trade designation of "Skydrol® 500B4"; "LD5" refers to the composition of the invention; [“$FC_{96}$”] *"$FC_{96}$"* refers to an antierosion agent comprising a potassium salt of perfluorohexylsulfonic acid; "Ca+2" refers to the presence of $Ca^{+2}$ di(perfluoromethylsulfonate) in a tested fluid; "AO" means that an antioxidant was present, typically a combination of Ionol and a hindered polyphenol such as bis(3,5-di-t-butylhydroxyphenyl)methane; "X1" with reference to the antierosion in LD4 means that the antierosion agent $FC_{98}$ is present in the standard commercial concentration; "X2" and "X3" meant that the $FC_{98}$ concentration has been doubled or tripled; "TBP" refers to tributyl phosphate; "DBPP" refers to dibutyl phenyl phosphate; "TEHP" refers to triethylhexyl phosphate; "Si—HC" refers to a tetraalkyl silane composition; "HT" is used to designate Skydrol® HT, a functional fluid formulation that has been sold by applicant's assignee; "TiBP" refers to triisobutyl phosphate; "FC98" refers to an antierosion agent comprising [a potassium salt of perfluorooctylsulfonic acid] *a mixture of a potassium salt of perfluoroethyl cyclohexyl sulfonate, a potassium salt of perfluoromethyl cyclohexyl sulfonate, a potassium salt of perfluorodimethyl cyclohexyl sulfonate, and a potassium salt of perfluorocyclohexyl sulfonate;* "EXI 663" refers to a benzotriazole Cu corrosion inhibitor; 31001 refers to a Petrolite Fe corrosion inhibitor; HALS refers to a hindered amine light stabilizer; "H4A" refers to various samples of the functional fluid sold commercially by Chevron under the trade designation Hyjet IVA; "W6", "W7", "W8," etc. refer to the compositions of the invention; "ERT" means the specimen had been used in Erosion Resistance Tests; and "ECT" means the specimen had been used in Erosion Control Tests.

TABLE 5

EROSION TEST DATA SUMMARY

| Sample ID | Independent Lab Cond. μMHO/cm | MCC Cond μMHO/cm | $I_w$ μA | $I_1$ μA/cm$^2$ | $R_v$ cm$^3$/min/h |
|---|---|---|---|---|---|
| LD4, Duplicate 8/88 | 0.370 | 0.410 | 0.036 | 2.650 | −12.000 |
| LD4 | 0.360 | 0.350 | 0.046 | 1.200 | −15.000 |
| LD4, W/FC98X2 | 0.640 | 0.620 | 0.012 | 6.000 | −106.000 |
| LD4[FC96.250 PPM] | 0.240 | 0.320 | 0.110 | 0.310 | 11.000 |
| LD4[FC96.1250 PPM] | 0.780 | 0.810 | 0.089 | 2.350 | −28.000 |
| LD4[FC96.2500 PPM] | 1.200 | 1.220 | 0.061 | 4.100 | −65.000 |
| LD4[FC98.73 PPM] | 0.190 | 0.240 | 0.086 | 0.700 | 0.000 |
| LD4[500 PPM, Ca + 2.] | 0.670 | 0.750 | −0.005 | 13.000 | −235.000 |
| LD4[1000 PPM Ca + 2.] | 0.980 | 0.940 | −0.003 | <18.000 | NEG |
| LD4[1500 PPM, Ca + 2.] | 1.200 | 1.150 | −0.003 | <19.000 | NEG |
| HY JET IV | 1.000 | | −0.034 | 1.850 | −40.000 |
| B4[500B4] | 0.300 | | 0.019 | 1.150 | −18.000 |
| TBP | 0.008 | | 0.450 | 0.038 | 67.000 |
| DBPP | 0.008 | | 0.460 | 0.094 | 67.000 |
| TEHP | 0.001 | | 0.021 | — | <3 |
| Si-HC | 0.000 | | <0.0001 | — | <.0015 |
| HT, FC98 | 0.037 | 0.690 | 0.410 | 0.210 | 58.000 |
| HT, FC98X1 | 0.630 | 1.020 | 0.000 | 2.850 | −54.000 |
| TiBP | 0.001 NV | | 0.127 | 0.007 | 20.000 |
| LD5[FC98.250 PPM] | 0.150 | | 0.071 | 1.250 | −12.000 |
| LD5[FC98.750 PPM] | 0.250 | | 0.015 | 1.400 | −23.000 |
| LD5[FC98.250 PPM] .02% $H_2O$ | 0.140 | | −0.017 | −0.061 | NEG |
| LD5[SAME] .1% $H_2O$ | 0.150 | | −0.007 | −0.375 | NEG |
| LD5[SAME] .2% $H_2O$ | 0.150 | | −0.055 | −0.375 | NEG |
| LD5[SAME] .3% $H_2O$ | 0.160 | | −0.085 | −0.400 | NEG |
| LD4, .1% $H_2O$ [.51%] | 0.370 | | 0.001 | 2.000 | |
| LD4, .2% $H_2O$ [.45%] | 0.380 | | 0.007 | 1.700 | |
| LD4, .3% $H_2O$ [.56%] | 0.400 | | 0.014 | 1.800 | |
| H4A | 0.930 | | 0.096 | 16.450 | −262.000 |
| H4, Used | 0.300 | | 0.011 | 2.300 | −40.000 |
| LD4, Used | 0.390 | | −0.053 | 0.990 | −26.000 |
| SKY500A | 0.039 | | 0.185 | 0.600 | 16.950 |
| H4A#2, Used | 0.450 | | 0.010 | 3.400 | −59.700 |
| H4A#1, Used | 0.510 | | 0.010 | 2.800 | −48.900 |
| H4A#3, Used | 0.670 | | 0.020 | 2.400 | −40.200 |
| LD4, Ca[S03C4F9]2 | 0.570 | | −0.020 | >11 | −201.000 |
| H4A#5, Used + Cl | 0.670 | | 0.020 | 2.400 | −40.000 |
| H4A#5, Used @ 195 H, NO Cl | 0.770 | | 0.050 | 7.400 | −126.000 |
| H4A#5, Used + Cl .500 H | 0.440 | | 0.026 | 0.260 | −1.000 |
| W6, Fresh | 0.620 | 0.630 | 0.150 | 1.600 | −6.000 |
| Used-600 h. | 0.630 | 0.740 | −0.021 | 1.600 | −55.000 |
| W7, Fresh | 0.490 | 0.590 | 0.140 | 1.300 | −2.000 |
| Used-600 h. | 0.610 | 0.760 | −0.013 | 2.200 | −42.000 |
| W8, Fresh | 0.580 | 0.560 | 0.167 | 0.580 | 0.140 |
| Used-600 h. | 0.880 | 0.760 | 0.004 | 2.250 | −40.000 |
| W9, Fresh | 0.540 | 0.640 | 0.230 | 1.400 | 11.000 |
| W10, Fresh | 0.310 | 0.380 | 0.230 | 1.400 | 9.000 |
| Used-600 h. | 0.730 | 0.750 | 0.036 | 2.000 | −31.000 |
| W11, Fresh | 0.500 | 0.580 | 0.240 | 1.080 | 17.000 |
| W12, Fresh | 0.560 | 0.590 | 0.160 | 3.200 | −34.000 |
| Used-600 h. | 0.670 | 0.690 | 0.160 | 2.500 | −18.000 |
| W13, Fresh | 0.670 | 0.690 | 0.160 | 2.500 | −21.000 |
| Used-600 h. | 0.970 | 1.000 | 0.001 | 2.750 | −48.000 |
| W14, Fresh | 0.52 | 0.55 | 0.17 | 9.10 | −138.00 |
| Used-600 h. | 0.67 | 0.73 | −0.01 | 1.75 | −33.00 |
| W15, Fresh | 0.51 | 0.54 | 0.16 | 0.63 | 13.00 |
| Used-600 h. | 0.62 | 0.75 | −0.02 | 1.60 | −31.00 |
| W15, Fresh, Erosion Control | 0.07 | 0.54 | −0.01 | 1.75 | −33.00 |
| Used-600 h. | 0.75 | | | | |
| W16, Fresh | 0.670 | | | | |
| W17, Fresh, Abex + 200 PPM Cl | 0.580 | | 0.180 | 1.200 | 8.500 |
| Used-600 h. | 0.560 | | −0.028 | 0.720 | −17.000 |
| Used, ERT | 0.610 | | −0.016 LT. | .29 GT. | −8 |
| Used, ECT | 0.66 | | −0.04 LT. | .35 GT. | −13 |
| LD4 + FC910 | 0.230 | | 0.026 | 1.500 | −23.000 |
| LD4 + H4A-AO'S | 0.350 | | 0.032 | 0.920 | −12.000 |
| LD4 + HALS, NO-FC98 | 0.015 | | 0.120 | 0.140 | 16.000 |
| LD4 + HALS + FC98 | 0.410 | | 0.071 | 0.490 | 0.200 |
| LD5, W17.2X − FC98 | 0.420 | | 0.110 | 2.250 | −24.000 |

TABLE 5-continued

| EROSION TEST DATA SUMMARY | | | | | |
|---|---|---|---|---|---|
| Sample ID | Independent Lab Cond. μMHO/cm | MCC Cond μMHO/cm | $I_w$ μA | $I_1$ μA/cm$^2$ | $R_v$ cm$^3$/min/h |
| ONLY NBP4419198 | | | | | |
| +50 PPM EX1663 | 0.430 | | 0.100 | 1.060 | −4.000 |
| +250 PPM EX1663 | 0.430 | | 0.110 | 1.070 | −3.000 |
| +1000 PPM EX1663 | 0.450 | | 0.120 | 1.120 | −3.000 |
| +50 PPM 31001 | 0.420 | | 0.120 | 1.060 | −1.000 |
| +250 PPM 31001 | 0.430 | | 0.100 | 1.080 | −4.000 |
| +5 PPM KP | 0.450 | | 0.170 | 0.510 | 16.000 |
| +350 KP | 0.700 | | 0.210 | 0.800 | 17.000 |
| +500 PPM DODPA | 0.430 | | 0.120 | 1.080 | −1.000 |
| +5000 PPM DODPA | 0.420 | | 0.120 | 1.080 | −1.000 |
| LD5, W17, NO AEA | 0.023 | | 0.230 LT. | .01 GT. | 34 |
| NBP4419199 + 160 PPM $Ca(SO_3C4F9)_2$ | 0.31 | | −0.01 GT. | 12 LT. | −220 |

TABLE 6

| Erosion Test Data After Oven Heating 225 F. In Glass; Air @ Start Only; Includes 1020 Steel and Cu Corr. Coupons | | | | | |
|---|---|---|---|---|---|
| | Independent Lab Cond. μmHo/cm. | MCC Cond. μmHO/cm | $I_w$ μA | $I_1$ μA | Rv m3/min/h. |
| LD-4 Hours | | | | | |
| 100.000 | 0.390 | | 0.039 | 2.500 | −39.000 |
| 200.00 | 0.410 | | −0.009 | 0.200 | −5.000 |
| 300.00 | 0.410 | | −0.001 | 0.170 | −4.000 |
| 600.00 | 0.360 | | 0.012 | 0.410 | −6.000 |
| H4A Hours | | | | | |
| 100.000 | 1.200 | | 0.087 | 0.097 | 11.000 |
| 200.000 | 1.100 | | 0.083 | 0.330 | 6.000 |
| 300.00 | 1.000 | | 0.088 | 0.280 | 8.000 |
| 600.00 | 1.100 | | 0.086 | 0.350 | 7.000 |

EXAMPLE 9

Figure 13:
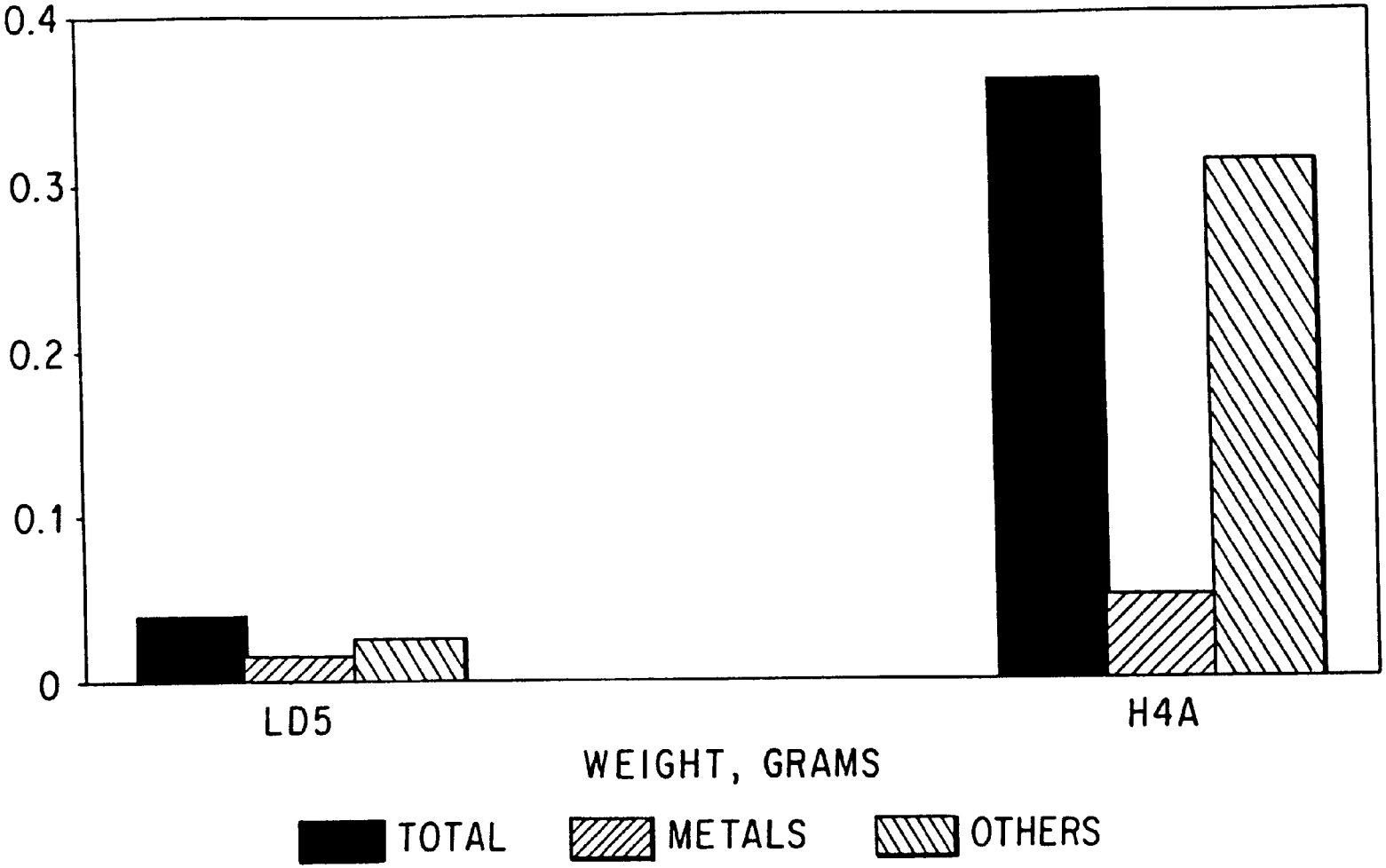
FIG. 13 is a bar graph illustrating the superior anti-corrosion properties of the functional fluid of the invention.

The compositions of Examples 1 and 2 were compared with an available commercial hydraulic fluid in a storage test at 375° F. in the presence of iron. After 21 hours storage at such conditions, analyses were made of the solids build-up in the fluid. More particularly, measurements were made of the build-up of metal solids, other solids, and total solids. The results of these tests are illustrated in FIG. 13.

EXAMPLE 10

Aircraft hydraulic fluids of the invention were formulated, substantially in the manner described in Example 1, and subjected to the Erosion Resistance Test of Boeing Material Specification for Fire Resistant Hydraulic Fluid. BMS 3-11G (Rev. Jul. 17, 1986). Set forth in Tables 7, 7A, and 7B are the compositions of the fluids tested. Set forth in Table 8 are the results of the erosion tests. Set forth in Tables 9 and 9A is a comparison of the properties of the fluids before and after subjection to the erosion tests. In these tables. "HF 400," "HF411," and "HF-460" refer to poly(butyl/hexyl methacrylate) viscosity index improvers. In each entry, the table states the butyl methacrylate polymer solids content, the balance being trialkyl phosphate solvent. "AEA" refers to an antierosion agent, "PANA" designates phenyl-α-napthylamine; "APANA" designates an alkylphenyl-α-naphthylamine. "DODPA" refers to di(p-octylphenyl)amine; "P58526 Petrolite" is an iron corrosion inhibitor, "DC 200, 100 CST" is a Dow-Corning antifoam; "SARK O" refers to the N-methyl-N-1-OXO-9-octadenyl) glycine sold under the trade designation "Sarkosyl-O" by Ciba-Geigy; "AMINE O" refers to the 2-(8-heptadecenyl)-4,5-dihydro-1H-imidazole-1-ethanol sold under the trade designation "Amino-O" by Ciba-Geigy; "90-31001" refers to Petrolite 31001; and "FH-132" refers to diphenyldithioethane.

TABLE 7

| | FORMULATIONS | | | | |
|---|---|---|---|---|---|
| VARIABLE | W-1 | W-2 | W-3 | W-4 | W-5 |
| TiBp | 54.29[a] | 53.33[a] | 54.58[a] | 52.61[a] | 39.8653[a] |
| DiBPP, 66.3% PH | 29.90[b] | 29.92[b] | 29.90[b] | 29.88[b] | 26.45[b] |
| PA6385 | 8.52 | 8.47 | 8.21 | — | — |
| PA6703 | — | — | — | 10.16 | 10.16 |
| MCS 1562 | 6.3 | 6.3 | 6.3 | 6.3 | 6.3 |
| AEA, FC98 | .05 | .05 | .05 | .05 | .05 |
| P57068, PET (50% ACTIVE) | .05 | .05 | .05 | .05 | .05 |
| DYE | .00 | .001 | .001 | .001 | .001 |
| KP | .03 | .035 | .035 | .035 | .035 |
| E702 | .90 | — | .45 | .45 | .9 |
| DODPA | .45 | .45 | .15 | .45 | .45 |
| IONOL | .25 | — | .25 | .25 | .25 |
| DC 200, 100 CST | .005 | .0005 | .0005 | .0005 | .0005 |
| VANLUBE RI-G | — | — | .025 | .025 | 0.025 |
| L130 | 1. | — | — | — | — |
| E330 | .3 | 1.05 | — | — | — |
| L57 | .4 | — | — | — | — |
| E703 | .3 | .35 | — | — | — |

| | FORMULATIONS | | |
|---|---|---|---|
| | W15A | W17 | W18 |
| TBP | 39.8653 | 49.3685 | 39.8653 |
| DBPP, LOW DI-PHENYL, ROD/C2 | 35.76 (D56.8P) | 26.45 | 26.45 |
| DBPP, LOW DI-PHENYL, ROD/C4 | | | |
| HF400, 43.6% S/7.5% FINAL | 17.36 | 17.36 | |
| HF411, 35.5% s/3.75% FINAL | 6.41 | | |

TABLE 7-continued

| | | | |
|---|---|---|---|
| HF460, 58.5% s/3.75% FINAL | 10.42 | | |
| MCS 1562 | 5.8 | 6.3 | 6.3 |
| AEA, FC98 | .05 | .05 | .05 |
| P57068, PETROLITE (50% ACTIVE) | .04 | .05 | .05 |
| EX1-663 | | | |
| DYE | .001 | .001 | .001 |
| KP | .035 | .035 | .035 |
| E702 | .76 | .9 | .9 |
| DODPA | . | .45 | .45 |
| IONOL | . | .25 | .25 |
| A-PANA | .85 | . | . |
| P58528, PETROLITE (50% ACTIVE) | . | .05 | .05 |
| 90-31001 | | | |
| DC 200, 100 CST | .0005 | .0005 | .0005 |
| SARK O | .004 | . | . |
| AMINE O | .004 | . | . |
| FH132 | | | .25 |

[a]Triisobutyl phosphate
[b]Diisobutyl phenyl phosphate

TABLE 7A

| | FORMULATIONS | | |
|---|---|---|---|
| VARIABLES | W6 | W7 | W8 |
| TBP, REDIST. | 45.835 | . | . |
| TBP | . | 50.844 | 50.8935 |
| DBPP, LOW DI-PHENYL, ROD/C2 | 30. | 25. | 25. |
| DBPP, LOW DI-PHENYL, ROD/C4 | . | . | . |
| HF400, 43.6% S/7.5% FINAL | . | . | . |
| HF411, 35.5% S/3.75% FINAL | 10.42 | 10.275 | 10.275 |
| HF460, 58.5% S/3.75% FINAL | 6.41 | 6.41 | 6.41 |
| MCS 1562 | 5.8 | 5.8 | 5.8 |
| AEA, FC98 | .05 | .05 | .05 |
| P57068, PETROLITE (50% ACTIVE) | .055 | .1 | .1 |
| DYE | .001 | .001 | .001 |
| KP | .035 | .035 | .01 |
| E702 | .761 | . | . |
| PANA | .625 | . | . |

TABLE 7A-continued

| | FORMULATIONS | | |
|---|---|---|---|
| VARIABLES | W6 | W7 | W8 |
| APANA | . | .76 | .9 |
| DODPA | . | .625 | .45 |
| P58528, PETROLITE (50% ACTIVE) | . | .1 | .1 |
| DC 200, 100 CST | . | . | .0005 |
| SARK O | .004 | . | . |
| AMINE O | .004 | . | . |
| (1)KP, SELFMADE KP 2% BDPP IN DBPP | | | |

TABLE 7B

| VARIABLES | FORMULATION W15 |
|---|---|
| TBP | 39.8653 |
| DBPP, LOW DI-PHENYL, ROD/C2 | 35.76(D/56.8P) |
| DBPP, LOW DI-PHENYL, ROD/C4 | |
| HF400, 43.6% s/7.5% FINAL | |
| HF411, 35.5% s/3.75% FINAL | 6.41 |
| HF460, 58.5% s/3.75% FINAL | 10.42 |
| MCS 1562 | 5.8 |
| AEA, FC98 | .05 |
| P57068, PETROLITE (50% ACTIVE) | .04 |
| EX1-663 | |
| DYE | .001 |
| KP | .035 |
| E702 | E702.76 |
| PANA | .85 |
| P58528, PETROLITE (50% ACTIVE) | |
| 90-31001 | |
| DC 200, 100 CST | .0005 |
| SARK O | .004 |
| AMINE O | .004 |

TABLE 8

| RUN NUMBER | 3 | 4 | 5 | 6 | 7 | 8 |
|---|---|---|---|---|---|---|
| RIG USED | A | A | A | C | A | C |
| CASE DRAIN TEMPERATURE (° F.) | 290 | 290 | 290 | 315 | 315 | 315 |
| RESERVOIR TEMPERATURE | 275 | 275 | 275 | 300 | 300 | 300 |
| Cl ADDED, PPM | 0 | 0 | 0 | 0 | 0 | 0 |
| TOTAL RUN TIME, HR | 468 | 368 | 570 | 560 | 475 | 420 |
| OPERATING PROBLEMS | O rings | O rings | shut downs | none | pump water | pump water |
| BOEING VALVE DATA | | | | | | |
| SLIDE AND SLEEVE NO. | W004 | W004 | W002 | W011 | W008 | W011 |
| PORT NUMBERS | 5.7 | 6.8 | 6.8 | 1.3 | 1.3 | 2.4 |
| FLOW INCREASE, cc/min. | erratic | erratic | erratic | 40 | 200 | 200 |
| ACCEPTABLE? | no | no | no | yes | marginal | marginal |
| EDGE APPEARANCE | slight wear | slight wear | slight wear | shaded | slight wear | slight wear |
| PUMP DATA | | | | | | |
| MANUFACTURER | Vickers | Vickers | Vickers | Abex | Vickers | Abex |
| SERIAL NO. | 491761 | 491761 | 491761 | 166495 | 482891 | 166495 |
| HRS AT START | 0 | 468 | 856 | 1000 @225 F. | 0 | 1562 |
| HRS TO FALURE | 468 | 856 | 1426 | no failure | 476 | 1980 |
| CAUSE OF FAILURE | O ring | O ring | bearings | — | bearings | bearings shaft seal |

TABLE 8-continued

| SECOND PUMP (IF USED) | | | |
|---|---|---|---|
| MFR | | | |
| S/N | | | |
| HRS AT START | | | |
| HRS TO FAILURE | | | |
| RUN NUMBER | 15 ERT | 15 ECT | 15 ERT |
| RIG USED | C | A | C |
| CASE DRAIN TEMPERATURE (° F.) | 315 | 275 | 300 |
| RESERVOIR TEMPERATURE | 300 | 280 | 284 |
| Cl ADDED, PPM | 1000 | 1000 | 200 |
| TOTAL RUN TIME, HR | 274 | 245 | 500 |
| OPERATING PROBLEMS | none | none | shaft seal |
| BOEING VALVE DATA | | | |
| SLIDE AND SLEEVE NO. | W007 | W022 | W007 |
| PORT NUMBERS | 6.8 | 5.7 | 1.3 |
| FLOW INCREASE, cc/min. | extreme | extreme | 300 |
| ACCEPTABLE? | no | no | marginal |
| EDGE APPEARANCE | severe wear | severe wear | slight shading |
| PUMP DATA | | | |
| MANUFACTURER | Abex | Vickers | Abex |
| SERIAL NO. | 183629 | 491761 | 115815 |
| HRS AT START | 0 | 0 | 0 |
| HRS TO FALURE | 274 | 230 | 320 |
| CAUSE OF FAILURE | Ou transfer | Ou transfer | shaft seal |
| SECOND PUMP (IF USED) | | | |
| MFR | | Vickers | Abex |
| S/N | | 491763 | 228188 |
| HRS AT START | | — | 0 |
| | | 492891 both destroyed | |
| HRS TO FAILURE | | | 130 |

| RUN NUMBER | 17 ERT | 17 ECT | 17 BASE CASE | 17 AIRBUS | 17 @225 F. | 17 BMS PUMPING | 18 ERT | 18 BASE CASE |
|---|---|---|---|---|---|---|---|---|
| RIG USED | A | A | C | C | B | HP | B | A |
| CASE DRAIN TEMPERATURE (° F.) | 300 | 275 | 300 | 290 | 240 | 284 | 300 | 300 |
| RESERVOIR TEMPERATURE | 284 | 260 | 284 | 273 | 225 | 235 | 284 | 284 |
| Cl ADDED, PPM | 200 | 400 | 0 | 0 | 1000 | 0 | 200 | 0 |
| TOTAL RUN TIME, HR | 500 | 330 | 800 | 1000 | 1000 | 500 | 500 | 760 |
| OPERATING PROBLEMS | none | none | pump water | none | none | none | none | none |
| BOEING VALVE DATA | | | | | | | | |
| SLIDE AND SLEEVE NO. | W006 | W022 | W020 | W020 | W017 | not used | W017 | W016 |
| PORT NUMBERS | 2.4 | 1.3 | 1.3 | 5.7 | 6.8 | — | 2.4 | 2.4 |
| FLOW INCREASE, cc/min. | 100 | 500 | 0 | 40 | 170 | — | 40 | 136 |
| ACCEPTABLE? | yes | yes | yes | yes | yes | — | yes | yes |
| EDGE APPEARANCE | slight shading | worn | slight shading | slight wear | slight wear | — | slight wear | slight wear |
| PUMP DATA | | | | | | | | |
| MANUFACTURER | Vickers | Vickers | Abex | Abex | Vickers | Abex | Vickers | Vickers |
| SERIAL NO. | 491761 | 491763 | 183629 | 226153 | 492891 | L-1976 | 491762 | 491761 |
| HRS AT START | 0 | 0 | 0 | 0 | 0 | 0 | 0 | 0 |
| HRS TO FALURE | no failure | no failure | 676 | 1000 | no failure | no failure | no failure | no failure |
| CAUSE OF FAILURE | — | — | bearings | bearings | — | — | — | — |
| SECOND PUMP (IF USED) | | | | | | | | |
| MFR | | | Abex | | | | | |
| S/N | | | 116815 | | | | | |
| HRS AT START | | | 0 | | | | | |
| HRS TO FAILURE | | | 117 | | | | | |

TABLE 9

SOME DATA FROM THE ANAL. FLUIDS:

| MCS2510- | WLFR | WLU | W2.FR | W2.U | W3.FR | W3.U | W4.FR | W4.U | W5.FR | W5.U (@500 HRS) |
|---|---|---|---|---|---|---|---|---|---|---|
| SP. GR. | .9868 | .9925 | .9877 | .9890 | .9896 | .9845 | .9902 | .9898 | .9892 | .9905 |
| VISC 210 | 3.65 | 2.54 | 3.69 | 2.19 | 3.32 | 2.19 | 4.2 | 4.28 | 2.99 | 2.49 |
| 100 | 11.47 | 9.05 | 11.94 | 7.24 | 10.47 | 6.93 | 12.97 | 8.46 | 8.99 | 7.96 |
| −65 | 3954 | 5754 | 4963 | 3302 | 3632 | 2685 | 3893 | 2158 | 2317 | 2421 |
| NN | .02 | ND | .01 | 1.05 | .01 | .04 | .03 | 1.86 | .01 | .09 |
| % $H_2O$ | .12 | .04 | .13 | .11 | .08 | .05 | .11 | .02 | .15 | .07 |
| AlT | 930 | 930 | 94 | 0930 | 940 | 920 | 960 | 950 | 930 | 940 |
| FL. PT | 330 | 265 | 310 | 290 | 315 | 300 | 350 | 350 | 335 | 319 |
| Fl. PT. | 350 | 335 | 340 | 330 | 355 | 350 | 370 | 390 | 365 | 381 |
| OX OX. | TD | TD | .41 | TD | .38 | TD | .39 | .14 | .61 | .36 |
| COND. | .44 | — | .28 | .90 | .45 | .37 | .36 | 1.63 | .41 | .43 |
| −% EPOX | — | 86.5 | — | 65.3 | — | 22.1 | — | 78.9 | — | 57.8 |
| Cl | 15 | 154 | 25 | 173 | 12 | 257 | 7 | 204 | 18 | 136 |
| HRS | 580 | — | 502 | — | 579 | — | 334 | — | 933 | — |
| TEMP. F. | 290/284 | — | 293/284 | — | 297/290 | — | 278/270 | — | 300/280 | — |
| PUMP RIG | A | — | — | A | — | B | — | A | — | C |
| AEA FC98 | 2XSTD | — | 2XSTD | — | 2XSTD | — | 2XSTD | — | 2XSTD | — |

| ICAP DATA: | WLFR | WLU | W2.FR | W2.U | W3.FR | W3.U | W4.FR | W4.U | W5.FR | W5.U |
|---|---|---|---|---|---|---|---|---|---|---|
| Na | 5.23 | 28.3 | 2.5 | 8.1 | 4.7 | 8.8 | 3.2 | 14.9 | 3.9 | 8.7 |
| K | 74.6 | 87. | 71.1 | 64.3 | 91.1 | 49.4 | 104.5 | 94.6 | 110.3 | 34.9 |
| S | 58.4 | 56.8 | 58.3 | 59.1 | 61.5 | 73. | 79.3 | 79.5 | 63.9 | 73.8 |
| Cu | 1.32 | 720 | <.125 | 142.1 | 1.1 | .8 | <.13 | 1112 | <.13 | 6.7 |
| Fe | <.5 | 134.9 | <.125 | 11.9 | <.25 | <.5 | <.13 | 140.3 | <.13 | 1.3 |
| Mn | <.5 | 1.53 | <.125 | <.5 | <.25 | <.5 | <.13 | .86 | <.13 | <.5 |
| Zn | <.5 | 93.9 | <.125 | 14.28 | <.25 | <.5 | <.13 | 131. | <.13 | .9 |
| Al | <.5 | 2.11 | <.125 | <.5 | <.59 | <.5 | <.13 | <.5 | <.41 | <.5 |
| Cd | <.5 | 7.25 | <.125 | 1.54 | <.25 | <.5 | <.13 | 6.62 | <.13 | <.5 |
| FOAM TEST (250/100)F (400/250U) | 35/23 | ND | ND | ND | ND | 40/19 | ND | 160/91 | 80/34 | 50/21 |

| | W6.FRESH | .−USED | W7.FRESH | .−USED | W8.FRESH | .−USED |
|---|---|---|---|---|---|---|
| SP. GR. | 1.0015 | 1.0048 | .9991 | 1.0003 | .9993 | .9995 |
| VISC. 210 | 4.62 | 3.02 | 4.73 | 2.38 | 4.80 | 2.70 |
| 100 | 13.48 | 9.28 | 13.59 | 7.09 | 13.80 | 7.98 |
| −65 | 1523 | 1181 | 1456 | 776 | 1471 | 809 |
| NN | .02 | 1.09 | .13 | .14 | .14 | .212 |
| % $H_2O$ | .07 | .04 | .11 | .02 | .16 | .015 |
| AlT | 910 | 950 | 870 | 925 | 900 | 9700 |
| FL. PT | 320 | 315 | 320 | 300 | 330 | 3100 |
| Fl. PT | 360 | 365 | 360 | 350 | 375 | 3500 |
| OX. OX. | .39 | ND | .41 | .14 | .40 | .118 |
| COND. | .63 | .74 | .59 | .76 | .56 | .768 |
| −% EPOX | 0 | 85.6 | 0 | 57.6 | 0 | 69.4 |
| Cl | — | 11 | 11 | 10 | 15 | 10 |
| HRS | — | 124/438 | — | 475 | — | 418 |
| TEMP. F. | — | 275/300 | — | 300 | — | 300 |
| AEA. FC98 | 2XSTD | | — | 2X STD | 2X STD | — |
| PUMP RIG | C | — | A− | — | C | — |
| O&C LIFE SPAN @ 350 F., HRS | | 72 | — | 120 | — | 120 |

| ICAP DATA: | W6/F | /U: | W7/F | /U: | W8/F | /U: |
|---|---|---|---|---|---|---|
| Na | <.5 | 2.58 | <.5 | 2.07 | <.5 | 3.1 |
| K | 112.7 | 54.95 | 98.06 | 83.54 | 72.58 | 49.15 |
| S | 96.53 | 103.2 | 94.97 | 144.5 | 81.94 | 75.17 |
| Cu | <.5 | 1.13 | <.5 | 23.5 | <.5 | 3.37 |
| Fe | <.5 | <.5 | <.5 | <.5 | <.5 | 1.63 |
| Zn | <.5 | 1.42 | <.5 | 6.96 | <.5 | 17.94 |
| Al | 1.17 | 1.11 | <.54 | <.5 | <.5 | <.5 |
| Cd | <.5 | <.5 | <.5 | .54 | <.5 | <.5 |
| FOAM TEST (250/100)F | 500/1500, | 35/15; | 320/>600, | 20/6 | ;180/83, | 60/19 |
| −INCR. IN INT. LEAKAGE CC'S/MIN | 350 − 300 = 50 | | 600 − 410 = 190 | | 600 − 300 = 300 | |
| 0 HR · RUN END 200< <500 HRS. | 350 − 320 = 30 | | 600 − 390 = 210 | | 600 − 500 = 100 | |
| EROSION TYPE | DE-ALLOYED | | DE-ALLOYED | | DE-ALLOYED | |

TABLE 9-continued

| | | | | | | |
|---|---|---|---|---|---|---|
| VIA:SEM | X | | ND | | ND | |
| ;VISUAL | X | | X | | X | |
| EROSIVE.PUMP | — | NO | — | YES(1) | — | YES(1) |
| .BECK | NO | NO | NO | NO | YES | NO |

(1)LESS EROSION THAN H4A AT 225 F. FOR 600 HRS.

SOME DATA FROM THE ANAL. FLUIDS:

| | W15 FRESH | USED ECT | USED ERT | W17 FRESH | B1 | B2 | USED ERT | USED ECT | W17 USED ERT |
|---|---|---|---|---|---|---|---|---|---|
| SP. GR. | .9996 | .9992 | .9992 | .9990 | .9978 | .9976 | .9990 | 1.0314 | 1.0005 |
| VISC. 210 | 5.23 | 2.68 | 2.68 | 4.94 | 4.97 | 4.91 | 2.74 | 2.54 | 2.46 |
| 100 | 15.19 | 7.87 | 7.87 | 14.12 | 14.43 | 14.28 | 8.26 | 7.77 | 7.27 |
| −65 | 1576 | 779 | 799 | 1426 | 1777 | 1719 | 1024 | 1289 | 769 |
| mn | .03 | .66 | .64 | .02 | .02 | .02 | .06 | .3 | .05 |
| % $H_2O$ | .14 | .02 | .02 | .15 | .14 | .10 | <.01 | <.01 | .02 |
| AlT | 890 | 910 | NA | 840 | NA | NA | 870 | 970 | NA |
| FL. PT | 330 | 305 | 315 | 350 | 330 | 325 | 320 | 340 | 315 |
| Fl. PT. | 375 | 350 | 350 | 385 | 365 | 365 | 355 | 380 | 350 |
| OX. OX. | .38 | .02 | .09 | .46 | .41 | .41 | <.01 | <.01 | .11 |
| COND. | .54 | .75 | .71 | .54 | .66 | .66 | .73 | .8 | .68 |
| −% EPOX | 0 | 82.1 | 65.2 | 0 | 0 | 0 | 57.3 | 80 | 56.4 |
| Cl | 11 | 1290 | 1334 | 7 | 5 | 4.4 | 263 | 237 | 183 |
| HRS | 0 | 245 | 264 | 0 | 0 | 0 | 498 | 342 | 418 |
| TEMP. F. | — | 262 | 315 | — | — | — | 300/284 | 275/262 | 300/284 |
| AO'S. RAT. 7 | .9E702 | APANA | | .9 | .45 | .25− | — | — | — |
| AEA FC98 | 2XSTD | — | — | 2XSTD | — | — | — | — | — |
| NEW AEA | NO | — | NO | NO | NO | NO | NO | NO | — |
| −INCR. IN | | <600 | | | | | | | |
| INT. LEAKAGE | | | | | | | | | |
| CC'S/MIN | | | | | | | | | |
| 0 HR · RUN END | | | | | | | | | |
| 200< <500 HRS | | | | | | | | | |
| EROSION | | | | | | | | | |
| TYPE | | | | | | | | | |
| VIA:SEM | | | | | | | | | |
| ;VISUAL | | | | | | | | | |
| EROSIVE.PUMP | — | YES | YES | | | | | | |
| .BECK | | — | | YES | | | | | |
| PUMP RIG | C | — | C | C | — | — | B | A | C#1 |
| O&c LIFE | — | — | — | — | — | — | — | — | — |
| SPAN @ 350 F., HRS | | 120 | | NA | | | | | |

| ICAP DATA: | W15/F | W15/U | W15/U | W17/F | B1 | B2 | W17/U | W17/U | W17/.U |
|---|---|---|---|---|---|---|---|---|---|
| Na | .94317 | 3.063 | .606 | .56 | <.5 | <.5 | 2.05 | 2.39 | <.5 |
| K | 84.14 | 601.9 | 46.99 | 76.15 | 82.4 | 85.1 | 35 | 45.5 | 46.62 |
| S | 79.39 | 64.14 | 87.5 | 59.11 | 63.9 | 61.9 | 60.6 | 561.7 | 69.2 |
| Cu | <.5 | 1213 | 9.811 | <.5 | <.5 | <.5 | 9.32 | 95.76 | 11.34 |
| Fe | <.5 | 43.53 | 293.3 | <.5 | <.5 | <.5 | 8.24 | 60.89 | 50.4 |
| Mn | <.5 | .435 | 1.775 | <.5 | <.5 | <.5 | <.5 | <.5 | <.5 |
| Zn | <.5 | <.5 | 58.02 | <.5 | 1.76 | 2.16 | 1.09 | 13.22 | 14.17 |
| Al | .94 | 2.475 | 27.2 | 1.59 | <.5 | <.5 | <.5 | <.5 | <.5 |
| Cd | <.5 | <.5 | <.5 | <.5 | <.5 | <.5 | <.5 | <.5 | <.5 |

| | W15/F | W15/U | W17/F | W17/U | W17/U | W17/U |
|---|---|---|---|---|---|---|
| FOAM TEST (250/100)F (400/250)U | 280/170 | 440/268 | NA 210/93 | 70/25 240/130 | 55/18 | 60/20 |

EXAMPLE 11

Formulations were prepared which substantially corresponded to the compositions of Example 1, except that the trialkyl phosphate and dialkyl aryl phosphate components were triisobutyl phosphate and diisobutyl phenyl phosphate, respectively, and the compositions varied with respect to the compound included as an iron corrosion inhibitor. Erosion valve leakage tests were run on these compositions in the manner described in Example 9, and epoxide depletion tests were conducted on these compositions generally in the manner described in Example 1. The results of these tests are set forth in Table 10.

The table indicates that composition M-1 used a "combination" of antioxidants. Initially, M-1 contained Ionol, Ethanox 702 and di(p-octylphenyl)amine (DODPA). After the erosion test had progressed for 25 hours, further amounts of Ethanox 702 and DODPA were added to the composition. At 153 hours, a phenolic antioxidant was added; at 267 hours, an amine antioxidant was added; and at 503 hours a mixture of Ethanox 703 and Ethanox 330 was added. Ethanox 703 is a trade designation for 2,6-di-tert-butyl-α-dimethylamino-p-cresol. The phenolic antioxidant added at 153 hours was a mixture of t-butyl phenol derivatives sold under the trade designation Iganox L-130 by Ciba-Geigy; and the amine antioxidant added at 267 hours was a reaction product of N-phenylbenzylamine and 2,4,4-trimethylpentene, sold under the trade designation L-57 by Ciba-Geigy.

TABLE 10

| | | TESTS | | | | |
|---|---|---|---|---|---|---|
| | | Additives | | Iron Corrosion | Erosion Valve | Erosion Test Epoxide Depletion |
| Run | Basestock | Phenolics | Amines | Inhibitor | Leakage | @ 300° F. |
| W-1 | TIBP/DIBPP | Continuation | Combination | None | <100 cc | >95%[a] |
| W-2 | TIBP/DIBPP | E703/E330 | DODPA | None at the start. At 22 hrs. Petrolite 31001 added. | >200 cc | 65%[a] |
| W-3 | TIBP/DIBPP | Ionol/E702 | DODPA | Vanlube R1-G | 100 cc | 22%[a] |
| W-4 | TIBP/DIBPP | Ionol/E702 | DODPA | Vanlube R1-G | — | 78.9%[b] |
| W-5 | TIBP/DIBPP | Ionol/E702/E330 | DODPA | Vanlube R1-G | — | 58%[a] |

[a]Boeing BMS-3-11G Erosion Resistance Test
[b]Boeing, BMS-3-11G, Erosion Control Test These data and those of Example 9 demonstrate that the iron corrosion resistance agents Petrolite 31001 and vanlube RI-G are both satisfactory with respect to effect on erosion. Neither appears to significantly accelerate erosion, and the compositions containing these additives exhibit satisfactory antierosion properties.

The combination of a triisobutyl phosphate/diisobutyl phenyl phosphate base stock with the 4,5-dihydroimidazole derivative of Vanlube RI-G provides a remarkable and unexpectedly favorable effect on the stability of the composition at elevated temperature. This effect is not seen with iron corrosion inhibitors other than 4,5-dihydroimidazoles of the above described type.

EXAMPLE 12

Formulations of fluid compositions were prepared in accordance with the procedure described in Example 1 using the quantities of materials and components set forth in Table 11 to demonstrate the superior characterizing properties exhibited by the fluid compositions of the present invention. The characterizing properties—determined in accordance with the procedures set forth in the Boeing Material Specification for Fire Resistant Hydraulic Fluid. BMS 2-11G (Rev. Jul. 17, 1986) also are set forth in Table 11. In this table, "TBP" refers to tributyl phosphate; "TIBP" refers to triisobutyl phosphate; "DIBPP" refers to diisobutyl phenyl phosphate; "DBPP" refers to dibutyl phenyl phosphate; "DBPP (>99%)" refers to dibutyl phenyl phosphate of greater than 99% by weight purity; "S-154" refers to a fluid base stock component comprising about 42.8% triphenyl phosphate, about 41.7% tert-butylphenyl diphenyl phosphate, about 12.8% di(tert-butylphenyl) phenyl phosphate, 1.3% tri(tert-butylphenyl) phosphate, and 1.4% light ends and other unidentified material, all such concentrations expressed by weight; "Kronitex 100" refers to tri(isopropylphenyl) phosphate commercially available from FMC Corporation; "6703", "6770", "6477", and "6961-PMN" refer to poly(alkyl methacrylate) viscosity index improvers commercially available from Rohm and Haas Company; "HF411" and "HF460" refer to poly(butyl/hexyl methacrylate) viscosity index improvers, "$C_6$–$C_{10}$ polyacrylate" refers to a viscosity index improver, commercially available from Union Carbide Corporation; "FC-98" refers to an antierosion agent comprising [a potassium salt of perfluorooctylsulfonic acid, also known as perfluorooctanesulfonic acid] *a mixture of a potassium salt of perfluoroethyl cyclohexyl sulfonate, a potassium salt of perfluoromethyl cyclohexyl sulfonate, a potassium salt of perfluorodimethyl cyclohexyl sulfonate, and a potassium salt of perfluorocyclohexyl sulfonate*; "NH4PF6/Ca(SO3DF3)2" refers to an antierosion agent comprising a mixture of ammonium hexafluorophosphate ($NH_4PF_6$) and calcium di(perfluoromethanesulfonate) [$Ca(SO_3CF_3)_2$]; "MCS 1562" refers to 2-ethylhexyl 3,4-epoxycyclohexanecarboxylate, an acid scavenger, described in U.S. Pat. No. 3,723,320; "ERL 4234" refers to 2-(3,4-epoxycyclohexyl)-5,5-spiro(3,4-epoxy)cyclohexane-m-dioxane, an acid scavenger, commercially available from Union Carbide Corporation; "DODPA" refers to di(p-octylphenyl)amine, an antioxidant; "Ionol" refers to 2,6-di-tert-butyl-p-cresol, an antioxidant, commercially *available* from Shell Chemical Company; "E-702" refers to bis(3,5-di-tert-butyl- 4-hydroxyphenyl)methane, an antioxidant, commercially available under the trade designation Ethanox® 702 from Ethyl Corporation; "E-330" refers to 1,3,5-trimethyl-2,4,6-tris(3,5-di-tert-butyl hydroxyphenyl) benzene, an antioxidant, commercially available under the trade designation Ethanox® 330 from Ethyl Corporation; "KOPHEN" refers to potassium phenate; "P-57068" refers to a benzotriazole derivative, a copper corrosion inhibitor, commercially available under the trade designation Petrolite 57068 from Petrolite Corporation; "FH-132" refers to 1,2-di(phenylthio)ethane, a copper corrosion inhibitor, "P-31001" refers to an iron corrosion inhibitor, commercially available under the trade designation Petrolite 31001 from Petrolite Corporation; "Vanl RI-G" refers to the condensation product of 4,5-dihydro-1H-imidazole and $C_{16}$–$C_{18}$ fatty acid commercially available under the trade designation Vanlube RI-G from Vanderbilt Company; "Sarkosyl-O" refers to N-methyl-N-(1-oxo-9-octadecenyl) glycine commercially available under the trade designation Sarkosyl®-O from Ciba-Geigy Corporation; and "Unamine C" refers to 1-hydroxyethyl-2-coca-imidazoline, an iron corrosion inhibitor.

TABLE 11[1]

| | Skydrol ® I.D.4[2] | Hyjet ® IVA[3] | 1[4] | 2[4] | 3[5] | 4[6] | 5[7] | 6[8] |
|---|---|---|---|---|---|---|---|---|
| Phosphate Ester Base Stock | | | | | | | | |
| TBP | 50–60 | 72.60 | 67.00 | 67.00 | | | | |
| TIBP | | | | | 69.00 | 62.00 | 87.55 | 82.90 |
| DIBPP | | | | | 22.00 | 20.00 | 10.00 | 5.00 |
| DBPP | 30–35 | | 22.30 | 22.30 | | | | |
| DBPP (>99%) | | | | | | | | |
| S-154 | | | | | | | | |
| Kronitex 100 | | 11.80 | | | | | | |
| Viscosity Index Improver | | | | | | | | |
| 6703 | | | | | | | | 4.65 |
| 6770 | | | | | 6.30 | 4.50 | 4.50 | |
| 6477 | | | 7.50 | 7.50 | | | | |
| 6961-PMN | | | | | | | | |
| HF411 | 5–10 | | | | | | | |
| HF460 | | | | | | | | |
| $C_6$–$C_{10}$ Polyacrylate | | 6.00 | | | | | | |
| Anti-Erosion Agent | | | | | | | | |
| FC-98, ppm | 0.005–1.00 | | 500 | 500 | 500 | 500 | 250 | 250 |
| $NH_4PF_6/Ca(SO_4CF_3)_2$ | | 0.078 | | | | | | |
| Acid Scavenger (Epoxide) | | | | | | | | |
| MCS 1562 | 4–8 | | 6.30 | 6.30 | 6.30 | 6.30 | 5.80 | 5.80 |
| ERL 4234 | | 1.9–2.3 | | | | | | |
| Antioxidant | | | | | | | | |
| DODPA | | 1.00 | 0.45 | 0.45 | 0.45 | 0.45 | 0.45 | 0.45 |
| Ionol | 1.00 | 0.50 | 0.25 | 0.25 | 0.25 | 0.25 | 0.25 | 0.25 |
| E-702 | | | 0.90 | 0.90 | 0.90 | 0.45 | 0.45 | 0.45 |
| E-330 | | | | | | 0.45 | 0.45 | 0.45 |
| KOPHEN, ppm | | | 350 | 350 | 350 | 350 | | |
| Copper Corrosion Inhibitor | | | | | | | | |
| P-57068 | | | 0.05 | 0.05 | 0.05 | 0.05 | | |
| FH-132 | 0.13–1.00 | | | | | | 0.50 | |
| Iron Corrosion Inhibitor | | | | | | | | |
| P-31001 | | | 0.05 | | | | | |
| Vant RI-G, ppm | | | | 250 | 250 | 250 | 250 | 250 |
| Sarkosyl O | | | | | | | | |
| Unamine C | | 0.15 | | | | | | |
| Water | | 0.23 | 0.14 | | 0.15 | 0.15 | | |
| Char. Properties | | | | | | | | |
| Acidity | | 0.09 | 0.02 | | 0.1 | 0.1 | | |
| Viscosity, cst | | | | | | | | |
| @−65° F. (−53.8° C.) | 1185 | 1353 | 1777 | | 3957 | 2720 | 1945 | 1778 |
| 100° F. (37.8° C.) | 11.42 | 10.81 | 14.40 | | 13.51 | 9.29 | 8.76 | 8.89 |
| 210° F. (98.9° C.) | 3.93 | 3.62 | 5.00 | | 4.28 | 3.09 | 2.95 | 3.03 |
| Thermal Stability, hr @325° F. (162.8° C.) | −300 | — | 677 | 420 | 1264 | 1251 | | |
| Bulk Modulus, psi | 221,000 | 246,000 | 212,000 | — | 201,000 | 201,000 | 211,000 | |
| Autoignition Temp., °F./°C. | 880/471.1 | 800/426.7 | 870/465.6 | | 950/510 | 950/510 | | |

| | 7[9] | 8[10] | 9[11] | 10[11] | 11[11] | 12[12] | 13[13] |
|---|---|---|---|---|---|---|---|
| Phosphate Ester Base Stock | | | | | | | |
| TBP | 65.51 | 69.10 | 84.35 | 84.35 | 84.40 | 84.61 | 86.60 |
| TIBP | | | | | | | |
| DIBPP | 20.54 | 18.00 | | | | | |
| DBPP | | | 3.00 | 3.00 | 3.00 | 3.00 | |
| DBPP (>99%) | | | | | | | |
| S-154 | | | | | | | |
| Kronitex 100 | | | | | | | |
| Viscosity Index Improver | | | | | | | |
| 6703 | 5.50 | 4.70 | 4.50 | 4.70 | 4.65 | | 5.25 |
| 6770 | | | | | | | |
| 6477 | | | | | | 4.65 | |
| 6961-PMN | | | | | | | |
| HF411 | | | | | | | |
| HF460 | | | | | | | |
| $C_6$–$C_{10}$ Polyacrylate | | | | | | | |

TABLE 11[1]-continued

| | | | | | | | |
|---|---|---|---|---|---|---|---|
| Anti-Erosion Agent | | | | | | | |
| FC-98, ppm | 250 | 250 | 250 | 250 | 250 | 250 | 250 |
| $NH_4PF_6/Ca(SO_4CF_3)_2$ | | | | | | | |
| Acid Scavenger (Epoxide) | | | | | | | |
| MCS 1562 | 6.30 | 6.00 | 6.00 | 5.80 | 5.80 | 5.80 | 6.00 |
| ERL 4234 | | | | | | | |
| Antioxidant | | | | | | | |
| DODPA | 0.45 | 0.45 | 0.45 | 0.45 | 0.45 | 0.45 | 0.45 |
| Ionol | 0.25 | 0.25 | 0.25 | 0.25 | 0.25 | 0.25 | 0.25 |
| E-702 | 0.45 | 0.45 | 0.45 | 0.45 | 0.45 | 0.45 | 0.45 |
| E-330 | 0.45 | 0.45 | 0.45 | 0.45 | 0.45 | 0.45 | 0.45 |
| KOPHEN, ppm | | | | | | | |
| Copper Corrosion Inhibitor | | | | | | | |
| P-57068 | 0.50 | 0.50 | 0.50 | 0.50 | 0.50 | 0.50 | 0.50 |
| FH-132 | | | | | | | |
| Iron Corrosion Inhibitor | | | | | | | |
| P-31001 | 250 | 250 | 250 | 250 | 250 | 250 | 250 |
| Vant RI-G, ppm | | | | | | | |
| Sarkosyl O | | | | | | | |
| Unamine C | 0.09 | | | | 0.15 | | |
| Water | | | | | | | |
| Char. Properties | | | | | | | |
| Acidity | 0.04 | | | | 0.03 | | |
| Viscosity, cst | | | | | | | |
| @−65° F. (−53.8° C.) | 2438 | 1822 | 1899 | 2045 | 1886 | 4226 | 1831 |
| 100° F. (37.8° C.) | 11.15 | 9.46 | 8.86 | 9.09 | 9.05 | 12.11 | 9.47 |
| 210° F. (98.9° C.) | 3.69 | 3.17 | 2.98 | 3.07 | 3.08 | 3.75 | 3.21 |
| Thermal Stability, hr @325° F. (162.8° C.) | 929 | >900 | | | | | 1800 |
| Bulk Modulus, psi | 215,000 | 216,000 | 210,000 | 209,000 | | | 205,000 |
| Autoignition Temp., °F./°C. | 900/482.2 | 900/482.2 | 890/476.7 | | 880/471.1 | | 880/471.1 |

[1]Except as otherwise indicated, amounts of components are expressed as % by weight.
[2]Skydrol ® LD-4 aircraft hydraulic fluid; commercially available from Monsanto Company.
[3]Hyjet ® IVA aircraft hydraulic fluid; commercially available from Chevron International Oil Company.
[4]The phosphate ester base stock comprises 75.03% by weight TBP and 24.97% BY WEIGHT DBPP.
[5]The phosphate ester base stock comprises 75.82% TIBP and 24.18% by weight DIBPP.
[6]The phosphate ester base stock comprises 73.81% TIBP and 24.39% by weight DIBPP.
[7]The phosphate ester base stock comprises 89.75% TIBP and 10.25% by weight DIBPP.
[8]The phosphate ester base stock comprises 94.31% TIBP and 5.69% by weight DIBPP.
[9]The phosphate ester base stock comprises 76.13% TIBP and 23.87% by weight DBPP (>99%).
[10]The phosphate ester base stock comprises 79.33% TIBP and 20.67% by weight DBPP (>99%).
[11]The phosphate ester base stock comprises 96.57% TIBP, and 3.43% by weight triaryl phosphate [tri-phenyl phosphate (TPP) - 42.8%, tert-butylphenyl diphenyl phosphate (TBPDP) - 41.7%, di(tert-butylphenyl)phenyl phosphate (DTBPPP) - 12.8%, and tri(tert-butylphenyl)phosphate - 1.3% (TTBPP), and 1.4% light ends and other unindentified materials].
[12]The phosphate ester base stock comprises 96.58% TIBP and 3.42% by weight triaryl phosphate (42.8% TPP, 41.7% TBPDP, 12.8% DTBPPP, and 1.3% TTBPP).
[13]The phosphate ester base stock comprises 100.00% by weight of TIBP.

EXAMPLE 13

Tests were conducted to compare the hydrolytic stability of certain representative formulations set forth in Table 11 with commercially available hydraulic fluids to demonstrate the superior hydrolytic stability of the fluid compositions of the instant invention containing either or both the additive package suitable for use in fluid compositions of the instant invention and the isoalkyl phosphate ester-based base stocks and the isoalkyl phosphate ester/aryl phosphate ester-based base stocks. In each of the tests, a 301 stainless steel tube having dimensions of approximately 1.90 cm (0.75 in) I.D.×22.86 cm (9.0 in) length and a capacity of approximately 53 cc was filled to approximately 85% capacity (approximately 45 cc) with the fluid to be tested. The head space in the tube was filled with air. The tube was capped and heated to a predetermined test temperature—325° F. (162.7° C.)—and maintained at that temperature throughout the test. Each tube was monitored over time and samples were taken to follow trends in the fluid's chemical composition, in particular the concentration of the acid scavenger (epoxide) present in the sample. When the epoxide is 100% depleted, the fluid is typically degraded to the point that its usefulness as an aircraft hydraulic fluid has essentially been exhausted. An epoxide depletion approached 100%, test samples were titrated for acidity. When the neutralization number of the fluid reached 1.5 or greater, the test was halted and the number of hours recorded. The parameters and results are tabulated in Table 12.

TABLE 12

Fluid Hydrolytic Stability @ 325° F.

| Fluid (from Table 11) | Stability, hr. @ % Water <0.2 (Neat) | 0.5 |
|---|---|---|
| Skydrol ® LD-4[1] | 300 | 37 |
| Hyjet ® IVA[2] | 200 | 28 |
| 2 | 450 | 85 |
| 5 | 1000 | 310 |
| 11 | >1000 | 350 |

[1]Commercially available from Monsanto Company.
[2]Commercially available from Chevron International Oil Company.

What is claimed is:

1. A fluid composition suitable for use as an aircraft hydraulic fluid, comprising:

(a) a fire resistant phosphate ester base stock, the basic stock comprising between about 50% and about 85% by weight of a trialkyl phosphate in which the alkyl substituents are substantially isoalkyl C4 or $C_5$ and are bonded to the phosphate moiety via a primary carbon atom, between about 18% and about 35% by weight of a dialkyl aryl phosphate in which the alkyl substituents are as previously defined, and between about 0% and about 5% by weight of an alkyl diaryl phosphate in which the alkyl substituent is as previously defined, with the proviso that the sum of the proportionate amount of each base stock component must equal 100%;

(b) an acid scavenger in an amount effective to neutralize phosphoric acid and phosphoric acid partial esters formed in situ by hydrolysis of any of the phosphate esters of said base stock, *wherein said acid scavenger comprises an epoxide compound*;

(c) an anti-erosion additive in an amount effective to inhibit flow-induced electrochemical or zeta corrosion of the flow-metering edges of hydraulic servo valves in hydraulic systems, *wherein said anti-erosion additive comprises an alkali metal salt of a perfluoroalkyl sulfonic acid*;

(d) a viscosity index improver in an amount effective to cause the fluid composition to exhibit a viscosity of at least about 3.0 centistokes at about 210° F., at least about 9.0 centistokes at about 100° F., and less than about 4200 centistokes at −65° F., *wherein said viscosity index improver comprises a methacrylate ester polymer at least 95% by weight of the polymer having a molecular weight of between about 50,000 and 1,500,000*; and (e) an antioxidant in an amount effective to inhibit oxidation of fluid composition components in the presence of oxidizing agents, *wherein said antioxidant is selected from the group consisting of at least one hindered phenol and a combination of at least one hindered phenol and at least one amine compound*.

2. A fluid composition as set forth in claim 1 wherein said dialkyl aryl phosphate is a dialkyl phenyl phosphate.

3. A fluid composition as set forth in claim 1 wherein the viscosity index improver is present in an amount effective to cause the fluid composition to exhibit a viscosity between about 3 and about 5 centistokes at about 210° F. and between about 9 and about 15 centistokes at 100° F.

4. A fluid composition as set forth in claim 1 containing a viscosity index improver in a proportion of between about 3% and about 10% by weight of the fluid composition.

5. A fluid composition as set forth in claim [1] *91* containing a 2,4,6-trialkylphenol in a proportion of between about 0.1% and about 1.0% by weight of the fluid composition, a di(alkylphenyl)amine in a proportion of between about 0.3% and about 1.0% by weight of the fluid composition, and a hindered polyphenol selected from the group consisting of bis(3,5-dialkyl-4-hydroxyaryl)methane and 1,3,5-trialkyl-2,4,6-tris(3,5-di-tert-butyl-4-hydroxyaryl) benzene and mixtures thereof, in a proportion of between about 0.3% and about 1.0% by weight of the fluid composition.

6. A fluid composition as set forth in claim 2 wherein phosphate esters containing an aryl substituent do not constitute more than about 25% by weight of the base stock.

7. A fluid composition suitable for use as an aircraft hydraulic fluid, comprising:

(a) a fire resistant phosphate ester base stock comprising between about 10% and about 90% of a trialkyl phosphate wherein the alkyl substituents are substantially isoalkyl $C_4$ and $C_5$ and are bonded to the phosphate moiety via a primary carbon atom, between about 0% and about 70% by weight of a dialkyl aryl phosphate wherein the alkyl substituents are as previously defined, and between about 0% and about 25% by weight of an alkyl diaryl phosphate wherein the alkyl substituent is as previously defined, with the proviso that the sum of the proportionate amount of each base stock component must equal 100%;

(b) a viscosity index improver in a proportion of between about 3% and about 10% by weight of the fluid composition, the viscosity index improver comprising a methacrylate ester polymer, the repeating units of which substantially comprise butyl and hexyl methacrylate, at least 95% by weight of the polymer having a molecular weight of between about 50,000 and about 1,500,000;

(c) an anti-erosion agent in a proportion of between about 0.02% and about 0.08% by weight of the fluid composition, the anti-erosion agent comprising an alkali metal salt of a perfluoroalkyl sulfonic acid, the alkyl substituent of which is selected from the group consisting of hexyl, heptyl, octyl, nonyl, decyl, and mixtures thereof;

(d) an acid scavenger in a proportion of between about 1.5% and about 10% by weight of the fluid composition, the acid scavenger comprising an epoxide compound;

(e) a 2,4,6-trialkylphenol in a proportion of between about 0.1% and about 1.0% by weight of the fluid composition;

(f) a di(alkylphenyl)amine in a proportion of between about 0.3% and about 1.0% by weight of the fluid composition; and (g) a hindered polyphenol selected from the group consisting of bis(3,5-dialkyl-4-hydroxyaryl)methane, 1,3,5-trimethyl-2,4,6-tris(3,5-di-tert-butyl)-4-hydroxyaryl)benzene and mixtures thereof in a proportion of between about 0.3% and about 1.0% by weight of the fluid composition.

8. A fluid composition suitable for use as an aircraft hydraulic fluid, comprising:

(a) a fire resistant phosphate ester base stock comprising between about 10% and about 90% by weight of a trialkyl phosphate wherein the alkyl substituents are substantially isoalkyl $C_4$ or $C_5$ and are bonded to the phosphate moiety via a primary carbon atom, between about 0% and about 70% by weight of a dialkyl aryl phosphate wherein the alkyl substituents are as previously defined, and between about 0% and about 25% by weight of an alkyl diaryl phosphate wherein the alkyl substituent is as previously defined, with the proviso that the sum of the proportionate amount of each base stock component must equal 100%;

(b) a viscosity index improver in a proportion of between about 3% and about 10% by weight of the fluid composition, the viscosity index improver comprising a methacrylate ester polymer, the repeating units of which substantially comprise butyl and hexyl methacrylate, at least 95% by weight of the polymer having a molecular weight of between about 50,000 and about 1,500,000;

(c) an anti-erosion agent in a proportion of between about 0.02% and about 0.08% by weight of the fluid composition, the anti-erosion agent comprising an alkali metal salt of a perfluoroalkylsulfonic acid, the alkyl substituent of which is selected from the group consisting of hexyl, heptyl, octyl, nonyl, decyl, and mixtures thereof;

(d) an acid scavenger in a proportion of between about 1.5% and about 10% by weight of the composition, the acid scavenger selected from the group consisting of a derivative of a 3,4-epoxy cyclohexane carboxylate and a diepoxide compound corresponding to the formula

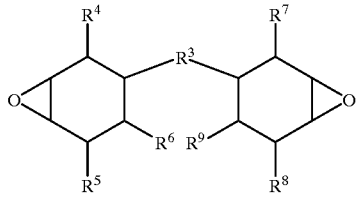

wherein $R^3$ is an organic group containing 1 to 10 carbon atoms, from 0 to 6 oxygen atoms and from 0 to 6 nitrogen atoms, and $R^4$ through $R^9$ are independently selected from among hydrogen and aliphatic groups containing 1 to 5 carbon atoms, and mixtures of the 3,4-epoxycyclohexane carboxylate and the diepoxide compound;

(e) 2,4,6-trialkylphenol in a proportion of between about 0.1% and about 1.0% by weight of the composition;

(f) a di(alkylphenyl)amine in a proportion of between about 0.3% and about 1.0% by weight of the fluid composition; and (g) a hindered polyphenol selected from the group consisting of bis(3,5-dialkyl-4-hydroxyaryl)methane, 1,3, 5-trimethyl-2,4,6-tris(3,5-di-tert-butyl-4 -hydroxyaryl) benzene, and mixtures thereof in a proportion of between about 0.3% and about 1.0% by weight of the fluid composition.

9. A fluid composition as set forth in claim 8 further comprising benzotriazole or a benzotriazole derivative in a proportion of between about [0,005] *0.005%* and about 0.09% as a copper corrosion inhibitor.

10. A fluid composition as set forth in claim 8 further comprising between about 0.0035% and about 0.010% by weight of an alkali metal arenate.

11. A fluid composition suitable for use as an aircraft hydraulic fluid, comprising:

(a) a fire resistant phosphate ester base stock comprising between about 35% and about 90% by weight of a trialkyl phosphate wherein the alkyl substituents are substantially isoalkyl $C_4$ and $C_5$ and are bonded to the phosphate moiety via a primary carbon atom, between about 0% and about 35% by weight of a dialkyl aryl phosphate wherein the alkyl substituents are as previously defined, and between about 0% and about 20% by weight of a triaryl phosphate, with the proviso that the sum of the proportionate amount of each base stock component must equal 100%;

(b) a viscosity index improver in a proportion of between about 3% and about 10% by weight of the fluid composition, the viscosity index improver comprising a methacrylate ester polymer, the repeating units of which substantially comprise butyl and hexyl methacrylate, at least 95% by weight of the polymer having a molecular weight of between about 50,000 and about 1,500,000;

(c) an anti-erosion agent in a proportion of between about 0.02% and about 0.08% by weight of the fluid composition, the anti-erosion agent comprising an alkali metal salt of a perfluoroalkyl sulfonic acid, the alkyl substituent of which is selected from the group consisting of hexyl, heptyl, octyl, nonyl, decyl, and mixtures thereof;

(d) an acid scavenger in a proportion of between about 1.5% and about 10% by weight of the fluid composition, the acid scavenger selected from the group consisting of a derivative of a 3,4-epoxy cyclohexane carboxylate and a diepoxide compound corresponding to the formula

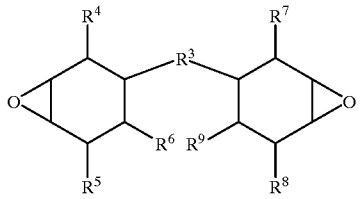

wherein $R^3$ is an organic group containing 1 to 10 carbon atoms, from 0 to 6 oxygen atoms, and from 0 to 6 nitrogen atoms, and $R^4$ through $R^9$ are independently selected from among hydrogen and aliphatic groups containing 1 to 5 carbon atoms, and mixtures of the 3,4-epoxycyclohexanecarboxylate and the diepoxide compound;

(e) a 2,4,6-trialkylphenol in a proportion or between about 0.1% and about 1.0% by weight of the fluid composition;

(f) a di(alkylphenyl)amine in a proportion of between about 0.3% and about 1.0% by weight of the fluid composition; and (g) a hindered polyphenol selected from the group consisting of bis(3,5-dialkyl-4-hydroxyaryl) methane, 1,3, 5-trimethyl-2,4,6-tris(3,5-di-tert-butyl-4-hydroxyaryl) benzene and mixtures thereof in a proportion of between about 0.3% and about 1.0% by weight of the fluid composition.

12. A fluid composition as set forth in claim 11 wherein the base stock comprises between about 80% and about 90% by weight of the trialkyl phosphate and between about 10% and about 208 by weight of a tri(alkylaryl)phosphate.

13. A fluid composition as set forth in claim 12 wherein the tri(alkylaryl) phosphate is selected from the group consisting of tri(isopropylphenyl)phosphate, tri(isobutylphenyl) phosphate, and tri(tert-butylphenyl)phosphate.

14. A fluid composition as set forth in claim 8 wherein the base stock comprises between about 10% and about 72% by weight of the trialkyl phosphate, between about 18% and about 70% by weight of the dialkyl aryl phosphate, and between about 0% and about 25% by weight of the alkyl diaryl phosphate.

15. A fluid composition as set forth in claim 14 wherein the base stock comprises between about 10% and about 25% by weight of the trialkyl phosphate, between about 45% and about 70% by weight of the dialkyl aryl phosphate, and between about 5% and about 25% by weight of the alkyl diaryl phosphate.

16. A fluid composition as set forth in claim 14 wherein the base stock comprises between about 50% and about 72% by weight of the trialkyl phosphate, between about 18% and about 35% by weight of the dialkyl aryl phosphate, and between about 0% and about 10% by weight of the alkyl diaryl phosphate.

17. A fluid composition as set forth in claim 8 wherein the base stock contains between about 0% and about 5% by weight of the alkyl diaryl phosphate.

18. A composition as set forth in claim 8 wherein said alkyl substituents are substantially isobutyl or isopentyl.

19. A fluid composition suitable for use as an aircraft hydraulic fluid, comprising:

(a) a fire resistant phosphate ester base stock, the base stock comprising between about 10 and about 90% by weight of a trialkyl phosphate wherein the alkyl substituents are substantially isobutyl or isopentyl and are bonded to the phosphate moiety via a primary carbon atom, between about 0% and about 70% by weight of a dialkyl aryl phosphate wherein the alkyl substituents are as previously defined, and between about 0% and about 25% by weight of an alkyl diaryl phosphate wherein the alkyl substituent is as previously defined, with the proviso that the sum of the proportionate amount of each base stock component must equal 100%;

(b) an acid scavenger in an amount effective to neutralize phosphoric acid partial esters formed in situ by hydrolysis of any of the phosphate esters of the base stock, *wherein said acid scavenger comprises an epoxide compound*;

(c) an anti-erosion additive in an amount effective to inhibit flow-induced electrochemical or zeta corrosion of the flow-metering edges of hydraulic servo valves in hydraulic systems, *wherein said anti-erosion additive comprises an alkali metal salt of a perfluoroalkyl sulfonic acid*;

(d) a viscosity index improver in an amount effective to cause the fluid composition to exhibit a viscosity of at least about 3.0 centistokes at about 210° F., at least about 9.0 centistokes at about 100° F., and less than about 4200 centistokes at −65° F., *wherein said viscosity index improver comprises a methacrylate ester polymer at least 95% by weight of the polymer having a molecular weight of between about 50,000 and 1,500,000*; and (e) an antioxidant in an amount effective to inhibit oxidation of fluid composition components in the presence of oxidizing agents, *wherein said antioxidant is selected from the group consisting of at least one hindered phenol and a combination of at least one hindered phenol and at least one amine compound*.

20. A fluid composition as set forth in claim 19 wherein the trialkyl phosphate is triisobutyl phosphate and the dialkyl aryl phosphate is diisobutyl phenyl phosphate.

21. A fluid composition as set forth in claim 19 further comprising benzotriazole or a benzotriazole derivative in a proportion of between about 0.005% and about 0.09% by weight as a copper corrosion inhibitor.

22. A fluid composition as set forth in claim 19 further comprising a 4,5-dihydroimidazole compound corresponding to the formula

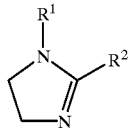

where $R^1$ is selected from the group consisting of hydrogen, alkyl, alkenyl, hydroxyalkyl, hydroxyalkenyl, alkoxyalkyl and alkoxyalkenyl, and $R^2$ is selected from the group consisting of alkyl, alkenyl and aliphatic carboxylate.

23. A fluid composition as set forth in claim 22 wherein the 4,5-dihydroimidazole is selected from the group consisting of 2-(8-heptadecenyl)-4,5-dihydro-1H-imidazole-1-ethanol and the condensation product of a $C_{14}$ to $C_{18}$ fatty acid and 4,5-dihydro-1H-imidazole.

24. A fluid composition as set forth in claim 23 wherein the 4,5-dihydroimidazole compound is the condensation product of a $C_{16}$ to $C_{18}$ fatty acid and 4,5-dihydro-1H-imidazole.

25. A fluid composition as set forth in claim [22] *19* wherein the *hindered phenol* antioxidant comprises a *mixture of a* hindered phenol *and a hindered polyphenol*.

26. A fluid composition as set forth in claim 25 wherein the hindered [phenol] *polyphenol* comprises a [hindered polyphenol] compound selected from the group consisting of bis (3,5-dialkyl-4-hydroxyaryl)methane, 1,3,5-trialkyl-2,4,6-tris(3,5 -di-tert-butyl-4-hydroxyaryl) benzene, and mixtures thereof.

[27. A fluid composition as set forth in claim 25 wherein the antioxidant further comprises an amine compound.]

28. A fluid composition as set forth in claim [27] *25* wherein the antioxidant amine compound is a diarylamine.

29. A fluid composition as set forth in claim 28 wherein the diarylamine is di(p-octylphenyl)amine.

30. A fluid composition as set forth in claim 28 further comprising up to about 0.7% by weight of 2,6-di-tert-butyl-p-cresol.

31. A fluid composition suitable for use as an aircraft hydraulic fluid, comprising:

(a) a fire resistant phosphate ester base stock, the base stock comprising between about 10% and about 90% by weight of a trialkyl phosphate wherein the alkyl substituents are substantially isoalkyl $C_4$ or $C_5$ and are bonded to the phosphate moiety via a primary carbon atom, between about 0% and about 70% by weight of a dialkyl aryl phosphate wherein the alkyl substituents are as previously defined, and between about 0% and about 25% by weight of an alkyl diaryl phosphate wherein the alkyl substituent is as previously defined;

(b) an acid scavenger in an amount effective to neutralize phosphoric acid and phosphoric acid partial esters formed in situ by hydrolysis of any of the phosphate esters of the base stock, *wherein said acid scavenger comprises an epoxide compound*;

(c) an anti-erosion additive in an amount effective to inhibit flow-induced electrochemical or zeta corrosion of the flow-metering edges of hydraulic servo valves in hydraulic systems, *wherein said anti-erosion additive*

*comprises an alkali metal salt of a perfluoroalkyl sulfonic acid*;

(d) a viscosity index improver in an amount effective to cause the fluid composition to exhibit a viscosity of at least about 3.0 centistokes at about 210° F., at least about 9.0 centistokes at about 100° F., and less than about 4200 centistokes at −65° F., *wherein said viscosity index improver comprises a methacrylate ester polymer at least 95% by weight of the polymer having a molecular weight of between about 50,000 and 1,500,000*;

(e) an antioxidant in an amount effective to inhibit oxidation of fluid composition components in the presence of oxidizing agents, *wherein said antioxidant is selected from the group consisting of at least one hindered phenol and a combination of at least one hindered phenol and at least one amine compound*; and (f) a 4,5-dihydroimidazole compound in an amount effective to increase the stability of the composition by at least 25% at 300° F. as measured by epoxide depletion, the 4,5-dihydroimidazole compound corresponding to the formula

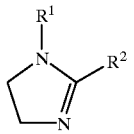

wherein $R^1$ is selected from the group consisting of hydrogen, alkyl, alkenyl, hydroxyalkyl, hydroxyalkenyl, alkoxyalkyl and alkoxyalkenyl, and $R^2$ is selected from the group consisting of alkyl, alkenyl and aliphatic carboxylate.

32. A fluid composition as set forth in claim 31 wherein $R^1$ is hydrogen or lower alkyl and $R^2$ is a fatty acid residue.

33. A fluid composition as set forth in claim 31 wherein $R^1$ is hydroxyalkyl and $R^2$ is alkenyl.

34. A fluid composition as set forth in claim 31 wherein the 4,5-dihydroimidazole is selected from the group consisting of 2-(8-heptadecenyl)-4,5-dihydro-1H-imidazole-1-ethanol and the condensation product of a $C_{14}$ to $C_{18}$ fatty acid and 4,5-dihydro-1H-imidazole.

35. A fluid composition as set forth in claim 34 wherein the 4,5-dihydroimidazole compound is the condensation product of a $C_{16}$ to $C_{18}$ fatty acid and 4,5-dihydro-1H-imidazole.

36. A composition as set forth in claim 35 wherein said alkyl substituents of said trialkyl phosphate and said dialkyl aryl phosphate are substantially isobutyl or isopentyl.

37. A fluid composition as set forth in claim 31 wherein the *hindered phenol* antioxidant comprises a *mixture of a* hindered phenol *and a hindered polyphenol*.

38. A fluid composition as set forth in claim 37 wherein the hindered [phenol] *polyphenol* comprises a [hindered polyphenol] compound selected from the group consisting of bis(3,5-dialkyl-4-hydroxyaryl)methane, 1,3,5-trialkyl-2,4,6-tris(3,5-di-tert-butyl-4-hydroxyaryl)benzene, and mixtures thereof.

[39. A fluid composition as set forth in claim 37 wherein the antioxidant further comprises an amine compound.]

40. A fluid composition as set forth in claim [39] *31* [further comprising] *wherein the antioxidant amine compound is* a diarylamine [antioxidant].

41. A composition as set forth in claim 40 wherein said diarylamine comprises di(p-octylphenyl)amine.

42. A composition as set forth in claim 40 further comprising up to about 1.0% by weight of 2,6-di-tertiary-butyl p-cresol.

43. A composition as set forth in claim 31 wherein said alkyl substituents of said trialkyl phosphate and said dialkyl aryl phosphate are substantially isobutyl or isopentyl.

[44. A fluid composition as set forth in claim 1 wherein the viscosity index improver is a methacrylate ester polymer, the repeating units of which substantially comprise butyl and hexyl methacrylate, at least 95% by weight of the polymer having a molecular weight of between about 50,000 and about 1,500,000.]

45. A fluid composition as set forth in claim 19 further comprising an anti-foam agent.

46. A fluid composition as set forth in claim 45 wherein the anti-foam agent is a polyalkylsiloxane.

47. A fluid composition as set forth in claim 46 wherein the polyalkylsiloxane is polymethylsiloxane.

48. A fluid composition as set forth in claim 45 wherein the anti-foam agent is present in a concentration of from about 0.0001% to about 0.001% by weight of the fluid composition.

49. A fluid composition as set forth in claim 48 wherein the anti-foam agent is present in a concentration of about 0.0005% by weight of the fluid composition.

50. A fluid composition suitable for use as an aircraft hydraulic fluid, comprising:

(a) a fire resistant phosphate ester base stock, the base stock comprising between about 10% and about 100% by weight of a trialkyl phosphate in which the alkyl substituents are substantially isoalkyl $C_4$ or $C_5$ and are bonded to the phosphate moiety via a primary carbon atom, between about 0% and about 70% by weight of a dialkyl aryl phosphate in which the alkyl substituents are as previously defined, and between about 0% and about 25% by weight of an alkyl diaryl phosphate in which the alkyl substituent is as previously defined, with the proviso that the sum of the proportionate amount of each base stock component must equal 100%;

(b) an acid scavenger in an amount effective to neutralize phosphoric acid partial esters formed in situ by hydrolysis of any of the phosphate esters of the base stock, *wherein said acid scavenger comprises an epoxide compound*;

(c) an anti-erosion additive in an amount effective to inhibit flow-induced electrochemical or zeta corrosion of the flow-metering edges of hydraulic servo valves in hydraulic systems, *wherein said anti-erosion additive comprises an alkali metal salt of a perfluoroalkyl sulfonic acid*;

(d) a viscosity index improver in an amount effective to cause the fluid composition to exhibit a viscosity of at least about 3.0 centistokes at about 210° F., at least about 9.0 centistokes at about 100° F., and less than about 4200 centistokes at −65° F., *wherein said viscosity index improver comprises a methacrylate ester polymer at least 95% by weight of the polymer having a molecular weight of between about 50,000 and 1,500,000*; and (e) an antioxidant in an amount effective to inhibit oxidation of fluid composition components in the presence of oxidizing agents, *wherein said antioxidant is selected from the group consisting of at least one hindered phenol and a combination of at least one hindered phenol and at least one amine compound*.

51. A fluid composition as set forth in claim 50 further comprising benzotriazole or a benzotriazole derivative in a proportion of between about 0.005% and about 0.09% by weight as a copper corrosion inhibitor.

52. A fluid composition as set forth in claim 50 or 51 further comprising a 4,5-dihydroimidazole compound corresponding to the formula

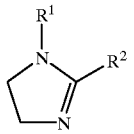

wherein $R^1$ is selected from the group consisting of hydrogen, alkyl, alkenyl, hydroxyalkyl, hydroxyalkenyl, alkoxyalkyl and alkoxyalkenyl, and $R^2$ is selected from the group consisting of alkyl, alkenyl and aliphatic carboxylate.

53. A fluid composition as set forth in claim 52 wherein the 4,5-dihydroimidazole compound is present in a proportion of between about 0.01% and about 0.1% by weight of the fluid composition.

54. A fluid composition as set forth in claim 52 wherein the 4,5-dihydroimidazole is selected from the group consisting of 2-(8-heptadecenyl)-4,5-dihydro-1H-imidazole-1-ethanol and the condensation product of a $C_{14}$ to $C_{15}$ fatty acid and 4,5-dihydro-1H-imidazole.

55. A fluid composition as set forth in claim 54 wherein the 4,5-dihydroimidazole compound is the condensation product of a C16 to $C_{18}$ fatty acid and 4,5-dihydro-1H-imidazole.

56. A fluid composition suitable for use as an aircraft hydraulic fluid, comprising:

(a) a fire resistant phosphate ester base stock, said base stock comprising between about 10% and about 100% by weight of a trialkyl phosphate in which the alkyl substituents are substantially isoalkyl $C_4$ or $C_5$ and are bonded to the phosphate moiety via a primary carbon atom, between about 0% and about 70% by weight of a dialkyl aryl phosphate in which the alkyl substituents are as previously defined, and between about 0% and about 25% by weight of an alkyl diaryl phosphate in which the alkyl substituent is as previously defined, with the proviso that the sum of the proportionate amount of each base stock component must equal 100%;

(b) an acid scavenger in an amount effective to neutralize phosphoric acid and phosphoric acid partial esters formed in situ by hydrolysis of any of the phosphate esters of the base stock, *wherein said acid scavenger comprises an epoxide compound*;

(c) an anti-erosion additive in an amount effective to inhibit flow-induced electrochemical or zeta corrosion of the flow-metering edges of hydraulic servo valves in hydraulic systems, *wherein said anti-erosion additive comprises an alkali metal salt of a perfluoroalkyl sulfonic acid*;

(d) a viscosity index improver in an amount effective to cause the fluid composition to exhibit a viscosity of at least about 3.0 centistokes at about 210° F., at least about 9.0 centistokes at about 100° F., and less than about 4200 centistokes at −65° F., *wherein said viscosity index improver comprises a methacrylate ester polymer at least 95% by weight of the polymer having a molecular weight of between about 50,000 and 1,500,000*; and (e) an antioxidant in an amount effective to inhibit oxidation of fluid composition components in the presence of oxidizing agents, *wherein said antioxidant is selected from the group consisting of at least one hindered phenol and a combination of at least one hindered phenol and at least one amine compound.*

57. A fluid composition as set forth in claim 56 wherein the phosphate esters containing an aryl substituent do not constitute more than about 25% by weight of the base stock.

58. A fluid composition as set forth in claim 56 wherein the viscosity index improver is present in a proportion of between about 3% and about 10% by weight of the fluid composition.

59. A fluid composition as set forth in claim 56 [wherein the viscosity index improver is a methacrylate ester polymer, the repeating units of which substantially comprise butyl and hexyl methacrylate, at least 95% by weight of the polymer having a molecular weight of between about 50,000 and about 1,500,000] *wherein the hindered phenol antioxidant comprises a mixture of a hindered phenol and a hindered polyphenol.*

60. A fluid composition as set forth in claim [56] *98* wherein the antioxidant comprises a 2,4,6-trialkylphenol in a proportion of between about 0.1% and about 1.0% by weight of the composition, a di(alkylphenyl)amine in a proportion of between about 0.3% and about 1.0% by weight of the fluid composition, and a hindered polyphenol selected from the group consisting of bis(3,5-dialkyl-4-hydroxyaryl) methane and 1,3,5-trialkyl-2,4,6-tris(3,5-di-tert-butyl-4-hydroxyaryl)benzene, and mixtures thereof, in a proportion of between about 0.3% and about 1.0% by weight of the fluid composition.

61. A fluid composition as set forth in claim 60 wherein the 2,4,6-trialkylphenol is 2,6-di-tert-butyl-p-cresol and the hindered polyphenol is selected from the group consisting of bis (3,5-di-tert-butyl-4-hydroxyphenyl)methane, 1,3,5-trimethyl-2,4,6-tris (3,5-di-tert-butyl-4 -hydroxyphenyl) benzene, and mixtures thereof.

62. A fluid composition as set forth in claim 56 further comprising benzotriazole or a benzotriazole derivative in a proportion of between about 0.005% and about 0.09% by weight as a copper corrosion inhibitor.

63. A fluid composition as set forth in claim 56 or 62 further comprising a 4,5-dihydroimidazole compound corresponding to the formula

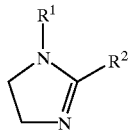

where $R^1$ is selected from the group consisting of hydrogen, alkyl, alkenyl, hydroxyalkyl, hydroxyalkenyl, alkoxyalkyl and alkoxyalkenyl, and $R^2$ is selected from the group consisting of alkyl, alkenyl and aliphatic carboxylate.

64. A fluid composition as set forth in claim 63 wherein the 4,5-dihydroimidazole compound is present in a proportion of between about 0.01% and about 0.1% by weight of the fluid composition.

65. A fluid composition as set forth in claim 63 wherein the 4,5-dihydroimidazole is selected from the group consisting of 2-(8-heptadecenyl)-4,5 -dihydro-1H-imidazole-1-ethanol and the condensation product of a $C_{14}$ to $C_{18}$ fatty acid and 4,5-dihydro-1H-imidazole.

66. A fluid composition as set forth in claim 65 wherein the 4,5-dihydroimidazole compound is the condensation product of a $C_6$ to $C_8$ fatty acid and 4,5-dihydro-1H-imidazole.

67. A fluid composition suitable for use as an aircraft hydraulic fluid, comprising:

(a) a fire resistant phosphate ester base stock, the base stock comprising between about 10% and about 100% by weight of a trialkyl phosphate in which the alkyl substituents are substantially isoalkyl $C_4$ or $C_5$ and are bonded to the phosphate moiety via a primary carbon atom, between about 0% and about 35% by weight of a dialkyl aryl phosphate in which the alkyl substituents are as previously defined, and between about 0% and about 20% by weight of a triaryl phosphate, with the proviso that the sum of the proportionate amount of each base stock component must equal 100%;

(b) an acid scavenger in an amount effective to neutralize phosphoric acid partial esters formed in situ by hydrolysis of any of the phosphate esters of the base stock, *wherein said acid scavenger comprises an epoxide compound*;

(c) an anti-erosion additive in an amount effective to inhibit flow-induced electrochemical or zeta corrosion of the flow-metering edges of hydraulic servo valves in hydraulic systems, *wherein said anti-erosion additive comprises an alkali metal salt of a perfluoroalkyl sulfonic acid*;

(d) a viscosity index improver in an amount effective to cause the fluid composition to exhibit a viscosity of at least about 3.0 centistokes at about 210° F., at least about 9.0 centistokes at about 100° F., and less than about 4200 centistokes at −65° F., *wherein said viscosity index improver comprises a methacrylate ester polymer at least 95% by weight of the polymer having a molecular weight of between about 50,000 and 1,500,000*; and (e) an antioxidant in an amount effective to inhibit oxidation of fluid composition components in the presence of oxidizing agents, *wherein said antioxidant is selected from the group consisting of at least one hindered phenol and a combination of at least one hindered phenol and at least one amine compound.*

68. A fluid composition as set forth in claim 67 wherein the phosphate esters containing an aryl substituent do not constitute more than about 25% by weight of the base stock.

69. A fluid composition as set forth in claim 67 wherein the viscosity index improver is present in a proportion of between about 3% and about 10% by weight of the fluid composition.

70. A fluid composition as set forth in claim 67 [wherein the viscosity index improver is a methacrylate ester polymer, the repeating units of which substantially comprise butyl and hexyl methacrylate, at least 95% by weight of the polymer having a molecular weight of between about 50,000 and about 1,500,000] *wherein the hindered phenol antioxidant comprises a mixture of a hindered phenol and a hindered polyphenol.*

71. A fluid composition as set forth in claim [67] *99* wherein the antioxidant comprises a 2,4,6-trialkylphenol in a proportion of between about 0.1% and about 1.0% by weight of the composition, a di(alkylphenyl)amine in a proportion of between about 0.3% and about 1.0% by weight of the fluid composition, and a hindered polyphenol selected from the group consisting of bis(3,5-dialkyl-4-hydroxyaryl) methane and 1,3,5-trialkyl-2,4,6-tris(3,5-di-tert-butyl-4-hydroxyaryl)benzene, and mixtures thereof, in a proportion of between about 0.3% and about 1.0% by weight of the fluid composition.

72. A fluid composition as set forth in claim 71 wherein the 2,4,6-trialkylphenol is 2,6-di-tert-butyl-p-cresol and the hindered polyphenol is selected from the group consisting of bis(3,5-di-tert-butyl-4-hydroxyphenyl)methane, 1,3,5-trimethyl-2,4,6-tris(3,5-di-tert-butyl-4-hydroxyphenyl) benzene, and mixtures thereof.

73. A fluid composition as set forth in claim 67 further comprising benzotriazole or a benzotriazole derivative in a proportion of between about 0.005% and about 0.09% by weight as a copper corrosion inhibitor.

74. A fluid composition as set forth in claim 67 or 73 further comprising a 4,5-dihydroimidazole compound corresponding to the formula

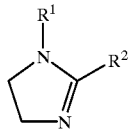

where $R^1$ is selected from the group consisting of hydrogen, alkyl, alkenyl, hydroxyalkyl, hydroxyalkenyl, alkoxyalkyl and alkoxyalkenyl, and $R^2$ is selected from the group consisting of alkyl, alkenyl and aliphatic carboxylate.

75. A fluid composition as set forth in claim 74 wherein the 4,5-dihydroimidazole compound is present in a proportion of between about 0.01% and about 0.1% by weight of the fluid composition.

76. A fluid composition as set forth in claim 74 wherein the 4,5-dihydroimidazole is selected from the group consisting of 2-(8-heptadecenyl)-4,5-dihydro-1H-imidazole-1-ethanol and the condensation product of a $C_{14}$ to $C_{15}$ fatty acid and 4,5-dihydro-1H-imidazole.

77. A fluid composition as set forth in claim 16 wherein the 4,5-dihydroimidazole compound is the condensation product of a $C_{16}$ to $C_{18}$ fatty acid and 4,5-dihydro-1H-imidazole.

78. A fluid composition suitable for use as an aircraft hydraulic fluid, comprising:

(a) a fire resistant phosphate ester base stock comprising between about 35% and about 99% by weight of a trialkyl phosphate wherein the alkyl substituents are substantially isoalkyl C4 or $C_5$ and are bonded to the phosphate moiety via a primary carbon atom, between about 0% and about 35% by weight of a dialkyl aryl phosphate wherein the alkyl substituents are as previously defined, and between about 0% and about 20% by weight of a triaryl phosphate, with the proviso that the sum of the proportionate amount of each base stock component must equal 100%;

(b) a viscosity index improver in a proportion of between about 3% and about 10% by weight of the fluid composition, the viscosity index improver comprising a methacrylate ester polymer, the repeating units of which substantially comprise butyl and hexyl methacrylate, at least 95% by weight of the polymer having a molecular weight of between about 50,000 and about 1,500,000;

(c) an anti-erosion agent in a proportion of between about 0.02% and about 0.08% by weight of the fluid composition, the anti-erosion agent comprising an alkali metal salt of a perfluoroalkyl sulfonic acid, the alkyl substituent of which is selected from the group consisting of hexyl, heptyl, octyl, nonyl, decyl, and mixtures there of;

(d) an acid scavenger in a proportion of between about 1.5% and about 10% by weight of the fluid composition, the acid scavenger selected from the group consisting of a derivative of a 3,4-epoxy cyclohexane carboxylate and a diepoxide compound corresponding to the formula

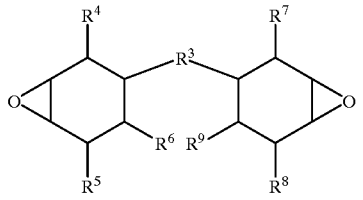

wherein $R^3$ is an organic group containing 1 to 10 carbon atoms, from 0 to 6 oxygen atoms and from 0 to 6 nitrogen atoms, and $R^4$ through $R^9$ are independently selected from among hydrogen and aliphatic groups containing 1 to 5 carbon atoms, and mixtures of the 3,4-epoxycyclohexane carboxylate and the diepoxide compound;

(e) 2,4,6-trialkylphenol in a proportion of between about 0.1% and about 1.0% by weight of the fluid composition;

(f) a di(alkylphenyl)amine in a proportion of between about 0.3% and about 1.0% by weight of the fluid composition; and (g) a hindered polyphenol selected from the group consisting of bis(3,5-dialkyl-4-hydroxyaryl)methane, 1,3,5-trimethyl-2,4,6-tris(3,5-di-tert-butyl-4-hydroxyaryl) benzene and mixtures thereof in a proportion of between about 0.3% and about 1.0% by weight of the fluid composition.

79. A fluid composition as set forth in claim 78 wherein the base stock comprises between about 80% and about 99% by weight of the trialkyl phosphate and between about 1.0% and about 20% by weight of the triaryl phosphate wherein the aryl substituents are alkyl-substituted phenyl.

80. A fluid composition as set forth in claim 79 wherein the alkyl substituent of the alkyl-substituted phenyl is $C_2$ to $C_9$.

81. A fluid composition as set forth in claim 80 wherein the alkyl substituent of the alkyl-substituted phenyl is $C_3$ to $C_4$.

82. A fluid composition as set forth in claim 81 wherein the alkyl-substituted phenyl is selected from the group consisting of isopropylphenyl, isobutylphenyl, and tert-butylphenyl.

83. A fluid composition as set forth in claim 79 wherein the triaryl phosphate is a tri(alkylaryl) phosphate selected from the group consisting of tri(isopropylphenyl)phosphate, tri(isobutylphenyl) phosphate, and tri(tert-butylphenyl) phosphate.

84. A fluid composition as set forth in claim 83 wherein the tri(alkylaryl) phosphate is tri(tert-butylphenyl) phosphate.

85. A fluid composition as set forth in claim 78 further comprising benzotriazole or a benzotriazole derivative in a proportion of between about 0.005% and about 0.09% by weight as a copper corrosion inhibitor.

86. A fluid composition as set forth in claim 78 or 85 further comprising a 4,5-dihydroimidazole compound corresponding to the formula

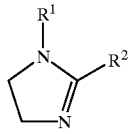

where $R^1$ is selected from the group consisting of hydrogen, alkyl alkenyl, hydroxyalkyl, hydroxyalkenyl, alkoxyalkyl and alkoxyalkenyl, and $R^2$ is selected from the group consisting of alkyl, alkenyl and aliphatic carboxylate.

87. A fluid composition as set forth in claim 86 wherein the 4,5-dihydroimidazole compound is present in a proportion of between about 0.01% and about 0.1% by weight of the fluid composition.

88. A fluid composition as set forth in claim 86 wherein the 4,5-dihydroimidazole is selected from the group consisting of 2-(8-heptadecenyl)-4,5-dihydro-1H-imidazole-1-ethanol and the condensation product of a $C_{14}$ to $C_{18}$ fatty acid and 4,5-dihydro-1H-imidazole.

89. A fluid composition as set forth in claim 88 wherein the 4,5-dihydroimidazole compound is the condensation product of a $C_{16}$ to $C_{18}$ fatty acid and 4,5-dihydro-1H-imidazole.

*90. A fluid composition as set forth in claim 1 wherein the hindered phenol antioxidant comprises a mixture of a hindered phenol and a hindered polyphenol.*

*91. A fluid composition as set forth in claim 90 wherein the amine antioxidant is a diaryl amine.*

*92. A fluid composition as a set forth in claim 1 wherein said epoxide acid scavenger is selected from the group consisting of a derivative of a 3,4-epoxy cyclohexane carboxylate and a diepoxide compound corresponding to the formula*

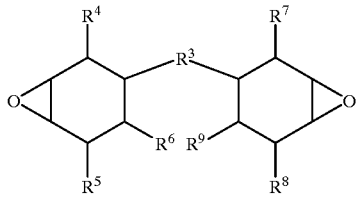

*wherein $R^3$ is an organic group containing 1 to 10 carbon atoms, from 0 to 6 oxygen atoms and from 0 to 6 nitrogen atoms, and $R^4$ through $R^9$ are independently selected from among hydrogen and aliphatic groups containing 1 to 5 carbon atoms, and mixtures of the 3,4-epoxycyclohexane carboxylate and the diepoxide compound.*

*93. A fluid composition as set forth in claim 7 wherein said epoxide acid scavenger is selected from the group consisting of a derivative of a 3,4-epoxy cyclohexane carboxylate and a diepoxide compound corresponding to the formula*

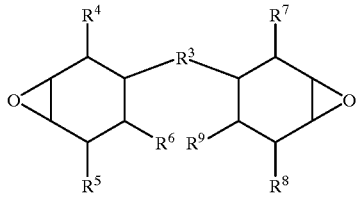

*wherein $R^3$ is an organic group containing 1 to 10 carbon atoms, from 0 to 6 oxygen atoms and from 0 to 6 nitrogen*

*atoms, and $R^4$ through $R^9$ are independently selected from among hydrogen and aliphatic groups containing 1 to 5 carbon atoms, and mixtures of the 3,4-epoxycyclohexane carboxylate and the diepoxide compound.*

*94. A fluid composition as set forth in claim 50 wherein the hindered phenol antioxidant comprises a mixture of a hindered phenol and a hindered polyphenol.*

*95. A fluid composition as set forth in claim 94 wherein the amine antioxidant is a diaryl amine.*

*96. A fluid composition as set forth in claim 95 containing a 2,4,6-trialkylphenol in a proportion of between about 0.1 and about 1.0% by weight of the fluid composition, a di(alkylphenyl)amine in a proportion of between about 0.3% and about 1.0% by weight of the fluid composition, and a hindered polyphenol selected from the group consisting of bis(3,5-dialkyl-4-hydroxyaryl)methane and 1,3,5-trialkyl-2,4,6-tris(3,5-di-tert-butyl-4-hydroxyaryl)benzene and mixtures thereof, in a proportion of between about 0.3% and about 1.0% by weight of the fluid composition.*

*97. A fluid composition as a set forth in claim 50 wherein said epoxide acid scavenger is selected from the group consisting of a derivative of a 3,4-epoxy cyclohexane carboxylate and a diepoxide compound corresponding to the formula*

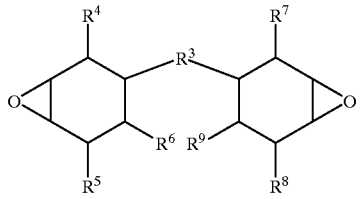

*wherein $R^3$ is an organic group containing 1 to 10 carbon atoms, from 0 to 6 oxygen atoms and from 0 to 6 nitrogen atoms, and $R^4$ through $R^9$ are independently selected from among hydrogen and aliphatic groups containing 1 to 5 carbon atoms, and mixtures of the 3,4-epoxycyclohexane carboxylate and the diepoxide compound.*

*98. A fluid composition as set forth in claim 59 wherein the amine antioxidant is a diaryl amine.*

*99. A fluid composition as set forth in claim 70 wherein the amine antioxidant is a diaryl amine.*

*100. A fluid composition as set forth in claim 19 wherein said epoxide acid scavenger is selected from the group consisting of a derivative of a 3,4-epoxy cyclohexane carboxylate and a diepoxide compound corresponding to the formula*

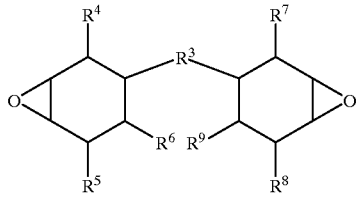

*wherein $R^3$ is an organic group containing 1 to 10 carbon atoms, from 0 to 6 oxygen atoms and from 0 to 6 nitrogen atoms, and $R^4$ through $R^9$ are independently selected from among hydrogen and aliphatic groups containing 1 to 5 carbon atoms, and mixtures of the 3,4-epoxycyclohexane carboxylate and the diepoxide compound.*

*101. A fluid composition as set forth in claim 31 wherein said epoxide acid scavenger is selected from the group consisting of a derivative of a 3,4-epoxy cyclohexane carboxylate and a diepoxide compound corresponding to the formula*

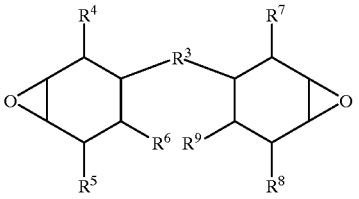

*wherein $R^3$ is an organic group containing 1 to 10 carbon atoms, from 0 to 6 oxygen atoms and from 0 to 6 nitrogen atoms, and $R^4$ through $R^9$ are independently selected from among hydrogen and aliphatic groups containing 1 to 5 carbon atoms, and mixtures of the 3,4-epoxycyclohexane carboxylate and the diepoxide compound.*

*102. A fluid composition as set forth in claim 56 wherein said epoxide acid scavenger is selected from the group consisting of a derivative of a 3,4-epoxy cyclohexane carboxylate and a diepoxide compound corresponding to the formula*

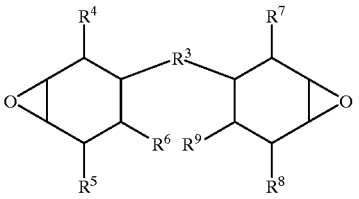

*wherein $R^3$ is an organic group containing 1 to 10 carbon atoms, from 0 to 6 oxygen atoms and from 0 to 6 nitrogen atoms, and $R^4$ through $R^9$ are independently selected from among hydrogen and aliphatic groups containing 1 to 5 carbon atoms, and mixtures of the 3,4-epoxycyclohexane carboxylate and the diepoxide compound.*

*103. A fluid composition as set forth in claim 67 wherein said epoxide acid scavenger is selected from the group consisting of a derivative of a 3,4-epoxy cyclohexane carboxylate and a diepoxide compound corresponding to the formula*

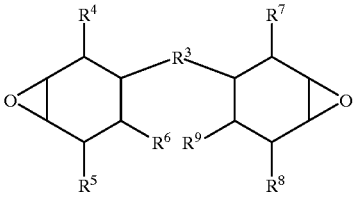

*wherein $R^3$ is an organic group containing 1 to 10 carbon atoms, from 0 to 6 oxygen atoms and from 0 to 6 nitrogen atoms, and $R^4$ through $R^9$ are independently selected from among hydrogen and aliphatic groups containing 1 to 5 carbon atoms, and mixtures of the 3,4-epoxycyclohexane carboxylate and the diepoxide compound.*

*104. A fluid composition as set forth in claim 7 wherein the base stock comprises between about 20% and about 90% by weight of a trialkyl phosphate, between about 0% and about 70% by weight of a dialkyl aryl phosphate and between about 0% and about 25% by weight of an alkyl diaryl phosphate.*

*105. A fluid composition as set forth in claim 104 wherein the base stock comprises between about 50% and about 90% by weight of a trialkyl phosphate, between about 0% and about 70% by weight of a dialkyl aryl phosphate and between about 0% and about 25% by weight of an alkyl diaryl phosphate.*

*106. A fluid composition as set forth in claim 8 wherein the base stock comprises between about 20% and about 90% by weight of a trialkyl phosphate, between about 0% and about 70% by weight of a dialkyl aryl phosphate and between about 0% and about 25% by weight of an alkyl diaryl phosphate.*

*107. A fluid composition as set forth in claim 106 wherein the base stock comprises between about 50% and about 90% by weight of a trialkyl phosphate, between about 0% and about 70% by weight of a dialkyl aryl phosphate and between about 0% and about 25% by weight of an alkyl diaryl phosphate.*

*108. A fluid composition as set forth in claim 19 wherein the base stock comprises between about 20% and about 90% by weight of a trialkyl phosphate, between about 0% and about 70% by weight of a dialkyl aryl phosphate and between about 0% and about 25% by weight of an alkyl diaryl phosphate.*

*109. A fluid composition as set forth in claim 108 wherein the base stock comprises between about 50% and about 90% by weight of a trialkyl phosphate, between about 0% and about 70% by weight of a dialkyl aryl phosphate and between about 0% and about 25% by weight of an alkyl diaryl phosphate.*

*110. A fluid composition as set forth in claim 31 wherein the base stock comprises between about 20% and about 90% by weight of a trialkyl phosphate, between about 0% and about 70% by weight of a dialkyl aryl phosphate and between about 0% and about 25% by weight of an alkyl diaryl phosphate.*

*111. A fluid composition as set forth in claim 110 wherein the base stock comprises between about 50% and about 90% by weight of a trialkyl phosphate, between about 0% and about 70% by weight of a dialkyl aryl phosphate and between about 0% and about 25% by weight of an alkyl diaryl phosphate.*

*112. A fluid composition as set forth in claim 50 wherein the base stock comprises between about 20% and about 99% by weight of a trialkyl phosphate, between about 0% and about 70% by weight of a dialkyl aryl phosphate and between about 0% and about 25% by weight of an alkyl diaryl phosphate.*

*113. A fluid composition as set forth in claim 112 wherein the base stock comprises between about 50% and about 99% by weight of a trialkyl phosphate, between about 0% and about 70% by weight of a dialkyl aryl phosphate and between about 0% and about 25% by weight of an alkyl diaryl phosphate.*

*114. A fluid composition as set forth in claim 56 wherein the base stock comprises between about 20% and about 99% by weight of a trialkyl phosphate, between about 0% and about 70% by weight of a dialkyl aryl phosphate and between about 0% and about 25% by weight of an alkyl diaryl phosphate.*

*115. A fluid composition as set forth in claim 114 wherein the base stock comprises between about 50% and about 99% by weight of a trialkyl phosphate, between about 0% and about 70% by weight of a dialkyl aryl phosphate and between about 0% and about 25% by weight of an alkyl diaryl phosphate.*

*116. A fluid composition as set forth in claim 67 wherein the base stock comprises between about 35% and about 99% by weight of a trialkyl phosphate, between about 0% and about 35% by weight of a dialkyl aryl phosphate and between about 0% and about 20% by weight of an triaryl phosphate.*

*117. A fluid composition as set forth in claim 116 wherein the base stock comprises between about 80% and about 99% by weight of a trialkyl phosphate, and between about 1% and about 20% by weight of an triaryl phosphate.*

*118. A fluid composition as set forth in any of claims 1, 19, 31, 50, 56 or 67 wherein in the anti-erosion additive comprising an alkali metal salt of a perfluoroalkyl sulfonic acid the alkyl substituent comprises from 5 to 12 carbon atoms.*

* * * * *

UNITED STATES PATENT AND TRADEMARK OFFICE

CERTIFICATE OF CORRECTION

PATENT NO. : RE 37,101 E
DATED : March 20, 2001
INVENTOR(S) : Gerbrand Deetman

It is certified that error appears in the above-identified patent and that said Letters Patent is hereby corrected as shown below:

Column 48,
Line 28, delete "$C_{15}$" and insert -- $C_{18}$ --

Column 50,
Line 49, delete "1 to 5" and insert -- 1 to 3 --

Column 51,
Lines 2, 38 and 63, delete "1 to 5" and insert -- 1 to 3 --

Column 52,
Lines 17, 38 and 59, delete "1 to 5" and insert -- 1 to 3 --

Signed and Sealed this

Twenty-seventh Day of August, 2002

*Attest:*

*Attesting Officer*

JAMES E. ROGAN
*Director of the United States Patent and Trademark Office*